(12) United States Patent
Hasegawa et al.

(10) Patent No.: US 6,538,858 B1
(45) Date of Patent: Mar. 25, 2003

(54) SPIN-VALVE THIN FILM ELEMENT AND METHOD OF MANUFACTURING THE SAME

(75) Inventors: Naoya Hasegawa, Niigata-ken (JP); Kenji Honda, Niigata-ken (JP); Yoshihiko Kakihara, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/491,397

(22) Filed: Jan. 25, 2000

(30) Foreign Application Priority Data

Jan. 27, 1999 (JP) .......................................... 11-019118
Dec. 3, 1999 (JP) .......................................... 11-345434

(51) Int. Cl.⁷ ............................................... G11B 5/39
(52) U.S. Cl. ............................................... 360/324.12
(58) Field of Search ........................ 360/324.1, 324.12, 360/327.3, 327.31

(56) References Cited

U.S. PATENT DOCUMENTS

| | | |
|---|---|---|
| 5,018,037 A | 5/1991 | Krounbi et al. |
| 5,079,035 A | 1/1992 | Krounbi et al. |
| 5,287,238 A | 2/1994 | Baumgart et al. |
| 5,408,377 A | 4/1995 | Gurney et al. |
| 5,465,185 A | 11/1995 | Heim et al. |
| 5,701,223 A | 12/1997 | Fontana, Jr. et al. |
| 5,751,521 A | 5/1998 | Gill |
| 5,768,067 A | 6/1998 | Saito et al. |
| 5,784,225 A | 7/1998 | Saito et al. |
| 5,793,207 A * | 8/1998 | Gill .............................. 324/252 |
| 5,869,963 A | 2/1999 | Saito et al. |
| 5,883,764 A * | 3/1999 | Pinarbasi ..................... 360/322 |
| 5,959,810 A | 9/1999 | Kakihara et al. |

FOREIGN PATENT DOCUMENTS

| | | | |
|---|---|---|---|
| EP | 0 727 773 A1 | | 8/1996 |
| JP | 8-235542 | * | 9/1996 |
| JP | 8-293107 | * | 11/1996 |
| JP | 9-73611 | * | 3/1997 |

* cited by examiner

*Primary Examiner*—William Klimowicz
(74) *Attorney, Agent, or Firm*—Brinks Hofer Gilson & Lione

(57) ABSTRACT

In the present invention, hard bias layers are arranged in the same layer level as a free magnetic layer, and the upper surfaces of the hard bias layers are joined to the sides of a lamination at positions lower than the upper edges of the sides of the lamination above a substrate. The upper surfaces of the hard bias layers are also joined to the sides of the lamination at the same position as or positions lower than the uppermost position of the hard bias layers above the substrate. A spin-valve thin film element is provided having a decrease in an effective magnetic field applied to the free magnetic layer, and a magnetic field in the direction opposite to the magnetization direction of the free magnetic layer, permitting sufficient control of the magnetic domain of the free magnetic layer, and exhibiting excellent stability. The present invention also provides a method of manufacturing the spin-valve thin film element.

15 Claims, 42 Drawing Sheets

FIG. 6
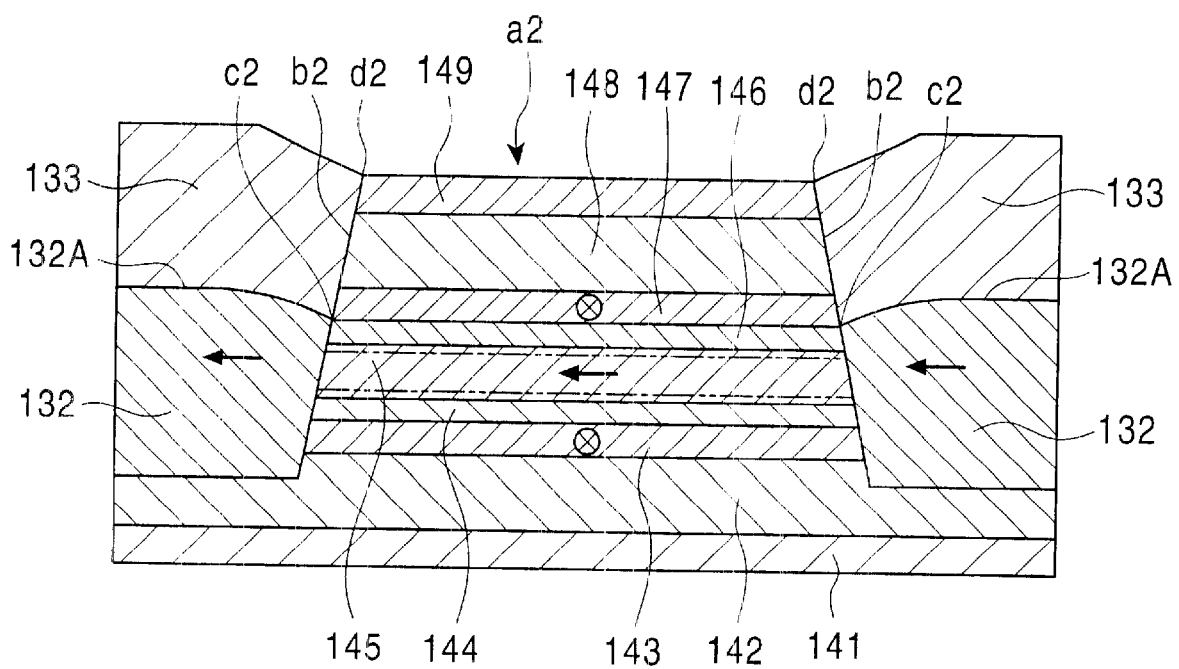
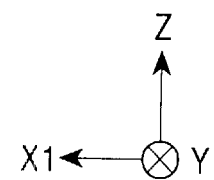

ABS SIDE

FIG. 13
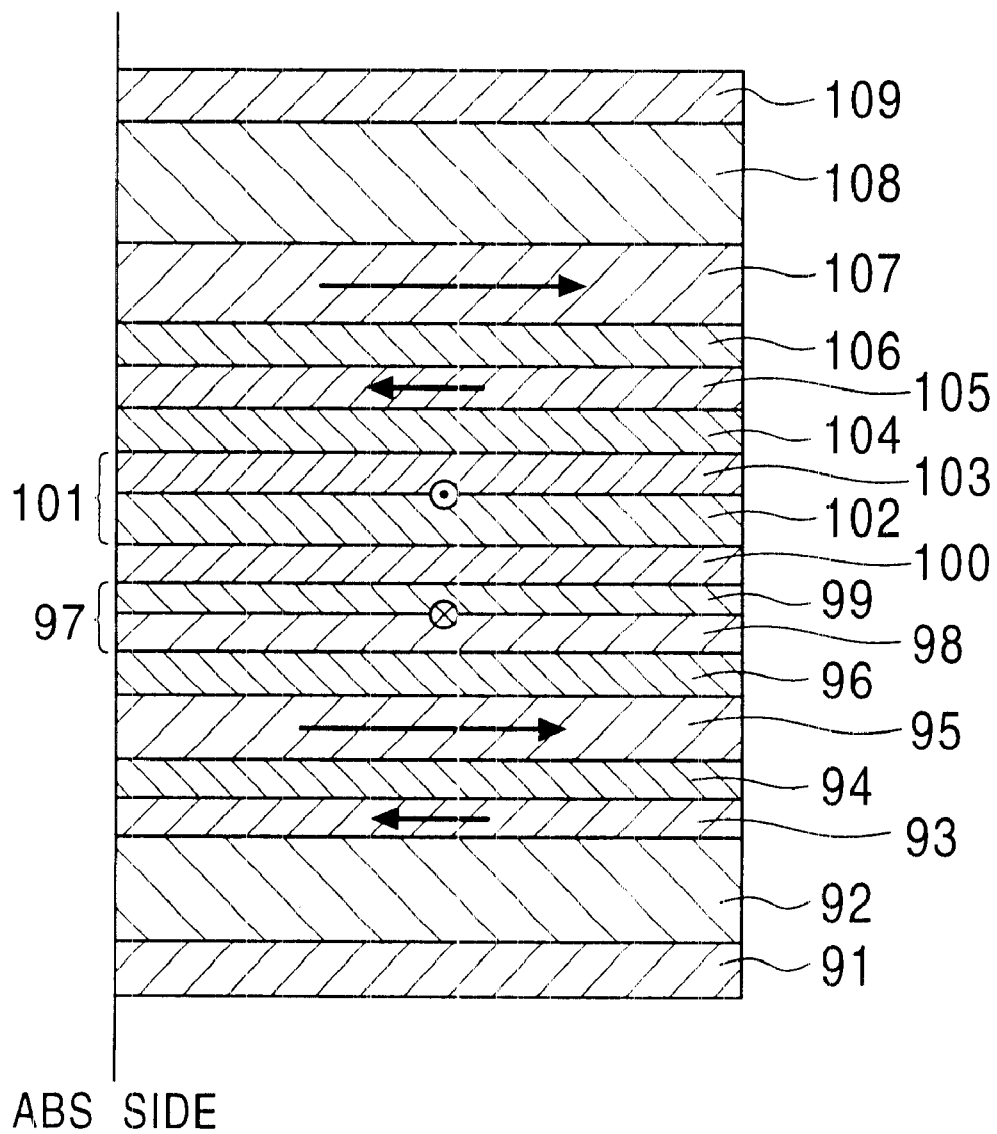
ABS SIDE
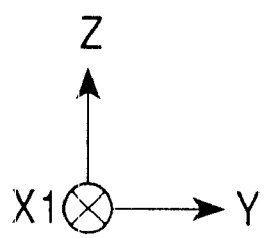

FIG. 40
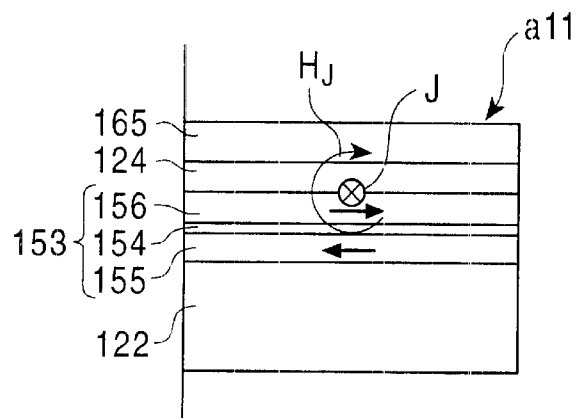
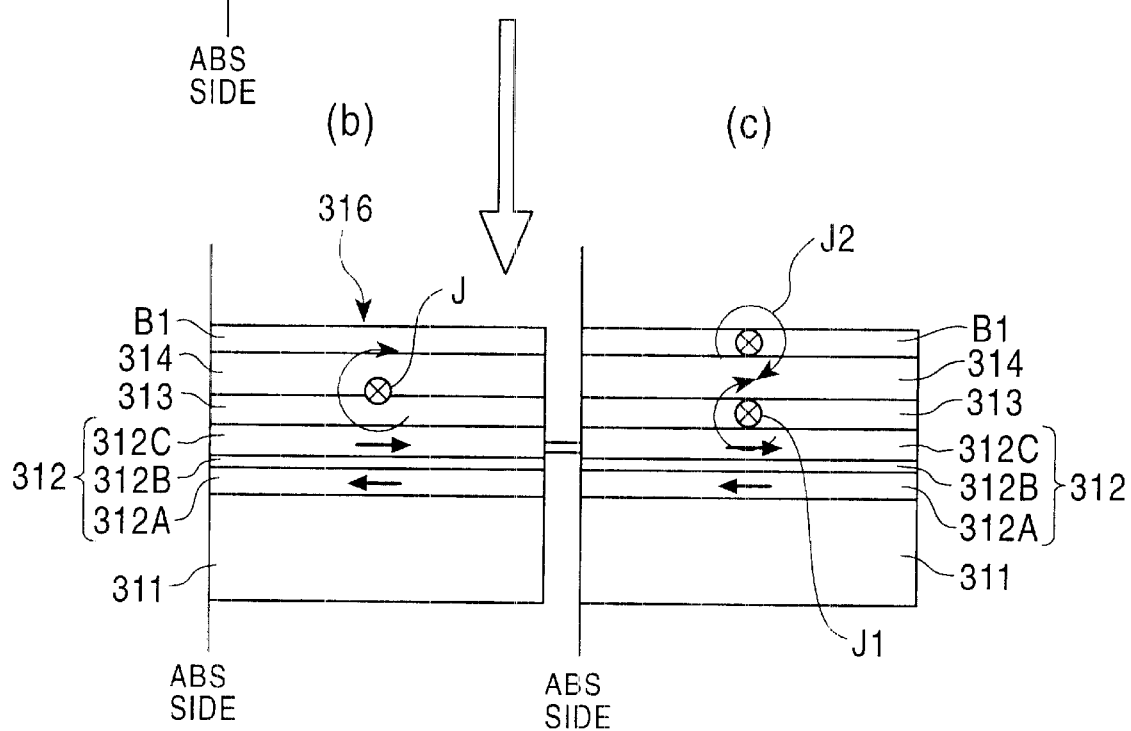

SPIN-VALVE THIN FILM ELEMENT AND METHOD OF MANUFACTURING THE SAME

BACKGROUND OF THE INVENTION

1. Field of the Invention

The present invention relates to a spin-valve thin film element in which electric resistance changes depending upon the relation between the fixed magnetization direction of a pinned magnetic layer and the magnetization direction of a free magnetic layer affected by an external magnetic field, and a method of manufacturing the thin film element. Particularly, the present invention relates to a spin-valve thin film element with excellent stability in which the magnetic domain of a free magnetic layer can be sufficiently controlled, and a method of manufacturing the thin film element.

2. Description of the Related Art

FIG. 15 is a perspective view showing an example of thin film magnetic heads.

This thin film magnetic head is a floating type which is mounted on a magnetic recording medium such as a hard disk device or the like. In the slider 251 of the thin film magnetic head shown in FIG. 15, the side 235 which faces the upstream side in the moving direction of the disk surface is the leading side, and side 236 is the trailing side. In the surface of the slider 251 which faces the disk are formed rail-shaped ABS (air bearing surfaces: the floating surfaces of the rails) 251a and 251b, and air grooves 251c.

Furthermore, a magnetic core 250 is provided on the end surface 251d on the trailing side of the slider 251.

The magnetic core 250 of the thin film magnetic head of this example is a combination type magnetic head having the structure shown in FIGS. 16 and 17, in which a MR head (reading head) h1 and an inductive head (writing head) h2 are laminated in turn on the trailing side-end surface 251d of the slider 251.

In this example, the MR head h1 comprises a lower shielding layer 253 made of a magnetic alloy and formed on the trailing side end of the slider 251 serving as a substrate, and a lower gap layer 254 provided on the lower shielding layer 253. A magnetoresistive element layer 245 is laminated on the lower gap layer 254, and an upper gap layer 256 is formed on the magnetoresistive element layer 245. An upper shielding layer 257 is formed on the upper gap layer 256 so that the upper shielding layer 257 also serves as a lower core layer of the inductive head h2 provided thereon.

The MR head h1 causes a change in resistance of the magnetoresistive element layer 145 according to the presence of a small leakage magnetic field from a magnetic recording medium such as a disk of a hard disk device or the like to read the recording content of the recording medium by reading the change in resistance.

The inductive had h2 comprises a gap layer 264 formed on the lower core layer 257, and a coil layer 266 having a spiral planar pattern. The coil layer 266 is surrounded by a first insulating material layer 267A and a second insulating material layer 267B. An upper core layer 268 is formed on the second insulating material layer 267B so that the pole end 268a thereof is opposed to the lower core layer 257 with a magnetic gap G therebetween in the ABS 251b, the base end 268b being provided to be magnetically connected to the lower core layer 257, as shown in FIGS. 16 and 17.

A protecting layer 269 made of alumina or the like is provided on the upper core layer 268.

In the inductive head h2, a recording current is supplied to the coil layer 266 to apply the recording current to the core layer from the coil layer 266. The inductive head h2 records magnetic signals on the magnetic recording medium such as a hard disk or the like by a leakage magnetic field from the magnetic gap G between the lower core layer 257 and the distal end of the upper core layer 268.

The magnetoresistive element layer 245 provided in the MR head h1 comprises a GMR (Giant Magnetoresistive) element exhibiting giant magnetoresistance. The GMR element has a multilayer structure formed by combining a plurality of materials. There are several types of structures creating giant magnetoresistance. Of these types, a type having a relatively simple structure and exhibiting a high rate of change in resistance with an external magnetic field is a spin valve system. The spin valve system includes a single spin valve system, and a dual spin valve system.

FIG. 18 is a sectional view showing the structure of a principal portion of an example of thin film magnetic heads comprising a conventional spin-valve thin film element, as viewed from the side opposite to a recording medium.

In FIG. 18, reference numeral MR1 denote s a spin-valve thin film element. The spin-valve thin film element MR1 is a top type single spin valve thin film element in which a free magnetic layer 125, a nonmagnetic conductive layer 124, a pinned magnetic layer 123, and an antiferromagnetic layer 122 are formed in turn from the lower gap layer 254 side.

In FIG. 18, reference numeral 121 denotes a base layer made of, for example, Ta (tantalum) or the like. The free magnetic layer 125 is formed on the base layer 121, and the nonmagnetic conductive layer 124 made of Cu or the like is formed on the free magnetic layer 125. The pinned magnetic layer 123 is formed on the nonmagnetic conductive layer 124, and the antiferromagnetic layer 122 is further formed on the pinned magnetic layer 123. A protecting layer 127 made of Ta or the like is formed on the antiferromagnetic layer 122 to form a lamination a10.

The pinned magnetic layer 123 is formed in contact with the antiferromagnetic layer 122 to cause an exchange coupling magnetic field (exchange anisotropic magnetic field) in the interface between the pinned magnetic layer 123 and the antiferromagnetic layer 122, thereby fixing magnetization of the pinned magnetic layer 123, for example, in the Y direction shown in the drawing.

In addition, hard bias layers 126 made of, for example, a Co—Pt (cobalt-platinum) alloy, i.e., permanent magnet films, are formed on both sides of the free magnetic layer 125. The hard bias layers 126 are formed for suppressing Barkhausen noise produced due to the formation of a plurality of magnetic domains in the free magnetic layer 125, and putting the free magnetic layer into a single magnetic domain state. For example, when the hard bias layers 126 are magnetized in the X1 direction shown in the drawing, magnetization of the free magnetic layer 125 is oriented in the X1 direction shown in the drawing by a leakage magnetic flux from the hard bias layers 126. This creates the relation that variable magnetization of the free magnetic layer 125 and fixed magnetization of the pinned magnetic layer 123 cross each other.

In FIG. 18, reference numeral 128 denotes a conductive layer made of Cr, Ta, Au, or the like.

In the spin-valve thin film element MR1, when the magnetization direction X1 of the free magnetic layer 125 is changed, electric resistance is changed with the angle with respect to the magnetization direction of the pinned magnetic layer 123 which is fixed in the Y direction, and a leakage magnetic field from the recording medium is detected by a change in voltage based on the change in the electric resistance value.

The central portion of the lamination a10 lies in a sensitive region which contributes to reproduction of a recording magnetic field from the magnetic recording medium, and which exhibits magnetoresistance, and defines the detection track width Tw.

FIG. 22 is a sectional view showing the structure of a principal portion of another example of thin film magnetic heads comprising another conventional spin valve thin film element, as viewed from the side opposite to a recording medium.

In FIG. 22, reference numeral MR2 denotes a spin-valve thin film element. The spin-valve thin film element MR2 is different from the spin-valve thin film element MR1 shown in FIG. 18 in that an antiferromagnetic layer 122, a pinned magnetic layer 153, a nonmagnetic conductive layer 124, and a free magnetic layer 165 are formed in turn from the lower gap layer 254 side, i.e., the spin-valve thin film element MR2 is a bottom type single spin valve thin film element.

In FIG. 22, reference numeral a11, denotes a lamination. The lamination a11 comprises the antiferromagnetic layer 122 formed on a base layer 121, the pinned magnetic layer 153 formed on the antiferromagnetic layer 122, the nonmagnetic conductive layer 124 formed on the pinned magnetic layer 153, the free magnetic layer 165 formed on the nonmagnetic conductive layer 124, and the protecting layer 127 formed on the free magnetic layer 165.

The pinned magnetic layer 153 of the spin-valve thin film element MR2 comprises a nonmagnetic intermediate layer 154, and first and second pinned magnetic layers 155 and 156 provided with the nonmagnetic intermediate layer 154 formed therebetween. The first pinned magnetic layer 155 is provided on the antiferromagnetic layer 122 side of the nonmagnetic intermediate layer 154; the second pinned magnetic layer 156 is provided on the nonmagnetic conductive layer 124 side of the nonmagnetic intermediate layer 154.

Each of the first and second pinned magnetic layers 155 and 156 comprises a NiFe alloy or the like. The nonmagnetic intermediate layer 154 comprises a nonmagnetic material such as Ru or the like.

The first and second pinned magnetic layers 155 and 156 preferably have different thicknesses. In FIG. 22, the thickness of the second pinned magnetic layer 156 is larger than the thickness of the first pinned magnetic layer 155.

An exchange coupling magnetic field (exchange anisotropic magnetic field) is produced in the interface between the first pinned magnetic layer 155 and the antiferromagnetic layer 122 to fix the magnetization direction of the first pinned magnetic layer 155 in the Y direction shown in the drawing due to the exchange coupling magnetic field with the antiferromagnetic layer 122. The second pinned magnetic layer 156 is antiferromagnetically coupled with the first pinned magnetic layer 155 to fix the magnetization direction in the direction opposite to the Y direction shown in the drawing.

The magnetization directions of the first and second pinned magnetic layer 155 and 156 are antiparallel to each other, and thus have the relation that the magnetic moments of the first and second pinned magnetic layers 155 and 156 are counteracted with each other. However, since the thickness of the second pinned magnetic layer 156 is larger than the thickness of the first pinned magnetic layer 155, spontaneous magnetization derived from the second pinned magnetic layer 156 is slightly left, bringing the pinned magnetic layer 153 into a ferrimagnetic state. Therefore, spontaneous magnetization is further amplified by the exchange coupling magnetic field with the antiferromagnetic layer 122 to fix the magnetization direction of the pinned magnetic layer 153 in the Y direction shown in the drawing.

The free magnetic layer 165 of the spin-valve thin film element MR2 comprises a ferromagnetic layer 166 made of a ferromagnetic material such as a NiFe alloy or the like, and a diffusion preventing layer 167 made of a ferromagnetic material such as Co or the like. The diffusion preventing layer 167 is provided on the nonmagnetic conductive layer 124 side. The magnetization of the free magnetic layer 165 is oriented in the X1 direction shown in the drawing by a leakage magnetic field from the hard bias layers 126.

In the spin-valve thin film element MR2, a sensing current is supplied to the free magnetic layer 165, the nonmagnetic conductive layer 124, and the pinned magnetic layer 153 from the conductive layers 128. A recording medium such as a hard disk or the like is moved in the Z direction shown in the drawing. When a magnetic field in the Y direction is applied due to a leakage magnetic field from the magnetic recording medium, magnetization of the free magnetic layer 165 is changed from the $X_1$ direction to the Y direction to cause spin-dependent conduction electron scattering in the interface between the nonmagnetic conductive layer 124 and the free magnetic layer 165, and the interface between the nonmagnetic conductive layer 124 and the second pinned magnetic layer 156, thereby changing the electric resistance and thus detecting the leakage magnetic field from the recording medium.

The first and second pinned magnetic layers 155 and 156 are antiferromagnetically coupled with each other to have the relation that magnetic moments of the first and second pinned magnetic layers 155 and 156 are counteracted with each other. However, since the thickness of the second pinned magnetic layer 156 is larger than the thickness of the first pinned magnetic layer 155, spontaneous magnetization derived from the second pinned magnetic layer 156 is slightly left, bringing the pinned magnetic layer 153 into a ferrimagnetic state. Therefore, spontaneous magnetization is further amplified by the exchange coupling magnetic field with the antiferromagnetic layer 122 to fix the magnetization direction of the pinned magnetic layer 153 in the Y direction shown in the drawing, and improve the stability of the spin-valve thin film element MR2.

FIG. 23 is a sectional view showing the structure of a principal portion of a further example of thin film magnetic heads comprising another conventional spin valve thin film element, as viewed from the side opposite to a recording medium.

In FIG. 23, reference numeral MR3 denotes a spin-valve thin film element. The spin-valve thin film element MR3 is different from the spin-valve thin film element MR2 shown in FIG. 22 in the structure of a free magnetic layer and in that no backed layer is provided between the free magnetic layer and a protecting layer.

In FIG. 23, reference numeral a12 denotes a lamination. The lamination a12 comprises the antiferromagnetic layer 122 formed on a base layer 121, the pinned magnetic layer 153 formed on the antiferromagnetic layer 122, the nonmagnetic conductive layer 124 formed on the pinned magnetic layer 153, the free magnetic layer 175 formed on the nonmagnetic conductive layer 124, and the protecting layer 127 formed on the free magnetic layer 175.

The free magnetic layer 175 of the spin-valve thin film element MR3 comprises a nonmagnetic intermediate layer 176, and first and second free magnetic layers 177 and 178 provided with the nonmagnetic intermediate layer 176 formed therebetween.

The first free magnetic layer 177 is provided on the protecting layer 127 side of the nonmagnetic intermediate layer 176; the second free magnetic layer 178 is provided on the nonmagnetic conductive layer 124 side of the nonmagnetic intermediate layer 176. The second free magnetic layer 178 comprises a diffusion preventing layer 179 and a ferromagnetic layer 180.

The first free magnetic layer 177 comprises a ferromagnetic materials such as a NiFe alloy or the like, and the nonmagnetic intermediate layer 176 comprises a nonmagnetic material such as Ru or the like. Each of the diffusion preventing layer 179 and the ferromagnetic layer 180 comprises a ferromagnetic material. For example, the diffusion preventing layer 179 is made of a CoFe alloy, and the ferromagnetic layer 180 is made of a NiFe alloy.

The thickness of $t_2$ the second free magnetic layer 178 is larger than the thickness $t_1$ of the first free magnetic layer 177.

If saturation magnetizations of the first and second free magnetic layers 177 and 178 are $M_1$ and $M_2$, respectively, the magnetic thicknesses of the first and second free magnetic layers 177 and 178 are $M_1 t_1$ and $M_2 t_2$, respectively. Since the second free magnetic layer 178 comprises the diffusion preventing layer 179 and the ferromagnetic layer 180, the magnetic thickness $M_2 t_2$ of the second free magnetic layer 178 is the sum of the magnetic thickness of the diffusion preventing layer 179, and the magnetic thickness of the ferromagnetic layer 180.

The free magnetic layer 175 is formed so that the magnetic thicknesses of the first and second free magnetic layers 177 and 178 have the relation $M_2 t_2 > M_1 t_1$. In addition, the first and second free magnetic layers 177 and 178 can be coupled antiferromagnetically with each other. Namely, when magnetization of the first free magnetic layer 177 is oriented in the $X_1$ direction shown in the drawing by the hard bias layers 126, magnetization of the second free magnetic layer 178 is oriented in the direction opposite to the $X_1$ direction shown in the drawing.

Furthermore, the magnetic thicknesses of the first and second free magnetic layers 177 and 178 have the relation $M_2 t_2 > M_1 t_1$, magnetization of the second free magnetic layer 178 remains, and thus magnetization of the whole free magnetic layer 175 is oriented in the $X_1$ direction. In this case, the effective thickness of the free magnetic layer 175 is represented by $(M_2 t_2 - M_1 t_1)$.

In this way, the first and second free magnetic layer 177 and 178 are coupled with each other ferromagnetically so that the magnetization directions are antiparallel to each other, and the magnetic thicknesses thereof have the relation $M_2 t_2 > M_1 t_1$, thereby causing an artificial ferrimagnetic state. Therefore, there is the relation that the magnetization directions of the free magnetic layer 175 and the pinned magnetic layer 153 cross each other.

In the spin-valve thin film element MR3, when the magnetization direction $X_1$ of the free magnetic layer 175 is changed by a leakage magnetic field from a recording medium such as a hard disk or the like, the electric resistance is changed based on the relation to magnetization of the pinned magnetic layer 153 which is fixed in the Y direction shown in the drawing, thereby detecting the leakage magnetic field from the recording medium by a change in voltage based on the change in the electric resistance value.

Furthermore, the free magnetic layer 175 comprises the first and second free magnetic layers 177 and 178 which are coupled with each other antiferromagnetically, and thus the magnetization direction of the whole free magnetic layer 175 is changed by a small external magnetic field, increasing the sensitivity of the spin-valve thin film element.

In the spin-valve thin film element MR1 shown in FIG. 18, the hard bias layers 126 are formed in contact with the sides of the lamination a10. The portions of the hard bias layers 126 which are respectively joined to the upper portions of the sides of the lamination a10 have a sectional shape in which the thickness gradually decreases in the direction to the upper edges of the sides. The tips 126a of the hard bias layers 26 which are respectively joined to the upper edges of the sides of the lamination a10 have a pointed sectional shape.

Therefore, a leakage magnetic flux from the hard bias layers 126 joined to the upper edges of the sides of the lamination a10 is absorbed by the upper shielding layer 257 provided above the spin-valve thin film element MR1 from the tips 126a to form a flow of the magnetic flux as shown by an arrow C in FIG. 18, thereby causing the problem of decreasing the effective magnetic field applied to the free magnetic layer 125. It is thus difficult to sufficiently control the magnetic domain of the free magnetic layer 125, causing the problem of low stability.

In addition, magnetizations at the tips 126a of the hard bias layers 126 near the upper edge of the sides of the lamination a10 are respectively oriented in the directions shown by arrows A and D in FIG. 18. This causes a magnetic field (arrow B) which leaks from the tips 126a and is absorbed by the.bottoms of the tips 126a, and a magnetic flux (arrow E) which leaks from the bottoms and is absorbed by the tips 126a. These magnetic fields apply a magnetic field to both ends of the free magnetic layer 125 in the direction opposite to the desired direction of a magnetic field to be applied to the free magnetic layer 125, thereby causing the problems of adversely affecting control of the magnetic domain of the free magnetic layer 125 and deteriorating stability.

Also, in the spin-valve thin film element MR2 shown in FIG. 22, like in the spin valve thin film element MR1, magnetizations at the tips 126a of the hard bias layers 126 near the upper edges of the sides of the lamination all are respectively oriented in the directions shown by arrows A and D. This causes a dipole magnetic field (external antimagnetic field), i.e., a magnetic field (arrow B) which leaks from the tips 126a and is absorbed by the bottoms of the tips 126a, and a magnetic flux (arrow E) which leaks from the bottoms and is absorbed by the tips 126a. These magnetic fields apply a magnetic field to both ends of the free magnetic layer 165 in the direction opposite to the desired direction of a magnetic field to be applied to the free magnetic layer 165, thereby causing the problems of adversely affecting control of the magnetic domain of the free magnetic layer 165 and making abnormal the reproduced waveform at both ends of the track width Tw.

In the spin-valve thin film element MR3 shown in FIG. 23, a strong magnetic field is applied to the first free magnetic layer 177 from the tips 126a of the hard bias layers 126 near the upper edges of the sides of the lamination a12, to apply, to the first free magnetic layer 177, magnetization in the direction opposite to the desired direction of a magnetic field to be applied to the first free magnetic layer 177. If the magnetic field of the hard bias layers 126 is higher than a spin flop magnetic field (HSt), therefore, a magnetic field is applied to both ends (the portions near the hard bias layers 126) of the first free magnetic layer 177 in the direction opposite to the desired direction of the magnetization applied to the first free magnetic layer 177. As a result, the magnetization direction in the central portion of the first free magnetic layer 177 is arranged in the direction opposite to the magnetization direction of the second free magnetic layer 178, while the magnetization directions at both ends are disturbed. When the magnetization directions at both ends of the first free magnetic layer 177 are disturbed, the magnetization direction in the central portion of the second free magnetic layer 178, in which the magnetization direction is antiparallel ($X_1$ direction) to the magnetization direction of the first free magnetic layer 177, is arranged in the direction ($X_1$ direction) opposite to the magnetization direction of the first free magnetic layer, while the magnetization directions at both ends are disturbed. Thus, the magnetization directions at both ends of the first and second free magnetic layers 177 and 178 are not brought into the antiparallel state, thereby causing the problems of unstable reproduced waveforms at both ends of the track width Tw, servo error, etc.

The spin flop magnetic field will be described below with reference to FIG. 24. FIG. 24 is a diagram showing a M-H curve of a free magnetic layer. The M-H curve indicates changes in magnetization M of the free magnetic layer 175 when an external magnetic field H was applied to the free magnetic layer 175 of the spin-valve thin film element MR3 shown in FIG. 23 in the direction of the track width Tw. The external magnetic field H corresponds to a bias magnetic field form the hard bias layers 126.

In FIG. 24, an arrow $F_1$ shows the magnetization direction of the first free magnetic layer 177, and arrow $F_2$ shows the magnetization direction of the second free magnetic layer 178.

FIG. 24 reveals that with a low external magnetic field H, the first and second free magnetic layers 177 and 178 are brought into the antiferromagnetic coupling state, i.e., in the state wherein the directions of the arrows $F_1$ and $F_2$ are antiparallel to each other. However, with the value of an external magnetic field H over a predetermined value, the directions of the arrows $F_1$ and $F_2$ are not brought into the antiparallel state, thereby breaking the antiferromagnetic coupling state of the first and second free magnetic layers 177 and 178, failing to maintain the ferrimagnetic state. This is referred to as "spin flop transition". The external magnetic field with which the spin flow transition occurs is the spin flop magnetic field denoted by $H_{sf}$ in FIG. 24. With the external magnetic filed H higher than the spin flop magnetic field, the $F_1$ direction is further rotated to the direction parallel to the $F_2$ direction, i.e., the direction 180 different from the initial $F_1$ direction, thereby completely breaking the ferrimagnetic state. This is referred to as the "saturation magnetic field", which is denoted by $H_s$ in FIG. 24. Therefore, the magnetization directions at both ends of the first and second free magnetic layers 177 and 178 shown in FIG. 23 have, for example, the relation between $H_{sf}$ and $H_s$ shown in FIG. 24.

SUMMARY OF THE INVENTION

The present invention has been achieved for solving the above problems in consideration of the above-described situation, and an object of the present invention is to provide a spin-valve thin film element with excellent stability which causes little decrease in an effective magnetic field applied to a free magnetic layer, and little magnetic field exerting a magnetic field in the direction opposite to the magnetization direction of the free magnetic layer near the upper edges of the sides of a lamination, and which permits sufficient control of the magnetic domain of the free magnetic layer. Another object of the present invention is to provide a method of manufacturing the spin-valve thin film element.

A further object of the present invention is to provide a thin film magnetic head comprising the spin-valve thin film element.

In order to achieve the objects, a spin-valve thin film element of the present invention comprises an antiferromagnetic layer, a pinned magnetic layer formed in contact with the antiferromagnetic layer so that the magnetization direction is fixed by an exchange coupling magnetic field with the antiferromagnetic layer, and a nonmagnetic conductive layer formed on the pinned magnetic layer and a free magnetic layer provided therebetween, which are laminated in turn on a substrate to form a lamination comprising at least the antiferromagnetic layer, the pinned magnetic layer, the nonmagnetic conductive layer, and the free magnetic layer; hard bias layers formed on both sides of the lamination, for arranging the magnetization direction of the free magnetic layer in the direction crossing the magnetization direction of the pinned magnetic layer; and conductive layers respectively formed on the hard bias layers, for supplying a sensing current to the lamination; wherein the hard bias layers are arranged at the same level as the free magnetic layer, and the upper surfaces of the hard bias layers are joined to the sides of the lamination at positions lower than the upper edges of the sides of the lamination.

The sentence "the hard bias layers are formed at the same level as the free magnetic layer" means the state in which at least the hard bias layers are joined to the free magnetic layer, the state including a state in which the thickness of the junctions between the hard bias layers and the free magnetic layer is smaller than the thickness of the free magnetic layer.

The terms "the upper surfaces of the hard bias layers" means the surfaces opposite to the substrate side.

The terms "junction" means not only connection in direct contact the lamination but also connection therewith through, for example, a base layer, an intermediate layer, or the like.

In the spin-valve thin film element, the upper surfaces of the hard bias layers are joined to the sides of the lamination at positions lower than the upper edges of the sides of the lamination. Therefore, a leakage magnetic flux from the hard bias layers is little absorbed by an upper shielding layer, thereby preventing a decrease in the effective magnetic field applied to the free magnetic layer, and easily putting the free magnetic layer into a single magnetic domain state. The spin-valve thin film element permits sufficient control of the magnetic domain of the free magnetic layer, and exhibits excellent stability.

Also, in the spin-valve thin film element, the hard bias layers are arranged at the same level as the free magnetic layer to readily apply a strong bias magnetic field to the free magnetic layer, thereby easily putting the free magnetic layer into a single magnetic domain state, and decreasing the occurrence of Barkhausen noise.

Furthermore, in the spin-valve thin film element, the upper surfaces of the hard bias layers are preferably joined to the sides of the lamination at the same positions as or positions lower than the uppermost position of the hard bias layers.

In the spin-valve thin film element, therefore, a magnetic field exerting a magnetic field in the direction opposite to the magnetization direction of the free magnetic layer near the upper edges of the sides of the lamination is less produced, thereby easily putting the free magnetic layer into a single magnetic domain state. The spin-valve thin film element thus has the excellent property that the magnetic domain of the free magnetic layer can be more sufficiently controlled.

In the spin-valve thin film element, preferably, the thickness of the hard bias layers is larger than the thickness of the free magnetic layer in the thickness direction thereof, and the upper surfaces of the hard bias layers are arranged at a larger distance from the substrate than the upper side of the free magnetic layer.

In the spin-valve thin film element, therefore, a stronger bias magnetic field can be easily applied to the free magnetic layer, thereby easily putting the free magnetic layer into the single magnetic domain state and decreasing the occurrence of Barkhausen noise.

In the spin-valve thin film element, the lower sides of the hard bias layers are preferably arranged at positions lower than the lower side of the free magnetic layer.

In the spin-valve thin film element, therefore, a strong bias magnetic field can be easily applied to the free magnetic layer, thereby easily putting the free magnetic layer into the single magnetic domain state and further decreasing the occurrence of Barkhausen noise.

In the spin-valve thin film element, the antiferromagnetic layer comprises an alloy represented by the formula X—Mn (wherein X represents one element selected from Pt, Pd, Ru, Ir, Rh, and Os), wherein X is preferably in the range of 37 to 63 atomic %.

Furthermore, in the spin-valve thin film element, the antiferromagnetic layer comprises an alloy represented by the formula X'—Pt—Mn (wherein X' represents at least one element selected from Pd, Cr, Ru, Ni, Ir, Rh, Os, Au, Ag, Ne, Ar, Xe, and Kr), wherein the total of X' and Pt is preferably in the range of 37 to 63 atomic %.

The spin-valve thin film element comprising the antiferromagnetic layer made of an alloy represented by the formula X—Mn or X'—Pt—Mn has excellent properties such as a high exchange coupling field, a high blocking temperature, and excellent corrosion resistance, as compared with use of a NiO alloy, a FeMn alloy, a NiMn alloy, or the like, which is conventionally used for the antiferromagnetic layer.

In the spin-valve thin film element, an intermediate layers of Ta or Cr may be respectively provided between the hard bias layers and the conductive layers.

In use of Cr for the conductive layers, the intermediate layer of Ta functions as a diffusion barrier in a thermal process such as resist curing in the subsequent step to prevent deterioration in magnetic properties of the hard bias layers. In use of Ta for the conductive layers, the intermediate layer of Cr has the effect of readily depositing Ta crystals having a low-resistance body centered cubic structure.

In addition, in the spin-valve thin film element, bias base layers made of Cr may be provided between the hard bias layers and the lamination, and between the hard bias layers and the substrate.

The bias base layers of Cr having a body centered cubic crystal structure (bcc structure) increase the coercive force and remanence ratio of the hard bias layers, and thus increase a bias magnetic field necessary for putting the free magnetic layer into a single magnetic domain state.

The spin-valve thin film element may have a dual structure in which a nonmagnetic conductive layer, a pinned magnetic layer and an antiferromagnetic layer are formed on either side of the free magnetic layer in the thickness direction.

This spin-valve thin film element comprises two combinations of the three layers including the free magnetic layer, the nonmagnetic conductive layer and the pinned magnetic layer, and thus exhibits higher ΔMR (rate of change in resistance) and is capable of comply with high-density recording.

In the spin-valve thin film element, at least one of the pinned magnetic layer and the free magnetic layer may be divided into two layers with a nonmagnetic intermediate layer therebetween so that the two divided layers are brought into an artificial ferrimagnetic state in which the magnetization directions are 180° different from each other.

In the spin-valve thin film element in which at least the pinned magnetic layer is divided into two layers with a nonmagnetic intermediate layer provided therebetween, one of the two divided pinned magnetic layers has the function to fix the other pinned magnetic layer in a proper direction to maintain the pinned magnetic layers in a stable state.

On the other hand, in the spin-valve thin film element in which at least the free magnetic layer is divided into two layers with a nonmagnetic intermediate layer provided therebetween, an exchange coupling magnetic field occurs between the two divided free magnetic layers to create a ferrimagnetic state, thereby decreasing the magnetic thickness to achieve reversal with high sensitivity to an external magnetic field.

In the spin-valve thin film element, the lamination preferably comprises a backed layer comprising a nonmagnetic conductive material in contact with the side of the free magnetic layer opposite to the nonmagnetic conductive layer side.

In this spin-valve thin film element, therefore, in the lamination, the center height of a flow of a sensing current from the conductive layers can be changed to the backed layer side from a position on the pinned magnetic layer side in the case of no backed layer provided. It is thus possible to decrease the intensity of a sensing current magnetic field at the position of the free magnetic layer, and decrease the contribution of the sensing current magnetic field to variable magnetization of the free magnetic layer. Therefore, the spin-valve thin film element has the excellent property that the direction of variable magnetization of the free magnetic layer can easily be corrected to any desired direction with low asymmetry, thereby facilitating control of the direction of variable magnetization of the free magnetic layer.

Furthermore, in the single spin-valve thin film element, the conductive layers are preferably coated to extend toward the central portion of the surface of the lamination from both sides thereof.

In this spin-valve thin film element, a sensing current from the conductive layers little flows to the joints between the hard bias layers and the lamination, thereby increasing the ratio of the sensing current flowing directly to the lamination. In this case, joint resistance which does not contribute to magnetoresistance can be decreased by increasing the joint area between the lamination and the conductive layers, improving reproduction characteristics.

In the single spin-valve thin film element or the bottom type single spin valve thin film element in which the antiferromagnetic layer is formed on the substrate side, the upper surfaces of the hard bias layers are jointed to the sides of the lamination at positions between the upper and lower surfaces of the free magnetic layer.

In this spin-valve thin film element, a dipole magnetic field (external demagnetizing field) exerting a magnetic field in the direction opposite to the desired direction of magnetization imparted to the free magnetic layer is less produced near the upper edges of the sides of the lamination. It is thus possible to improve disturbance in the magnetization directions at both ends of the free magnetic layer, which is due to the dipole magnetic field, and orient magnetization of the free magnetic layer in one direction by a leakage magnetic field from the hard bias layers. Therefore, the free magnetic layer can easily be put into a single magnetic domain state, and the magnetic domain of the free magnetic layer can be more sufficiently controlled. It is also possible to prevent the occurrence of abnormality in the produced waveforms at both ends of the track width, and improve stability of the reproduced waveforms.

In the single spin-valve thin film element or the bottom type single spin valve thin film element in which the antiferromagnetic layer is formed on the substrate side, the upper surfaces of the hard bias layers are preferably joined to the sides of the lamination at positions between the upper surface of the free magnetic layer and the center of the free magnetic layer in the thickness direction thereof.

In this spin-valve thin film element, it is thus possible to improve disturbance in the magnetization directions at both ends of the free magnetic layer, which is due to the dipole magnetic field, and readily apply a strong bias magnetic field to the free magnetic layer. Therefore, the free magnetic layer can easily be put into a single magnetic domain state, and stability of reproduced waveforms can be further improved.

In the single spin-valve thin film element or the bottom type single spin valve thin film element in which the antiferromagnetic layer is formed on the substrate side, preferably, the two divided free magnetic layers with the nonmagnetic intermediate layer provided therebetween are brought into the ferrimagnetic state in which the magnetization directions are 180° different. Where the free magnetic layer of the two free magnetic layers divided by the nonmagnetic intermediate layer, which contacts the nonmagnetic conductive layer, is referred to as a "second free magnetic layer", and the other is referred to as a "first free magnetic layer", the upper surfaces of the hard bias layers are preferably joined to the sides of the lamination at positions between the upper and lower surfaces of the second free magnetic layer.

In this spin-valve thin film element, it is thus possible to avoid a strong magnetic field in the direction opposite to the desired direction of magnetization imparted to the first free magnetic layer from being applied to the ends of the hard bias layers near the upper edges of the sides of the lamination, and improve disturbance in the magnetization directions at both ends of the first free magnetic layer. It is also possible to prevent the magnetization directions at both ends of the second free magnetic layer, which are opposite to the magnetization direction of the first free magnetic layer, from being disturbed due to disturbance in the magnetization directions at both ends of the first free magnetic layer. Furthermore, the antiferromagnetic coupling between the first and second free magnetic layers can stably be maintained to maintain the free magnetic layers in the ferrimagnetic state. It is thus possible to prevent the occurrence of abnormality in reproduced waveforms at both ends of the track width without deteriorating the sensitivity of the spin-valve thin film element, and improve stability of the reproduced waveforms.

In the single spin-valve thin film element or the bottom type single spin valve thin film element in which the antiferromagnetic layer is formed on the substrate side, the upper surfaces of the hard bias layers are preferably joined to the sides of the lamination at positions between the upper surface of the second free magnetic layer and the center thereof in the thickness direction.

In this spin-valve thin film element, it is thus possible to improve disturbance in the magnetization directions at both ends of the first free magnetic layer, and prevent the magnetization directions at both ends of the second free magnetic layer, which are opposite to the magnetization direction of the first free magnetic layer, from being disturbed due to disturbance in the magnetization directions at both ends of the first free magnetic layer. Furthermore, a strong bias magnetic field can be applied to the second free magnetic layer to impart a magnetic field in the same direction as the desired direction of magnetization imparted thereto, thereby improving the sensitivity of the spin-valve thin film element. It is also possible to prevent the occurrence of abnormality in reproduced waveforms at both ends of the track width, and improve stability of the reproduced waveforms.

Furthermore, in the single spin-valve thin film element or the bottom type single spin valve thin film element in which the antiferromagnetic layer is formed on the substrate side, where saturation magnetization and thickness of the second free magnetic layer are $M_2$ and $t_2$, respectively, and saturation magnetization and thickness of the first free magnetic layer are $M_1$ and $t_1$, respectively, the relation $M_2 \cdot t_2 > M_1 \cdot t_1$ is preferably satisfied.

In this spin-valve thin film element, the magnetic thickness of the second free magnetic layer is larger than that of the first free magnetic layer, and a difference between the magnetic thicknesses of the first and second free magnetic layers becomes the effective magnetic thickness of the free magnetic layer. Therefore, the thicknesses of the first and second free magnetic layers can be appropriately controlled to decrease the effective thickness of the free magnetic layer, thereby permitting a change in the magnetization direction of the free magnetic layer with a small external magnetic field. It is thus possible to improve the sensitivity of the spin-valve thin film element.

In addition, since the thickness of the whole free magnetic layer can be increased to some extent, the rate of change in resistance is not significantly decreased, and the upper surfaces of the hard bias layers, which can improve the sensitivity of the spin-valve thin film element, are preferably joined to the sides of the lamination at positions between the upper and lower surfaces of the second free magnetic layer.

The single spin-valve thin film element may be a bottom type in which the antiferromagneic layer, the pinned magnetic layer, and the nonmagnetic conductive layer, and the free magnetic layer are laminated in this order from the substrate side.

In this spin-valve thin film element, it is possible to increase the ratio of the sensing current supplied to the lamination without through the antiferromagnetic layer having high resistivity, and decrease the shunt components of the sensing current which flow directly into portions near the pinned magnetic layer, the nonmagnetic conductive layer and the free magnetic layer, which are formed below the antiferromagnetic layer, through the hard bias layers, as compared with a top type in which the free magnetic layer, the nonmagnetic conductive layer, the pinned magnetic layer, and the antiferromagnetic layer are laminated in this order from the substrate side. It is thus possible to prevent side reading, and further comply with high-density magnetic recording.

In order to achieve the objects, the present invention provides a method of manufacturing a spin-valve thin film element comprising the steps of forming, on a substrate, layered films comprising at least an antiferromagnetic layer, a pinned magnetic layer formed in contact with the antiferromagnetic layer so that the magnetization direction is fixed by an exchange coupling magnetic field with the antiferromagnetic layer, and a free magnetic layer formed on the pinned magnetic layer with a nonmagnetic conductive layer provided therebetween; forming lift off resist on the layered films; removing portions not covered with the lift off resist by ion milling to form a trapezoidal lamination; forming hard bias layers on both sides of the lamination by any one sputtering method of an ion beam sputtering method, a long throw sputtering method, and a collimation sputtering method, or a combination thereof so that they are arranged in the same layer level as the free magnetic layer, and the upper surfaces of the hard bias layers are joined to the sides of the lamination at positions lower than the upper edges of the sides of the lamination; and forming conductive layers on the hard bias layers with a target inclined at an angle with the substrate by any one sputtering method of an ion beam sputtering method, a long throw sputtering method, and a collimation sputtering method, or a combination thereof.

The method of manufacturing a spin-valve thin film element can easily obtain the above-described spin-valve thin film element.

In order to achieve the objects, the present invention also provides a method of manufacturing a spin-valve thin film element comprising the steps of forming layered films comprising at least an antiferromagnetic layer, a pinned magnetic layer formed in contact with the antiferromagnetic layer so that the magnetization direction is fixed by an exchange coupling magnetic field with the antiferromagnetic layer, and a free magnetic layer formed on the pinned magnetic layer with a nonmagnetic conductive layer provided therebetween; forming, on the layered films, lift off resist in which notch portions are formed in the lower surface; removing portions not covered with the lift off resist by ion milling to form a trapezoidal lamination; forming hard bias layers on both sides of the lamination by any one sputtering method of an ion beam sputtering method, a long throw sputtering method, and a collimation sputtering method, or a combination thereof so that they are arranged in the same layer level as the free magnetic layer, and the upper surfaces of the hard bias layers are joined to the sides of the lamination at positions lower than the upper edges of the sides of the lamination; and forming conductive layers on the hard bias layers and the portions of the lamination corresponding to the notch portions of the lift off resist with a target inclined at an angle with the substrate by any one sputtering method of an ion beam sputtering method, a long throw sputtering method, and a collimation sputtering method, or a combination thereof.

In the method of manufacturing a spin-valve thin film element, the resist step of forming once the lift off resist having the cur portion formed therein on the layered films permits the formation of a resist pattern, etching of the lamination by ion milling, and the formation of the hard bias layers and the conductive layers in desired shapes by any one sputtering method of an ion beam sputtering method, a long throw sputtering method, and a collimation sputtering method, or a combination thereof, in which the target is selectively opposed to the substrate in either of a noninclined or inclined state with the set inclination angle, to obtain the above-described spin-valve thin film element.

In this method, the width dimension of each of the notch portions, i.e., the width dimension of each of the notch portions which do not contact the lamination, in the sideward direction of the lamination, i.e., the dimension in the track width direction, can be set relative to the width dimension of the lift off photoresist in the sideward direction of the lamination to set the length dimension of each of the overlay portions of the conductive layers which are formed in the notch portions to extent toward the center of the surface of the lamination from the both sides thereof.

Therefore, one formation of the photoresist (lift off photoresist) enables the formation of the lamination, the hard bias layers, and the conductive layers in desired shapes, and the hard bias layers and the conductive layers can be formed in desired shapes by the sputtering in which the target is selectively opposed to the substrate in either of the noninclined or inclined state. Thus the spin-valve thin film element can easily be obtained by a small number of steps.

In order to achieve the objects, the present invention also provides a method of manufacturing a spin-valve thin film element comprising the steps of forming, on a substrate, layered films comprising at least an antiferromagnetic layer, a pinned magnetic layer formed in contact with the antiferromagnetic layer so that the magnetization direction is fixed by an exchange coupling magnetic field with the antiferromagnetic layer, and a free magnetic layer formed on the pinned magnetic layer with a nonmagnetic conductive layer provided therebetween; forming, on the layered films, first lift off resist in which notch portions are formed in the lower surface opposing the layered films; removing portions not covered with the first lift off resist by ion milling to form a trapezoidal lamination; forming hard bias layers on both sides of the lamination by any one sputtering method of an ion beam sputtering method, a long throw sputtering method, and a collimation sputtering method, or a combination thereof so that they are arranged in the same layer level as the free magnetic layer, and the upper surfaces of the hard bias layers are joined to the sides of the lamination at positions lower than the upper edges of the sides of the lamination; separating the first lift off resist; forming second lift off resist in which the sideward dimension of a portion in contact with the layered films is smaller than that of the first lift off resist, and notch portions are formed in the lower surface opposing the layered films; and forming conductive layers the portions not covered with the second lift off resist by any one sputtering method of an ion beam sputtering method, a long throw sputtering method, and a collimation sputtering method, or a combination thereof.

In the method of manufacturing a spin-valve thin film element, the two resist steps of respectively forming the two types of lift off resist having the cur portions formed therein and having different width dimensions on the layered films permit the formation of the lamination and the hard bias layers, and the formation of the conductive layers in. desired shapes by any one sputtering method of an ion beam sputtering method, a long throw sputtering method, and a collimation sputtering method, or a combination thereof, in which the target is selectively opposed to the substrate in either of a noninclined or inclined state, to obtain the above-described spin-valve thin film element.

In this method, the dimension of each of the notch portions of the first lift off resist in the track width direction, i.e., the width dimension of each of the notch potions which do not contact the lamination, in the sideward direction of the lamination can be set relative to the width dimension of the lift off photoresist in the sideward direction of the lamination, i.e., the dimension in the track width, and the incidence angle of an ion beam for ion milling can be set to set the dimension of the lamination in the direction of the track width, and the shape of the hard bias layers. Similarly, the dimension of the second lift off resist in the direction of the track width can be set to set the length dimension of the overlay portions of the conductive layers which are formed to extent toward the center of the surface of the lamination from the both sides thereof.

The manufacturing method may further comprise the steps of removing portions of the surface of the lamination corresponding to the notch portions of the first lift off resist or the second lift off resist by ion milling or reverse sputtering after the step of forming the hard bias layers. This permits cleaning of the protecting layer as the uppermost layer and the backed layer by ion milling or reverse sputtering to achieve sufficient connection between electrode layers and the backed layer, thereby decreasing contact resistance.

In the method of manufacturing a spin-valve thin film element, the step of forming the lamination preferably comprises forming the backed layer made of a nonmagnetic conductive material on the side of the free magnetic layer opposite to the nonmagnetic conductive layer side.

In order to achieve the objects, the present invention further provides a thin film magnetic head comprising the above-described spin-valve thin film element.

This thin film magnetic head enables sufficient control of the magnetic domain of the free magnetic layer, and exhibits excellent stability.

BRIEF DESCRIPTION OF THE DRAWINGS

FIG. 6 is a sectional view showing the structure of a spin-valve thin film element in accordance with a second embodiment of the present invention as viewed from the side opposing a recording medium;

FIG. 13 is a cross-sectional view schematically showing a spin-valve thin film element in accordance with a sixth embodiment of the present invention;

FIGS. 40(a)–40(c) are drawings illustrating the phenomenon that contribution of a sensing current magnetic field $H_s$ to variable magnetization $M_f$ of a free magnetic layer is decreased by a backed layer of a spin-valve thin film element, in which FIG. 40A is a cross-sectional view taken along a line perpendicular to the side (ABS side) opposing a medium, showing an example of a spin-valve thin film element comprising no backed, and FIG. 4B is a cross-sectional view taken along a line perpendicular to the side (ABS side) opposing a medium, showing an example of a spin-valve thin film element in accordance with an embodiment of the present invention;

DESCRIPTION OF THE PREFERRED EMBODIMENT

Spin-valve thin film elements in accordance with embodiments of the present invention will be described in detail below with reference to the drawings.

First Embodiment

Figure 1:
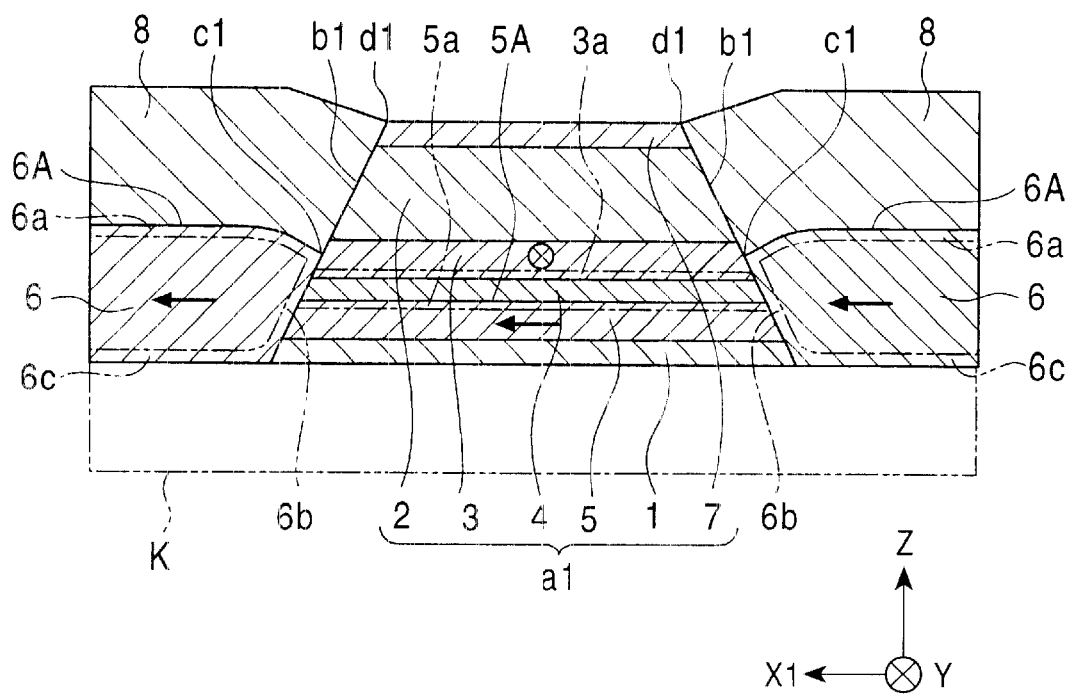
FIG. 1 is a sectional view showing the structure of a spin-valve thin film element in accordance with a first embodiment of the present invention as viewed from the side opposing a recording medium.

FIG. 1 is a sectional view showing the structure of a spin-valve thin film element in accordance with a first embodiment of the present invention as viewed from the side opposing a recording medium.

Figure 18:
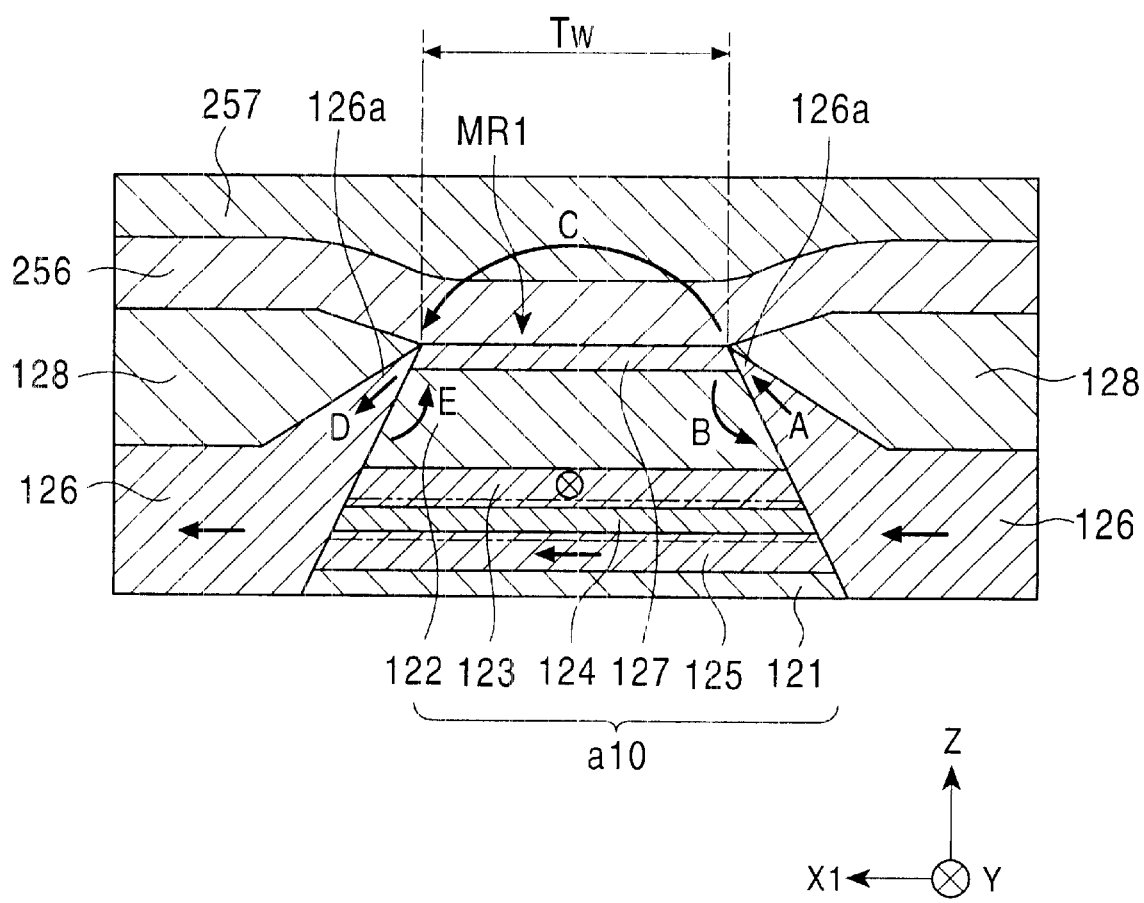
FIG. 18 is a sectional view showing the structure of a principal portion of a thin film magnetic head comprising a conventional spin-valve thin film element as viewed from the side opposing a recording medium.

The spin-valve thin film element of the present invention is different from the conventional spin-valve thin film element MR1 shown in FIG. 18 in the shapes of the hard bias layers and conductive layers.

In the spin-valve thin film element of this embodiment, a magnetic recording medium such as a hard disk or the like moves in the Z direction shown in FIG. 1, and a leakage magnetic field from the magnetic recording medium is in the Y direction.

In FIG. 1, reference numeral 1 denotes a base layer provided on a substrate K and made of, for example, Ta (tantalum) or the like. A free magnetic layer 5 is formed on the base layer 1, and a nonmagnetic conductive layer 4 is further formed on the free magnetic layer 5. A pinned magnetic layer 3 is formed on the nonmagnetic conductive layer 4, and an antiferromagnetic layer 2 is further formed on the pinned magnetic layer 3. A protecting layer 7 made of Ta or the like is formed on the antiferromagnetic layer 2 to form a lamination a1.

Reference numeral 6 denotes a hard bias layer, and reference numeral 8 denotes a conductive layer.

In the spin-valve thin film element of the first embodiment of the present invention, the antiferromagnetic layer 2 is preferably made of a PtMn alloy. The PtMn alloy exhibits excellent corrosion resistance, a high blocking temperature and a high exchange coupling magnetic field (exchange anisotropic magnetic field) as compared with NiMn alloys and FeMn alloys conventionally used for the antiferromagnetic layer 2.

The antiferromagnetic layer 2 may be made of an alloy represented by the formula X—Mn (wherein X represents one element selected from Pd, Ru, Ir, Rh, and Os), or the formula X'—Pt—Mn (wherein X' represents at least one element selected from Pd, Ru, Ir, Rh, Os, Au, Ag, Ne, Ar, Xe, and Kr) in place of the PtMn alloy.

In the PtMn alloy or the alloy represented by the formula X—Mn, the amount of Pt or X is preferably in the range of 37 to 63 atomic %, and more preferably in the range of 47 to 57 atomic %.

In the alloy represented b the formula X'—Pt—Mn, the total amount of X'+Pt is preferably in the range of 37 to 63 atomic %, and more preferably in the range of 47 to 57 atomic %. As the alloy represented by the formula X'—Pt—Mn, where X' is at least one element selected from Au, Ag, Ne, Ar, Xe, and Kr, the amount of X' is preferably in the range of 0.2 to 10 atomic %, while where X' is at least one element selected from Pd, Ru, Ir, Rh and Os, the amount of X' is preferably in the range of 0.2 to 40 atomic %.

The antiferromagnetic layer 2 producing a high exchange coupling magnetic field can be obtained by annealing an alloy having the above-described proper composition. Particularly, the PtMn alloy permits the formation of the antiferromagnetic layer 2 having an exchange coupling magnetic field of over 64 kA/m, and a high blocking temperature of 380° C. (653 K) at which the exchange coupling magnetic field is lost.

The pinned magnetic layer 3 comprises a ferromagnetic thin film which is preferably made of, for example, Co, a NiFe alloy, a CoNiFe alloy, a CoFe alloy, or the like.

The nonmagnetic conductive layer 4 comprises a nonmagnetic material such as Cu, Cr, Au, Ag, Ru, Ir, or the like, and is generally formed to a thickness of about 2 to 4 nm (20 to 40 Å).

The free magnetic layer 5 is preferably made of the same material as the pinned magnetic layer 3.

The hard bias layers 6 are preferably made of, for example, a Co—Pt alloy, a Co—Cr—Pt alloy, or the like.

The hard bias layers 6 are preferably formed in the same layer level as the free magnetic layer 5 to have a larger thickness than the free magnetic layer 5 in the thickness direction of the free magnetic layer 5. The upper surfaces 6A of the hard bias layers 6 are arranged at a larger distance (i.e., on the upper side of FIG. 1) from the substrate K than the upper surface 5A of the free magnetic layer 5, and the lower surfaces of the hard bias layers 6 are arranged at positions (i.e., on the lower side of FIG. 1) lower then the lower surface of the free magnetic layer 5.

The joints c1 between the upper surfaces 6A of the hard bias layers 6 and the sides b1 of the lamination a1 are preferably arranged at positions (i.e., on the lower side of FIG. 1) lower than the upper edges d1 of the sides b1 of the lamination a1, and lower than the uppermost positions (in the embodiment shown in FIG. 1, the upper surfaces 6A of the hard bias layers 6) of the hard bias layers 6.

The conductive layers 8 are preferably made of, for example, Cr, Ta, Au, or the like. The conductive layers 8 are preferably formed on the hard bias layers 6 to be joined to the sides 1b of the lamination a1.

In the spin-valve thin film element shown in FIG. 1, the antiferromagnetic layer 2 is formed in contact with the pinned magnetic layer 3, and annealed (heat-treated) to produce an exchange coupling magnetic field (exchange anisotropic magnetic field) in the interface between the antiferromagnetic layer 2 and the pinned magnetic layer 3, thereby fixing magnetization of the pinned magnetic layer 3 in the Y direction shown in FIG. 1, for example, as shown in FIG. 1.

Since the hard bias layers 6 are magnetized in the X1 direction shown in the drawing, magnetization of the free magnetic layer 5 is oriented in the X1 direction shown in the drawing. Therefore, variable magnetization of the free magnetic layer 5 crosses at an angle of 90° fixed magnetization of the pinned magnetic layer 3.

In such a spin-valve thin film element, a sensing current is supplied to the free magnetic layer 5, the nonmagnetic conductive layer 4 and the pinned magnetic layer 3 from the conductive layers 8. When a magnetic field is applied from a recording medium in the Y direction shown in FIG. 1, magnetization of the free magnetic layer 5 is changed from the X1 direction to the Y direction shown in the drawing. At the same time, spin-dependent conduction electron scattering occurs in the interface between the nonmagnetic conductive layer 4 and the free magnetic layer 5, and the interface between the nonmagnetic conductive layer 4 and the pinned magnetic layer 3 to change the electric resistance, thereby detecting a leakage magnetic field from the recording medium.

An example of the method of manufacturing the spin-valve thin film element shown in FIG. 1 will be described in detail below with reference to FIGS. 2 to 5.

Figure 2:
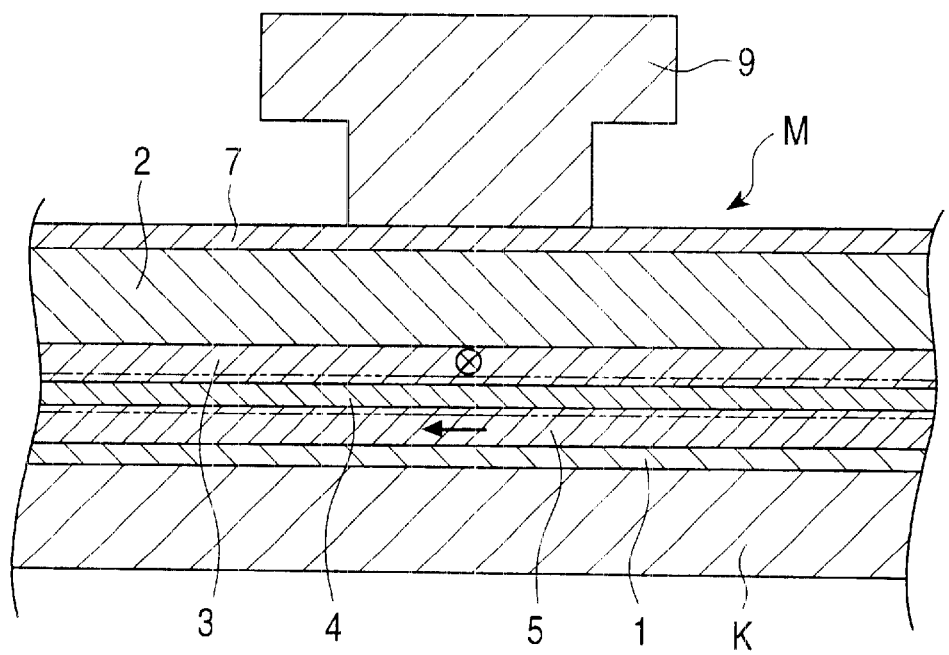
FIG. 2 is a drawing illustrating a state of the method of manufacturing the spin-valve thin film element shown in FIG. 1, in which a lamination is formed on a substrate, and lift off resist is formed on the lamination.
Figure 3:
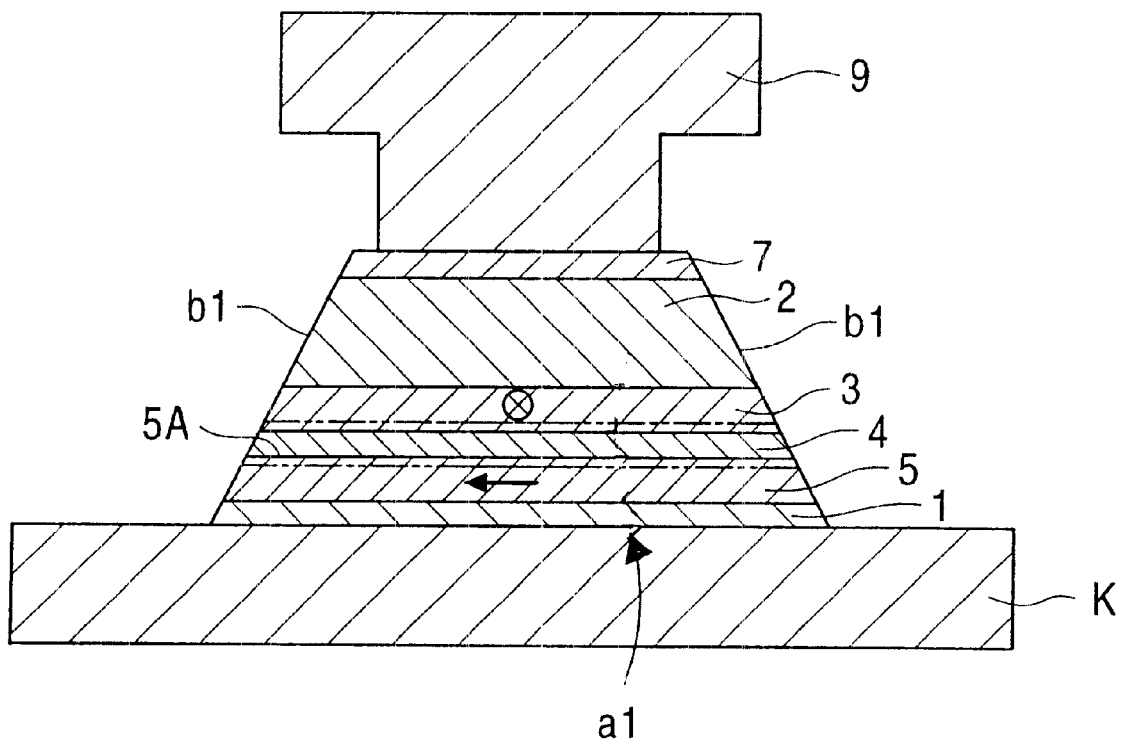
FIG. 3 is a drawing illustrating a state of the method of manufacturing the spin-valve thin film element shown in FIG. 1, in which the lamination is formed in a trapezoidal shape.

As shown in FIG. 2, first, in order to form the lamination a1, the base layer 1, the free magnetic layer 5, the nonmagnetic conductive layer 4, the pinned magnetic layer 3, the antiferromagnetic layer 2, and the protecting layer 7 are deposited in turn on the substrate K to form layered films M, and then lift off resist 9 is formed on the layered films M. Next, portions of the layered films M, which are not covered with the lift off resist 9, are removed by ion milling to the lamination a1 having a trapezoidal shape having inclined surfaces as the sides 1b, as shown in FIG. 3.

Figure 4:
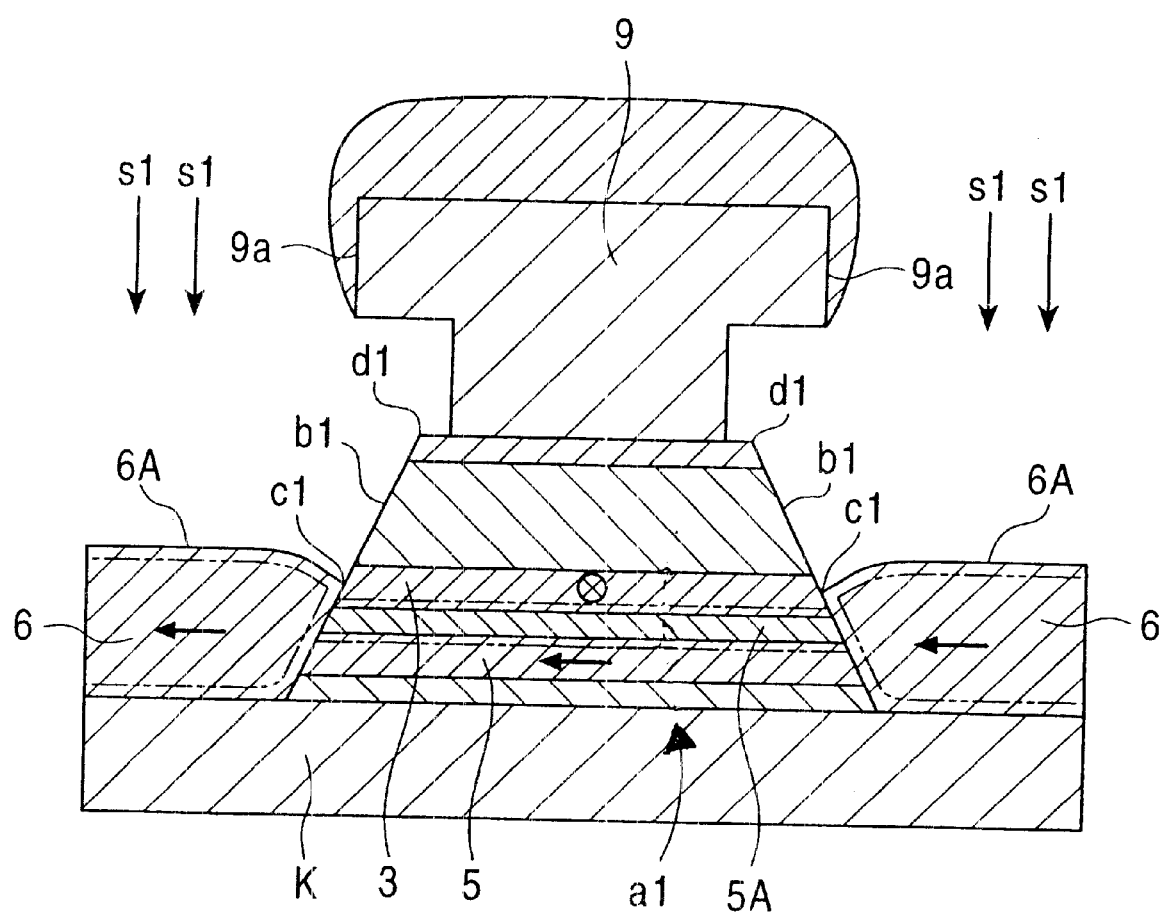
FIG. 4 is a drawing illustrating a state of the method of manufacturing the spin-valve thin film element shown in FIG. 1, in which hard bias layers are formed.

Next, the hard bias layers 6 are formed on both sides of the lamination a1 in the same layer level as the free magnetic layer 5 so that the upper surfaces 6A of the hard bias layers 6 are joined to the sides b1 of the lamination a1 at positions lower than the upper edges d1 of the sides b1 of the lamination a1, as shown in FIG. 4.

At this time, the hard bias layers 6 are preferably formed to a larger thickness than the thickness of the free magnetic layer 5 in the thickness direction of the free magnetic layer 5. In addition, preferably, the upper surfaces 6A of the hard bias layers 6 are arranged at positions higher than the upper surface 5A of the free magnetic layer 5 (i.e., on the upper side of FIG. 1) above the substrate K, and the lower surfaces of the hard bias layers 6 are arranged at positions lower than the lower surface of the free magnetic layer 5 (i.e., on the lower side of FIG. 1) above the substrate K. Furthermore, the joints c1 between the upper surfaces 6A of the hard bias layers 6 and the sides b1 are preferably arranged at positions lower than the uppermost positions (in FIG. 4, the upper surfaces 6A) of the hard bias layers 6.

In this manufacturing method, the lift off resist 9 is preferably formed by a two layer resist method, an image reverse method, or the like.

The hard bias layers 6 can be formed by a sputtering process. In order to form the hard bias layers 6 substantially in parallel with the free magnetic layer 5, preferably, a target is opposed to the substrate K substantially in parallel with each other, and the hard bias layers 6 are formed by a method having a narrow angular distribution of sputtered particles s1 and excellent linearity.

As shown in FIG. 4, the hard bias layers 6 are formed by the sputtered particles s1 of sputtered particles, which are not cut off by the lift off resist 9. If the sputtered particles s1 have a narrow angular distribution and good linearity, the sputtered particles s1 little enter the portion inward of the positions directly below the edges 9a of the lift off resist 9. This causes the joints c1 between the upper surfaces 6A of the hard bias layers 6 and the sides b1 of the lamination a1 to be arranged at positions below the uppermost position (in FIG. 4, the upper surfaces 6A) of the hard bias layers 6. Also the joints c1 are arranged at position below the upper edges d1 of the sides b1 of the lamination a1. Therefore, the positions of the joints c1 are determined by the positions of the edges 9a of the lift off resist 9, and the angular distribution and linearity of the sputtered particles s1.

More specifically, the hard bias layers 6 are preferably formed by, for example, any one of an ion beam sputtering process, a long throw sputtering process, and a collimation sputtering method, or a combination thereof.

Figure 5:
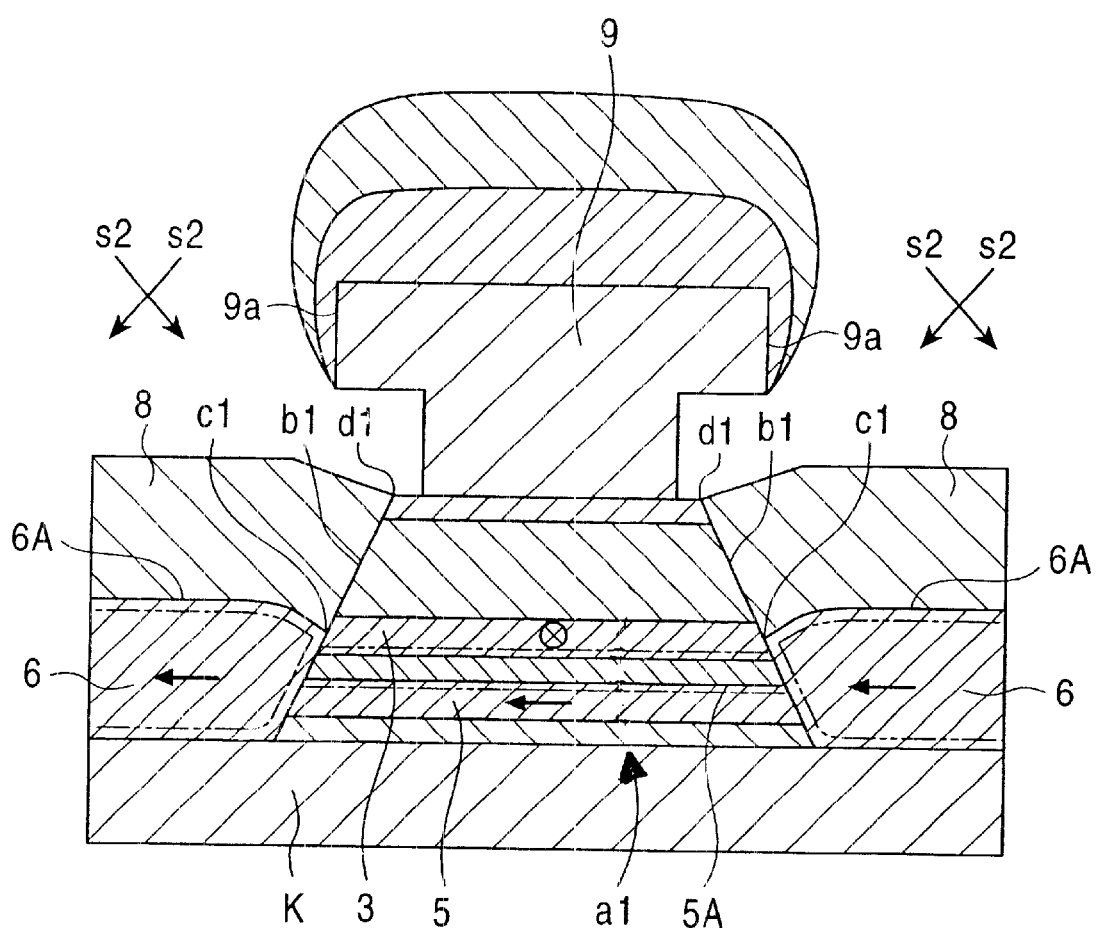
FIG. 5 is a drawing illustrating a state of the method of manufacturing the spin-valve thin film element shown in FIG. 1, in which conductive layers are formed.

Then, as shown in FIG. 5, the conductive layers 8 are formed on the hard bias layers 6 so as to be joined to the sides b1 of the lamination a1.

In order to form the conductive layers 8 to join then to the sides b1 of the lamination a1, the conductive layers 8 are preferably formed by, for example, any one of an ion beam sputtering process, a long throw sputtering process, and a collimation sputtering method, or a combination thereof using a target opposed at an angle with the substrate K. The conductive layers 8 are also preferably formed by a conventional sputtering process having a wide angular distribution.

As shown in FIG. 5, the conductive layers 8 are formed by sputtered particles s2 of the sputtered particles, which are not cut off by the lift off resist 9. At this sputtering, the target is opposed to the substrate K obliquely at an angle with the substrate K, or the sputtered particles s2 have a wide angular distribution so that many sputtered particles s2 enters the portion inward of the positions directly below the edges 9a of the lift off resist 9. This permits the formation of the conductive layers 8 which are joined to the sides b1 of the lamination a1.

Then, the lift off resist 9 is removed to obtain the spin-valve thin film element shown in FIG. 1.

In the spin-valve thin film element, the upper surfaces 6A of the hard bias layers 6 are joined to the sides b1 of the lamination at positions lower than the upper edges d1 of the sides b1 of the lamination a1. Unlike in the structure shown in FIG. 18, the spin-valve thin film element does not have the ends 126a having a pointed sectional shape and joined to the upper edges of the sides of the lamination a10. Therefore, a leakage magnetic field from the hard bias layers 6 is less absorbed by the upper shielding layer to prevent a decrease in the effective magnetic field applied to the free magnetic layer 5. As a result, the free magnetic layer 5 is easily put into a single magnetic domain state, and thus the spin-valve thin film element permits sufficient control of the magnetic domain of the free magnetic layer 5 and has excellent stability.

Since the hard bias layers 6 are arranged in the same layer level as the free magnetic layer 5, a strong bias magnetic field can easily be applied to the free magnetic layer 5, and the free magnetic layer 5 can easily be put into a single magnetic domain state, decreasing the occurrence of Barkhausen noise.

In the spin-valve thin film element, the upper surfaces 6A of the hard bias layers 6 are joined to the sides b1 of the lamination a1 at positions lower than the uppermost position of the hard bias layers 6. Unlike in the structure shown in FIG. 18, the spin-valve thin film element does not have the ends 126a having a pointed sectional shape and joined to the upper edges of the sides of the lamination a10. Therefore, a magnetic field less occurs near the upper edges d1 of the sides b1 of the lamination, which exerts a magnetic field in the direction opposite to the magnetization direction of the free magnetic layer 5. As a result, the free magnetic layer 5 is easily put into a single magnetic domain state, and thus the spin-valve thin film element permits further sufficient control of the magnetic domain of the free magnetic layer 5 and has excellent stability.

In addition, the hard bias layers 6 have a larger thickness than the thickness of the free magnetic layer 5 in the thickness direction of the free magnetic layer 5, and the upper surfaces 6A of the hard bias layers 6 are arranged at positions higher than the upper surface 5A of the free magnetic layer 5. Therefore, a strong bias magnetic field can easily be applied to the free magnetic layer 5, and the free magnetic layer 5 can easily be put into a single magnetic domain state, further decreasing the occurrence of Barkhausen noise.

Furthermore, since the lower surfaces of the hard bias layers 6 are arranged at positions lower than the lower surface of the free magnetic layer 5, a strong bias magnetic field can easily be applied to the free magnetic layer 5, and the free magnetic layer 5 can easily be put into a single magnetic domain state, further decreasing the occurrence of Barkhausen noise.

In the spin-valve thin film element, the antiferromagnetic layer 2 is made of an alloy represented by the formula X—Mn or X'—Pt—Mn wherein the amount of X or the total amount of X' and Pt is in the range of 37 to 63 atomic %. Therefore, the spin-valve thin film element has excellent properties such as a high exchange coupling magnetic field, a high blocking temperature, and excellent corrosion resistance, as compared with a thin film element using a NiO alloy, a FeMn alloy, a NiMn alloy, or the like, which is conventionally used for the antiferromagnetic layer 2.

The method of manufacturing the spin-valve thin film element comprises depositing in turn, on the substrate K, the base layer 1, the free magnetic layer 5, the nonmagnetic conductive layer 4, the pinned magnetic layer 3, the antiferromagnetic layer 2, and the protecting layer 7 to form the layered films M; forming the lift off resist 9 on the layered films M; removing portions of the layered films, which are not coated with the lift off resist 9, by ion milling to form the trapezoidal lamination; forming the hard bias layers 6 on both sides of the lamination a1 by any one of an ion beam sputtering process, a long throw sputtering process, and a collimation sputtering method, or a combination thereof so that the hard bias layers 6 are arranged in the same layer level as the free magnetic layer 5, and the upper surfaces 6A of the hard bias layers 6 are joined to the sides b1 of the lamination a1 at positions lower than the upper edges d1 of the sides b1 of the lamination above the substrate K; and forming the conductive layers 8 on the hard bias layers 6 by a conventional sputtering process, or any one of an ion beam sputtering process, a long throw sputtering process, and a collimation sputtering method, or a combination thereof using the target opposed to the substrate K obliquely at an angle therewith, to form the spin-valve thin film element shown in FIG. 1.

In the spin-valve thin film element of the first embodiment of the present invention, as described above, the hard bias layers 6 can be formed in the shape shown in FIG. 1. Although, the hard bias layers 6 may be formed any other shape as long as the hard bias layers 6 are arranged in the same layer level as the free magnetic layer 5, and the upper surfaces 6A of the hard bias layers 6 are joined to the sides b1 of the lamination a1 at positions lower than the upper edges d1 of the sides b1 of the lamination a1 above the substrate K.

Figure 19:
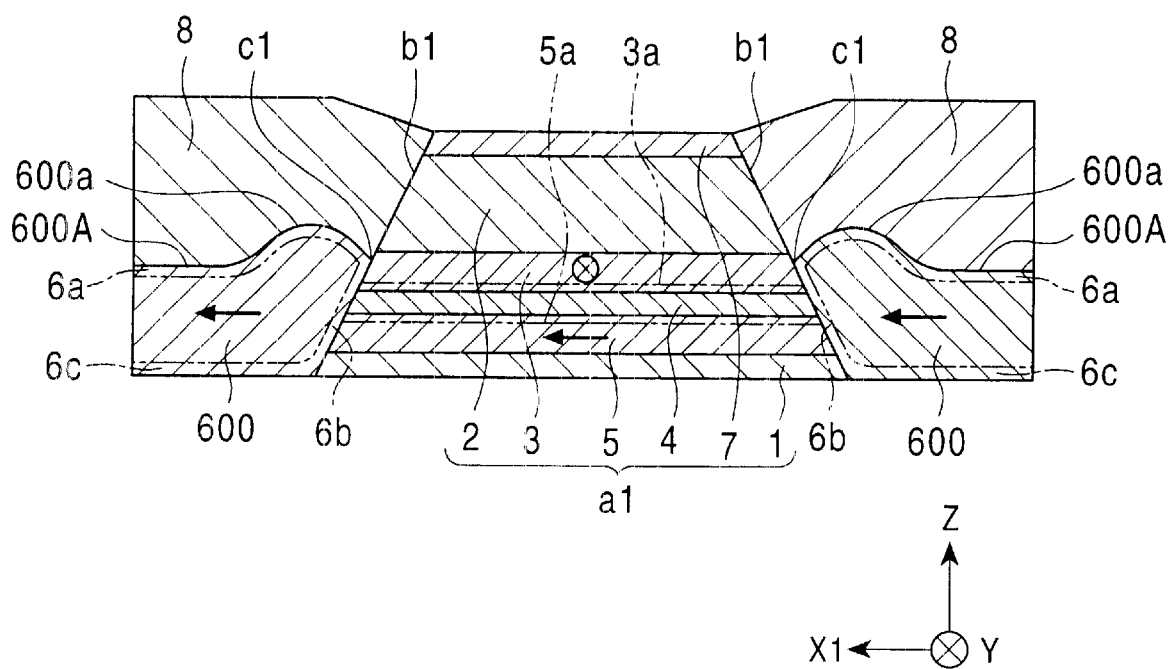
FIG. 19 is a sectional view showing the structure of a second example of the spin-valve thin film element in accordance with a first embodiment of the present invention as viewed from the side opposing a recording medium.
Figure 20:
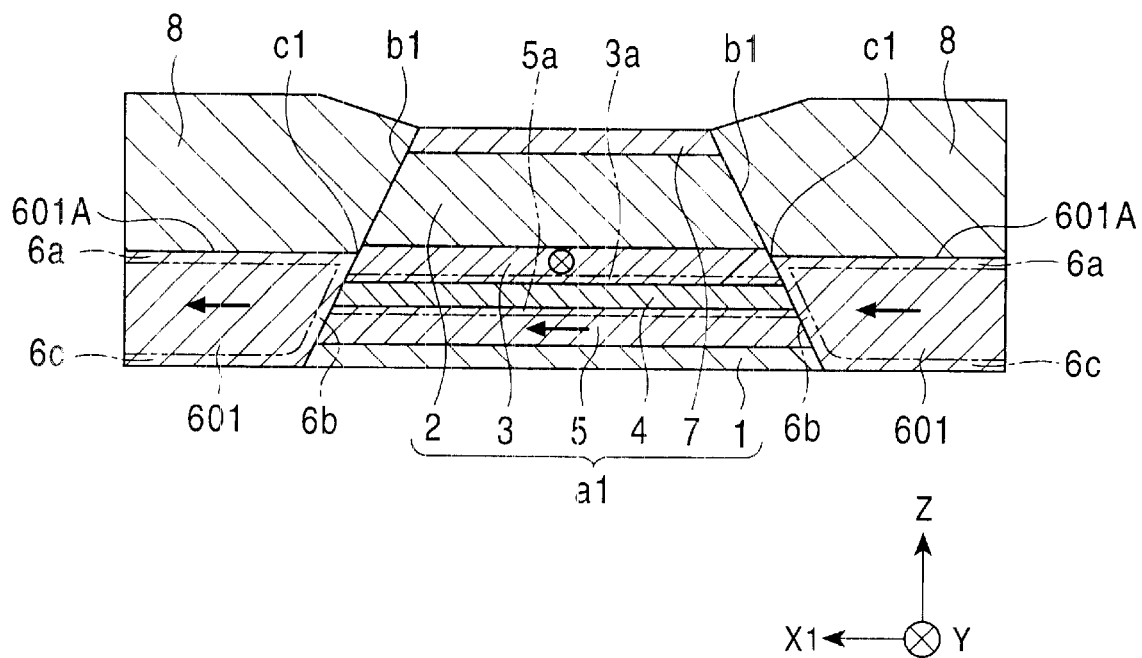
FIG. 20 is a sectional view showing the structure of a third example of the spin-valve thin film element in accordance with a first embodiment of the present invention as viewed from the side opposing a recording medium.
Figure 21:
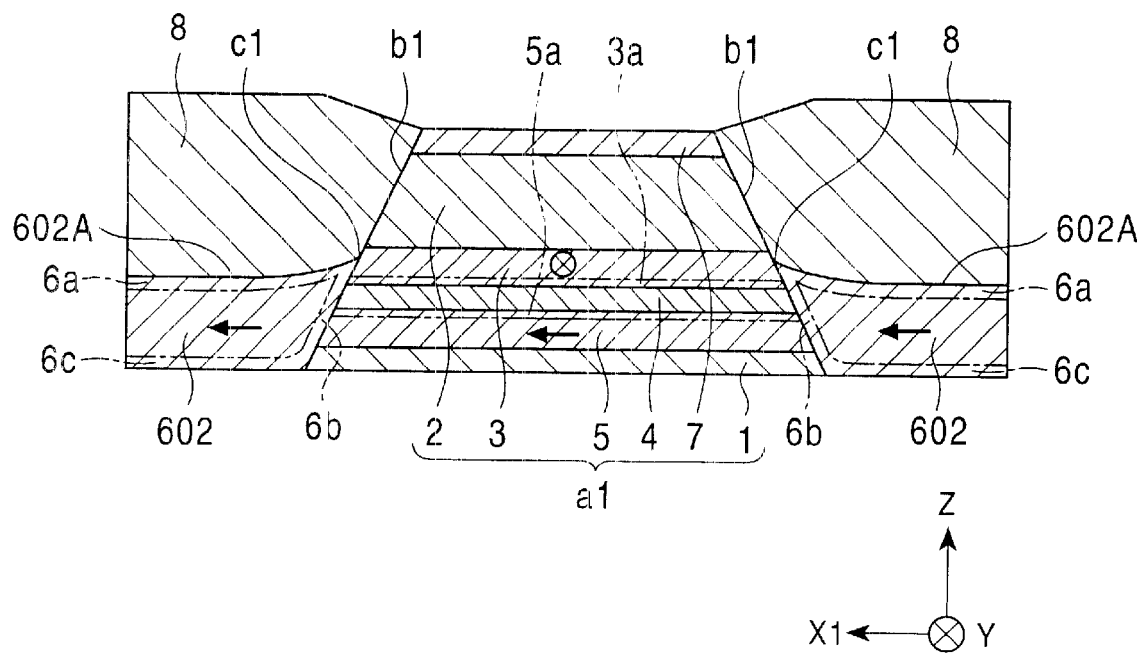
FIG. 21 is a sectional view showing the structure of a fourth example of the spin-valve thin film element in accordance with a first embodiment of the present invention as viewed from the side opposing a recording medium.

For example, the hard bias layers 6 may be formed in a shape in which the upper surfaces of hard bias layers 600 have projections 600a, as shown in FIG. 19, a shape in which hard bias layers 601 have flat upper surfaces, as shown in FIG. 20, or a shape in which each of hard bias layers 602 has a section having a thickness gradually decreasing in the direction to the side b1 of the lamination a1, as shown in FIG. 21. The uppermost parts of the contact portions between the hard bias layers 602 and the lamination a1 are preferably lower than at least the uppermost surface of the lamination a1.

In the spin-valve thin film element shown in FIG. 19, in order to improve control of the magnetic domain of the free magnetic layer 5, the upper surfaces 600A of the hard bias layers 600 are joined to the sides b1 of the lamination a1 at positions lower than the uppermost positions (in the example shown in FIG. 19, the uppermost positions of the projections 600a of the hard bias layers 600.

In the spin-valve thin film element shown in FIG. 20, in order to improve control of the magnetic domain of the free magnetic layer 5, the upper surfaces 601A of the hard bias layer 601 are joined to the sides b1 of the lamination a1 at the same positions as the uppermost position (in the example shown in FIG. 20, the upper surfaces 601A) of the hard bias layers 601.

In the spin-valve thin film element of the first embodiment of the present invention, as described above, the pinned magnetic layer 3 and the free magnetic layer 5 are respectively provided in a single layer structure above and below the nonmagnetic conductive layer 4. However, each of these layers may be provided in a multilayer structure. A mechanism showing a change in giant magnetoresistance is due to spin-dependent scattering of conduction electrons which occurs in the interface between the nonmagnetic conductive layer 4 and the pinned magnetic layer 3 and the interface between the nonmagnetic conductive layer and the free magnetic layer 5. An example of layers which are combined with the nonmagnetic conductive layer 4 made of Cu or the like to exhibit large spin-dependent scattering is a Co layer. Therefore, with the pinned magnetic layer 3 comprising a material other than Co, the nonmagnetic conductive layer side-portion of the pinned magnetic layer 3 preferably comprises a thin Co layer 3a, as shown by a two-dot chain line in FIG. 1. With the free magnetic layer 5 comprising a material other than Co, like the pinned magnetic layer 3, the nonmagnetic conductive layer side-portion of the free magnetic layer 5 preferably comprises a thin Co layer 5a, as shown by a two-dot chain line in FIG. 1.

Although, in the spin-valve thin film element of the first embodiment of the present invention, as described above, each of the hard bias layers 6 and the conductive layers 8 has a single layer structure, these layers may have a multilayer structure.

In the spin-valve thin film element, intermediate layers 6a made of Ta, Cr, or the like may be respectively provided between the hard bias layers 6 and the conductive layers 8, as shown in chain lines in FIG. 1.

With the conductive layers 8 made of Cr, the intermediate layers 6a of Ta are provided to function as a diffusion barrier to a thermal process such as resist curing in the subsequent step, thereby preventing deterioration in the magnetic characteristics of the hard bias layers 6. With the conductive layers 8 made of Ta, the intermediate layers 6a of Cr are provided to exhibit the effect that body centered cubic structure Ta crystals having low resistance are easily deposited on Cr.

In the spin-valve thin film element, bias base layers 6b and 6c made of Cr may be respectively provided between the hard bias layers 6 and the lamination a1, and between the hard bias layers 6 and the substrate, as shown by chain lines in FIG. 1.

The bias base layers made of Cr having a body centered cubic crystal structure (bcc structure) are preferably provided to increase the coercive force and remanence ratio of the hard bias layers, and increase a bias magnetic field necessary for putting the free magnetic layer into a single magnetic domain state.

Second Embodiment

FIG. 6 is a sectional view showing the structure of a spin-valve thin film element in accordance with a second embodiment of the present invention as viewed from the side opposing a recording medium.

The spin-valve thin film element of the second embodiment of the present invention is a so-called dual spin-valve thin film element in which a nonmagnetic conductive layer, a pinned magnetic layer, and an antiferromagnetic layer are formed above and below a free magnetic layer as a center.

The dual spin-valve thin film element comprises two combinations of the three layers including the free magnetic layer, the nonmagnetic conductive layer and the pinned magnetic layer, and it is thus possible to expect a high rate of change in resistance ($\Delta$MR), and comply with the demand for higher density recording.

In the spin-valve thin film element shown in FIG. 6, a base layer 141, an antiferromagnetic layer 142, a pinned magnetic layer (lower) 143, a nonmagnetic conductive layer 144, a free magnetic layer 145, a nonmagnetic conductive layer 146, a pinned magnetic layer (upper) 147, an antiferromagnetic layer 148, and a protecting layer 149 are deposited in turn on a substrate (not shown) from below. As shown in FIG. 3, hard bias layers 132 and conductive layers 133 are formed on both sides of a lamination a2 ranging from the base layer 141 to the protecting layer 149.

The hard bias layers 132 are magnetized in the X1 direction shown in FIG. 6 so that magnetization of the free magnetic layer 145 is oriented in the X1 direction.

In the spin-valve thin film element of the second embodiment of the present invention, the constituent materials of the base layer 141, the free magnetic layer 145, the nonmagnetic conductive layers 144 and 146, the pinned magnetic layers 143 and 147, the hard bias layers 132, the protecting layer 149, and the conductive layers 133 are the same as the spin-valve thin film element of the first embodiment.

Each of the antiferromagnetic layers 142 and 148 is preferably made of a PtMn alloy. The PtMn alloy exhibits excellent corrosion resistance, a high blocking temperature and a high exchange coupling magnetic field (exchange anisotropic magnetic field) as compared with NiMn alloys and FeMn alloys conventionally used for antiferromagnetic layers.

The antiferromagnetic layers may be made of an alloy represented by the formula X—Mn (wherein X represents one element selected from Pd, Ru, Ir, Rh, and Os), or the formula X'—Pt—Mn (wherein X' represents at least one element selected from Pd, Ru, Ir, Rh, Os, Au, Ag, Ne, Ar, Xe, and Kr) in place of the PtMn alloy.

The hard bias layers 132 are preferably formed in the same layer level as the free magnetic layer 145 to have a larger thickness than the free magnetic layer 145 in the thickness direction of the free magnetic layer 145. The upper surfaces 132A of the hard bias layers 132 are arranged at a larger distance from the substrate K than the upper surface of the free magnetic layer 145, and the lower surfaces of the hard bias layers 132 are arranged at positions lower then the lower surface of the free magnetic layer 145 above the substrate.

The joints c2 between the upper surfaces 132A of the hard bias layers 132 and the sides b2 of the lamination a2 are preferably arranged at positions lower than the upper edges d2 of the sides b2 of the lamination a2, and lower than the uppermost positions of the hard bias layers 132.

The conductive layers 133 are preferably formed on the hard bias layers 132 to be joined to the sides b2 of the lamination a2 so that the upper surfaces 132A of the hard bias layers 132 are arranged at positions lower than the uppermost surface of the lamination a2.

In the spin-valve thin film element of the second embodiment of the present invention, the upper surfaces 132A of the hard bias layers 132 are joined to the sides b2 of the lamination a2 at positions lower than the upper edges d2 of the sides b2 of the lamination a2. Unlike in the structure shown in FIG. 18, the spin-valve thin film element does not have the ends 126a having a pointed sectional shape and joined to the upper edges of the sides of the lamination a10. Therefore, a leakage magnetic field from the hard bias layers 132 is less absorbed by the upper shielding layer to suppress a decrease in the effective magnetic field applied to the free magnetic layer 145. As a result, the free magnetic layer 145 is easily put into a single magnetic domain state, and thus the spin-valve thin film element permits sufficient control of the magnetic domain of the free magnetic layer 145 and has excellent stability.

Since the hard bias layers 132 are arranged in the same layer level as the free magnetic layer 145, a strong bias magnetic field can easily be applied to the free magnetic layer 145, and the free magnetic layer 145 can easily be put into a single magnetic domain state, decreasing the occurrence of Barkhausen noise.

In the spin-valve thin film element, the upper surfaces 132A of the hard bias layers 132 are joined to the sides b2 of the lamination a2 at positions lower than the uppermost positions of the hard bias layers 132. Unlike in the structure shown in FIG. 18, the spin-valve thin film element does not have the ends 126a having a pointed sectional shape and joined to the upper edges of the sides of the lamination a10. Therefore, a magnetic field less occurs near the upper edges d2 of the sides b2 of the lamination a2, which exerts a magnetic field in the direction opposite to the magnetization direction of the free magnetic layer 145. As a result, the free magnetic layer 145 is easily put into a single magnetic domain state, and thus the spin-valve thin film element permits further sufficient control of the magnetic domain of the free magnetic layer 145 and has excellent stability.

In addition, the hard bias layers 132 have a larger thickness than the thickness of the free magnetic layer 145 in the thickness direction of the free magnetic layer 145, and the upper surfaces 132A of the hard bias layers 132 are arranged at positions higher than the upper surface of the free magnetic layer 145. Therefore, a strong bias magnetic field can easily be applied to the free magnetic layer 145, and the free magnetic layer 145 can easily be put into a single magnetic domain state, further decreasing the occurrence of Barkhausen noise.

Furthermore, since the lower surfaces of the hard bias layers 132 are arranged at positions lower than the lower surface of the free magnetic layer 145 above the substrate, a stronger bias magnetic field can easily be applied to the free magnetic layer 145, and the free magnetic layer 145 can easily be put into a single magnetic domain state, further decreasing the occurrence of Barkhausen noise.

Third Embodiment

Figure 7:
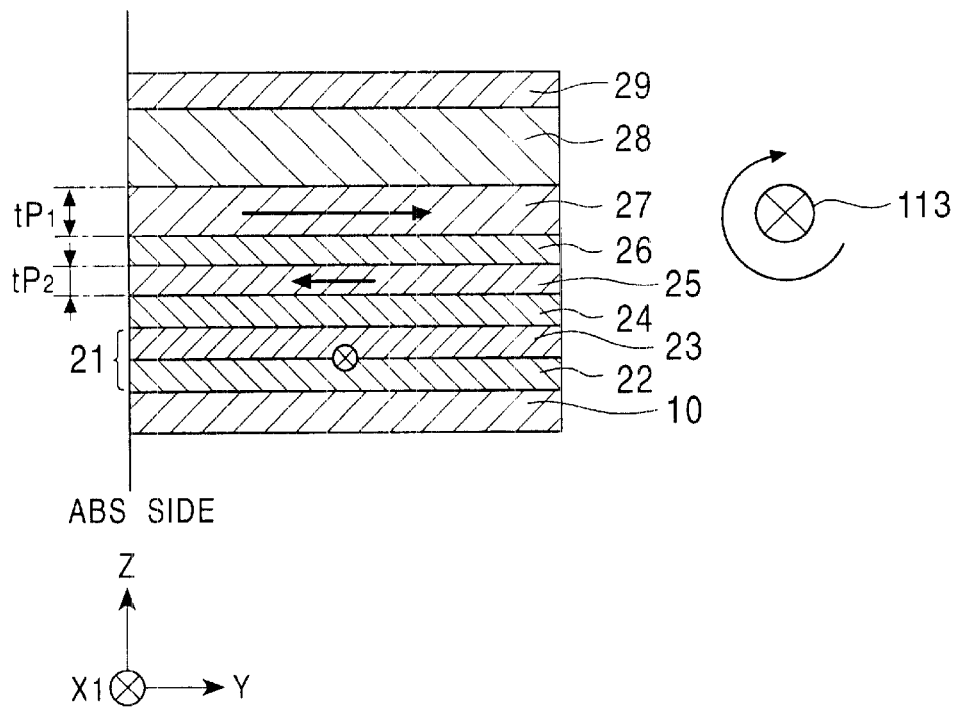
FIG. 7 is a cross-sectional view schematically showing a spin-valve thin film element in accordance with a third embodiment of the present invention.
Figure 8:
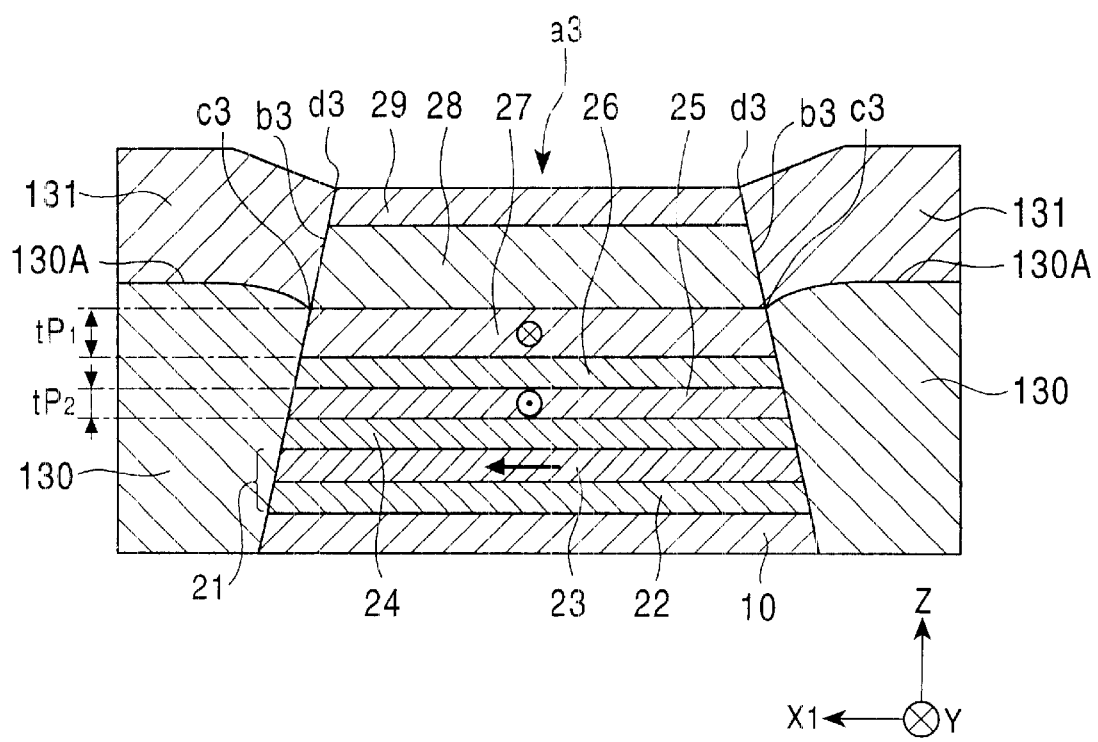
FIG. 8 is a sectional view showing the structure of the spin-valve thin film shown in FIG. 7 as viewed from the side opposing a recording medium.

FIG. 7 is a cross-sectional view schematically showing a spin-valve thin film element in accordance with a third embodiment of the present invention, and FIG. 8 is a sectional view showing the structure of the spin-valve thin film element shown in FIG. 7 as viewed from the side opposing a recording medium.

The spin-valve thin film magnetic element of this embodiment is a so-called top type single spin valve thin film element in which each of an antiferromagnetic layer, a pinned magnetic layer, a nonmagnetic conductive layer, and a free magnetic layer is formed in a single layer.

Namely, in the spin-valve thin film element shown in FIGS. 7 and 8, a base layer 10 made of a nonmagnetic material such as Ta or the like, a NiFe film 22 and a Co film 23 (which constitute a free magnetic layer 21), a nonmagnetic conductive layer 24, a second pinned magnetic layer 25, a nonmagnetic intermediate layer 26, a first pinned magnetic layer 27, an antiferromagnetic layer 28, and a protecting layer 29 made of Ta or the like are deposited in turn on a substrate (not shown) from below.

Each of the first and second pinned magnetic layers 27 and 25 comprises, for example, a Co film, a NiFe alloy film, a CoNiFe alloy film, a CoFe alloy film, or the like.

In the spin-valve thin film element of the third embodiment of the present invention, the antiferromagnetic layer 28 is preferably made of a PtMn alloy. The PtMn alloy has excellent corrosion resistance, a high blocking temperature, and a high exchange coupling magnetic field (exchange anisotropic magnetic field), as compared with NiMn alloys and FeMn alloys conventionally used for antiferromagnetic layers.

The antiferromagnetic layer 28 may be made of an alloy represented by the formula X—Mn (wherein X is one element of Pd, Ru, Ir, Rh, and Os), or the formula Pt—Mn—X' (wherein X' is at least one element of Pd, Ru, Ir, Rh, Os, Au, Ag, Ne, Ar, Xe, and Kr) in place of the PtMn alloy.

In FIG. 7, an arrow shown in each of the first and second pinned magnetic layers 27 and 25 indicates the magnitude and direction of magnetic moment. The magnitude of the magnetic moment is determined by the product of saturation magnetization (Ms) and the thickness (t).

The first and second pinned magnetic layers 27 and 25 shown in FIGS. 7 and 8 comprise the same material, and the thickness $tP_1$ of the first pinned magnetic layer 27 is larger than the thickness $tP_2$ of the second pinned magnetic layer 25. Therefore, the magnetic moment of the first pinned magnetic layer 27 is larger than the second pinned magnetic layer 25.

In addition, the first and second pinned magnetic layers 27 and 25 preferably have different magnetic moments, and thus the thickness $tP_2$ of the second pinned magnetic layer 25 may be larger than the thickness $tP_1$ of the first pinned magnetic layer 27.

As shown in FIGS. 7 and 8, the first pinned magnetic layer 27 is magnetized in the Y direction, i.e., in the direction (height direction) away from the recording medium, and the second pinned magnetic layer 25 opposed to the first pinned magnetic layer 27 with the nonmagnetic intermediate layer 26 therebetween is magnetized in the direction antiparallel (ferrimagnetic state) to the magnetization direction of the first pinned magnetic layer 27.

The first pinned magnetic layer 25 is formed in contact with the antiferromagnetic layer 28, and is annealed (heat-treated) in a magnetic field to produce an exchange coupling magnetic field (exchange anisotropic magnetic field) in the interface between the first pinned magnetic layer 27 and the antiferromagnetic layer 28, fixing magnetization of the first pinned magnetic layer 27 in the Y direction as shown in FIGS. 7 and 8. When the magnetization of the first pinned magnetic layer 27 is fixed in the Y direction, magnetization of the second pinned magnetic layer 25 opposed to the first pinned magnetic layer 27 with the nonmagnetic intermediate layer 26 formed therebetween is fixed in the state antiparallel to the magnetization of the first pinned magnetic layer 27.

The higher the exchange coupling magnetic field, the more the magnetizations of the first and second pinned magnetic layers 27 and 25 are stably maintained in the antiparallel state. In the spin vale type thin film element of this embodiment, since the antiferromagnetic layer 28 is formed by using an alloy selected from PtMn alloys, alloys represented by the formula X—Mn, and alloys represented by the formula X'—Pt—Mn, which have a higher blocking temperature, and cause a higher exchange coupling magnetic field (exchange anisotropic magnetic field) in the interface with the first pinned magnetic layer 27, the magnetization states of the first and second pinned magnetic layers 27 and 25 can be thermally stably maintained.

As described above, in the spin-valve thin film element of this embodiment, the thickness ratio between the first and second pinned magnetic layers 27 and 25 is set in an appropriate range so that the exchange coupling magnetic field (Hex) can be increased, magnetizations of the first and second pinned magnetic layers 27 and 25 can be thermally stably maintained in the antiparallel state (ferrimagnetic state), and sufficient ΔMR (rate of resistance change) can be obtained.

Next, the nonmagnetic intermediate layer 26 interposed between the first and second pinned magnetic layers 27 and 25 shown in FIGS. 7 and 8 will be described.

In the present invention, the nonmagnetic intermediate layer 26 interposed between the first and second pinned magnetic layers 27 and 25 is preferably made of any one of Ru, Rh, Ir, Cr, Re, and Cu, or an alloy of at least two elements thereof.

As shown in FIGS. 7 and 8, the nonmagnetic conductive layer 24 made of Cu or the like is formed on the free magnetic layer 21, and the second pinned magnetic layer 25 is formed on the nonmagnetic conductive layer 24. As shown in FIGS. 7 and 8, the free magnetic layer 21 comprises two layers including a layer 23 formed on the side in contact with the nonmagnetic conductive layer 24 and comprising a Co film; the other layer 22 being made of a NiFe alloy, a CoFe alloy, or a CoNiFe alloy. The reason for forming the Co film layer 23 on the side which contacts the nonmagnetic conductive layer 24 is that it is possible to prevent diffusion of metal elements in the interface with the nonmagnetic conductive layer 24 made of Cu, and increase ΔMR (rate of resistance change).

Furthermore, as shown in FIGS. 7 and 8, hard bias layers 130 made of, for example, a Co—Pt alloy, a Co—Cr—Pt alloy, or the like, and conductive layers 131 made of Cr, Ta, Au, or the like are formed on both sides of a lamination a3 ranging from the base layer 10 to the protecting layer 29. The hard bias layers 130 are magnetized in the X1 direction shown in the drawings to orient magnetization of the free magnetic layer 21 in the X1 direction.

The hard bias layers 130 are arranged in the same layer level as the free magnetic layer 21 to have a larger thickness than the thickness of the free magnetic layer 21 in the thickness direction thereof, and the upper surfaces 130A of the hard bias layers 130 are arranged at positions more apart from the substrate than the upper surface of the free magnetic layer 21, and lower than the uppermost surface of the lamination a3.

The joints c3 between the upper surfaces 130A of the hard bias layers 130 and the sides b3 of the lamination a3 are preferably arranged at positions lower than the upper edges d3 of the sides b3 of the lamination a3 and lower than the uppermost positions of the hard bias layers 130 above the substrate.

The conductive layers 131 are preferably formed on the hard bias layers 130 to be joined to the sides b3 of the lamination a3.

In the spin-valve thin film element shown in FIGS. 7 and 8, a sensing current is supplied to the free magnetic layer 21, the nonmagnetic conductive layer 24, and the second pinned magnetic layer 25 from the conductive layers 131. When a magnetic field is applied from a recording medium in the Y direction shown in FIGS. 7 and 8, the magnetization direction of the free magnetic layer 21 is changed from the X1 direction to the Y direction shown in the drawings, and at the same time, spin-dependent conduction electron scattering occurs in the interface between the nonmagnetic conductive layer 24 and the free magnetic layer 21, and the interface between the nonmagnetic conductive layer 24 and the second pinned magnetic layer 25 to cause a change in electric resistance, thereby detecting a leakage magnetic field from the recording medium.

Actually, the sensing current also flows in the interface between the first pinned magnetic layer 27 and the nonmagnetic intermediate layer 26. The first pinned magnetic layer 27 does not concern directly ΔMR, and plays an auxiliary role for fixing the second pinned magnetic layer 25, which concerns ΔMR, in a proper direction. Therefore, the sensing current flowing to the first pinned magnetic layer 27 and the nonmagnetic intermediate layer 26 causes a shunt loss (current loss). However, the amount of the shunt loss is very small, and thus in the third embodiment embodiment, substantially the same degree of ΔMR as a conventional element can be obtained.

In the spin-valve thin film element of the third embodiment of the present invention, the upper surfaces 130A of the hard bias layers 130 are joined to the sides b3 of the lamination a3 at positions lower than the upper edges d3 of the sides b3 of the lamination a3 above the substrate. Unlike in the structure shown in FIG. 18, the spin-valve thin film element does not have the ends 126a having a pointed sectional shape and joined to the upper edges of the sides of the lamination a10. Therefore, a leakage magnetic field from the hard bias layers 130 is less absorbed by the upper shielding layer to suppress a decrease in the effective magnetic field applied to the free magnetic layer 21. As a result, the free magnetic layer 21 is easily put into a single magnetic domain state, and thus the spin-valve thin film element permits further sufficient control of the magnetic domain of the free magnetic layer 21 and has excellent stability.

In addition, since the hard bias layers 130 are arranged in the same layer level as the free magnetic layer 21, a strong bias magnetic field can easily be applied to the free magnetic layer 21, and the free magnetic layer 21 can easily be put into a single magnetic domain state, further decreasing the occurrence of Barkhausen noise.

Furthermore, in the spin-valve thin film element, the upper surfaces 130A of the hard bias layers 130 are joined to the sides b3 of the lamination a3 at positions lower than the uppermost positions of the hard bias layers 130 above the substrate. Unlike in the structure shown in FIG. 18, the spin-valve thin film element does not have the ends 126a having a pointed sectional shape and joined to the upper edges of the sides of the lamination a10. Therefore, a magnetic field little occurs near the upper edges d3 of the sides b3 of the lamination a3, which exerts a magnetic field in the direction opposite to the magnetization direction of the free magnetic layer 21. As a result, the free magnetic layer 21 is easily put into a single magnetic domain state, and thus the spin-valve thin film element permits further sufficient control of the magnetic domain of the free magnetic layer 21 and has excellent properties.

Fourth Embodiment

Figure 9:
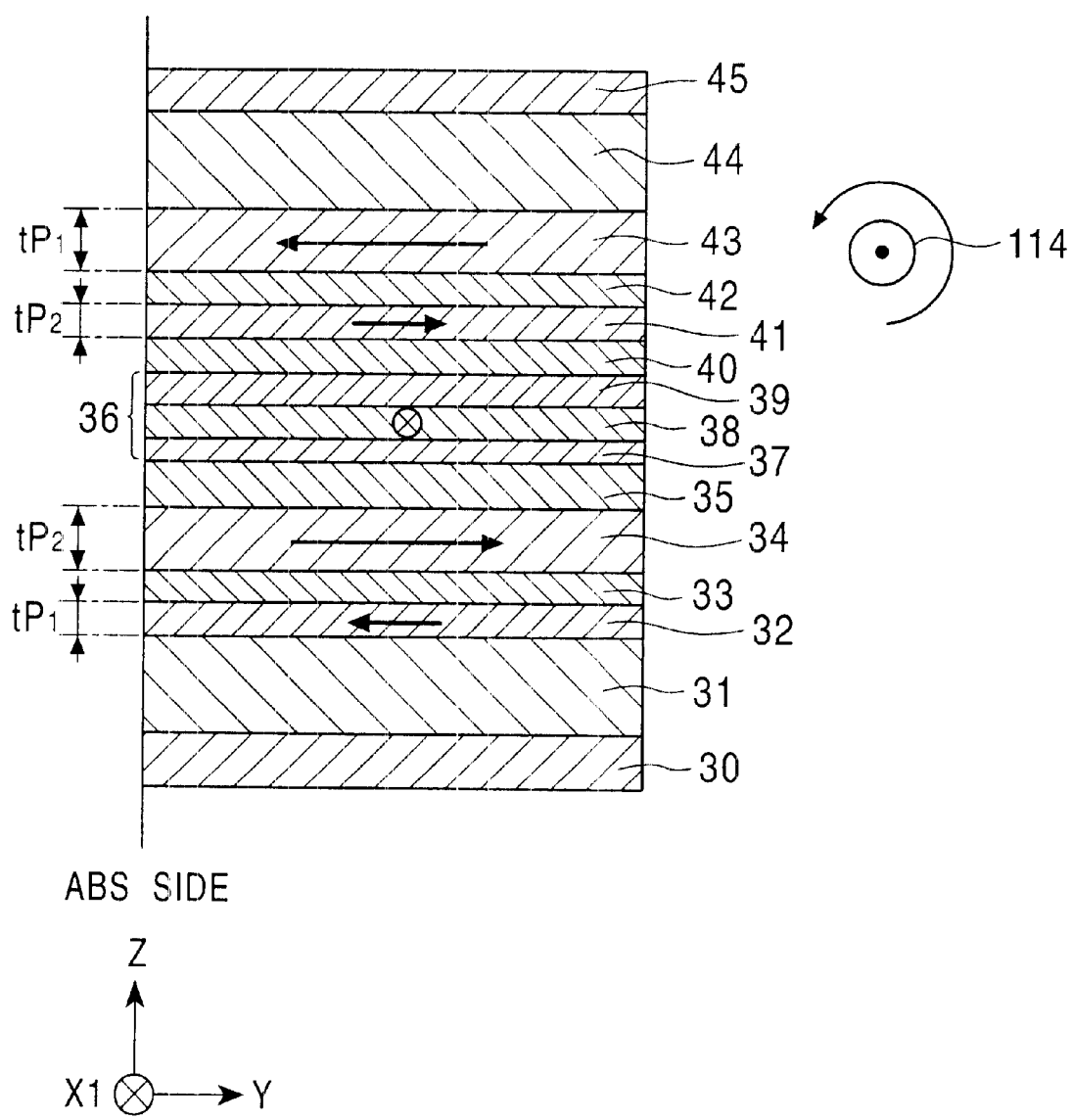
FIG. 9 is a cross-sectional view schematically showing a spin-valve thin film element in accordance with a fourth embodiment of the present invention.
Figure 10:
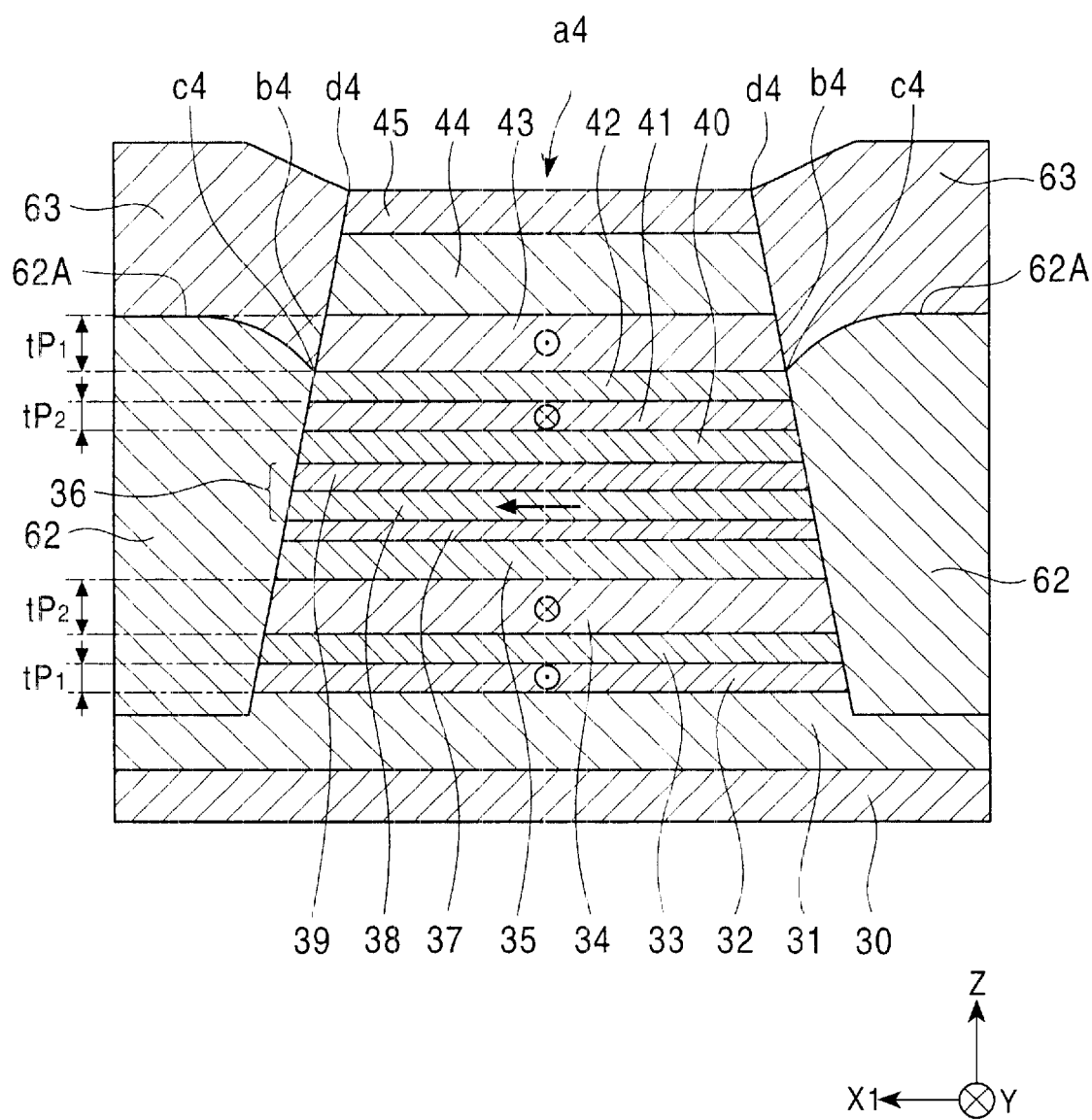
FIG. 10 is a sectional view showing the structure of the spin-valve thin film shown in FIG. 9 as viewed from the side opposing a recording medium.

FIG. 9 is a cross-sectional view schematically showing a spin-valve thin film element in accordance with a fourth embodiment of the present invention, and FIG. 10 is a sectional view showing the structure of the spin-valve thin film element shown in FIG. 9 as viewed from the side opposite to a recording medium.

The spin-valve thin film element of this embodiment is a so-called dual spin-valve thin film element in which a nonmagnetic conductive layer, a pinned magnetic layer and an antiferromagnetic layer are formed above and below a free magnetic layer as a center.

The dual spin-valve thin film element comprises two combinations of the three layers including the free magnetic layer, the nonmagnetic conductive layer and the pinned magnetic layer, and thus a high value of $\Delta$MR can be expected as compared with single spin-valve thin film magnetic elements. Therefore, it is possible to comply with the demand for high-density recording.

In the spin-valve thin film element shown in FIGS. 9 and 10, a base film 30, an antiferromagnetic layer 31, a first pinned magnetic layer (lower) 32, a nonmagnetic intermediate layer (lower) 33, a second pinned magnetic layer (lower) 34, a nonmagnetic conductive layer 35, a free magnetic layer 36 (including Co films 37 and 39, and a NiFe alloy film 38), a nonmagnetic conductive layer 40, a second pinned magnetic layer (upper) 41, a nonmagnetic intermediate layer (upper) 42, a first pinned magnetic layer (upper) 43, an antiferromagnetic layer 44, and a protecting layer 45 are laminated in this order from below.

As shown in FIG. 10, hard bias layers 62 and conductive layers 63 are formed on both sides of the lamination a4 ranging from the base film 30 to the protecting film 45.

In the spin-valve thin film element of the fourth embodiment of the present invention, each of the antiferromagnetic layers 31 and 44 is preferably made of a PtMn alloy. The PtMn alloy has excellent corrosion resistance, a high blocking temperature, and a high exchange coupling magnetic field (exchange anisotropic magnetic field), as compared with NiMn alloys and FeMn alloys conventionally used for antiferromagnetic layers.

The antiferromagnetic layers may be made of an alloy represented by the formula X—Mn (wherein X is one element selected from Pd, Ru, Ir, Rh, and Os), or the formula Pt—Mn—X' (wherein X' is at least one element selected from Pd, Ru, Ir, Rh, Os, Au, Ag, Ne, Ar, Xe, and Kr) in place of the PtMn alloy.

Each of the nonmagnetic intermediate layers 33 and 42 interposed between the first and second pinned magnetic layers (lower) 32 and 34, and between first and second pinned magnetic layers (upper) 43 and 41, respectively, is preferably made of any one of Ru, Rh, Ir, Cr, Re, and Cu, or an alloy of at least two elements thereof.

The hard bias layers 62 are arranged in the same layer level as the free magnetic layer 36 to have a larger thickness than the thickness of the free magnetic layer 36 in the thickness direction thereof. The upper surfaces 62A of the hard bias layers 62 are arranged at positions more apart from the substrate than the upper surface of the free magnetic layer 36, and the lower surfaces of the hard bias layers 62 are arranged at positions lower than the lower surface of the free magnetic layer 36 above the substrate.

The joints c4 between the upper surfaces 62A of the hard bias layers 62 and the sides b4 of the lamination a4 are preferably arranged at positions lower than the upper edges d4 of the sides b4 of the lamination a4 and lower than the uppermost positions of the hard bias layers 62 above the substrate.

The conductive layers 63 are preferably formed on the hard bias layers 62 to be joined to the sides b4 of the lamination a4.

As shown in FIGS. 9 and 10, the thickness $tP_1$ of the first pinned magnetic layer (lower) 32 formed below the free magnetic layer 36 is smaller than the thickness $tP_2$ of the second pinned magnetic layer (lower) 34 formed through the nonmagnetic intermediate layer 33. On the other hand, the thickness $tP_1$ of the first pinned magnetic layer (upper) 43 formed above the free magnetic layer 36 is larger than the thickness $tP_2$ of the second pinned magnetic layer (upper) 41 formed through the nonmagnetic intermediate layer 42. Furthermore, both the first pinned magnetic layers (lower) 32 and (upper) 43 are magnetized in the direction opposite to the Y direction shown in the drawings, and both the second pinned magnetic layers (lower) 34 and (upper) 41 are magnetized in the Y direction shown in the drawings.

In the single spin-valve thin film element of the third embodiment of the present invention shown in FIGS. 7 and 8, the thicknesses are adjusted so that $Ms \cdot tP_1$ of the first pinned magnetic layer is different from $Ms \cdot tP_2$ of the second pinned magnetic layer, while magnetization of the first pinned magnetic layer may be oriented in either of the Y direction and the direction opposite to the Y direction shown in the drawings.

However, in the dual spin-valve thin film element shown in FIGS. 9 and 10, it is necessary to orient the magnetizations of both the first pinned magnetic layers (lower) 32 and (upper) 43 in the same direction. Therefore, in this embodiment, magnetic moments $Ms \cdot tP_1$ of the first pinned magnetic layers (lower) 32 and (upper) 43, and magnetic moments $Ms \cdot tP_2$ of the second pinned magnetic layers (lower) 34 and (upper) 41 are appropriately adjusted, and the direction and magnitude of the magnetic field applied in heat treatment are appropriately controlled to achieve the satisfactory function of the dual spin-valve thin film magnetic element.

In this embodiment, the magnetizations of both the first pinned magnetic layer (lower) 32 and (upper) 43 are oriented in the same direction in order to orient the magnetizations of both the second pinned magnetic layers (lower) 34 and (upper) 41 in the same direction antiparallel to the magnetization directions of the first pinned magnetic layers (lower) 32 and (upper) 43. The reason for this will be described below.

As described above, $\Delta$MR of a spin-valve thin film element is obtained depending upon the relation between fixed magnetization of a pinned magnetic layer and variable magnetization of a free magnetic layer. As in the present invention, where the pinned magnetic layer is divided into two layers including the first and second pinned magnetic layers, the second pinned magnetic layer directly concerns the $\Delta$MR, while the first pinned magnetic layer plays an auxiliary role for fixing magnetization of the second pinned magnetic layer in a predetermined direction.

Where the magnetization directions of the second pinned magnetic layers (lower) 34 and (upper) 41 shown in FIGS. 9 and 10 are fixed in opposite directions, for example, even if the resistance is increased due to the relation between the fixed magnetization of the second pinned magnetic layer (upper) 41 and the variable magnetization of the free magnetic layer 36, the resistance is significantly decreased due to the relation between the fixed magnetization of the second pinned magnetic layer (lower) 34 and the variable magnetization of the free magnetic layer 36. As a result, ΔMR of the dual spin-valve thin film element becomes lower than ΔMR of the single spin-valve thin film element of the third embodiment of the present invention shown in FIGS. 7 and 8.

This problem is not limited to the dual spin-valve thin film element in which the pinned magnetic layer is divided into two layers with the nonmagnetic intermediate layer provided therebetween, and is true of the dual spin-valve thin film element of the second embodiment shown in FIG. 6. In order to exhibit the characteristics of the dual spin-valve thin film element capable of increasing ΔMR and obtaining high output, as compared with the single spin valve thin film element, it is necessary to fix the magnetization directions of both the pinned magnetic layers formed above and below the free magnetic layer in the same direction.

In this embodiment, in the pinned magnetic layers formed below the free magnetic layer 36, $Ms \cdot tP_2$ of the second pinned magnetic layer (lower) 34 is higher than $Ms \cdot tP_1$ of the first pinned magnetic layer (lower) 32, the magnetization of the second pinned magnetic layer (lower) 34 having higher $Ms \cdot tP_2$ being fixed in the Y direction, as shown in FIGS. 9 and 10. Furthermore, the sum of $Ms \cdot tP_2$ of the second pinned magnetic layer (lower) 34 and $Ms \cdot tP_1$ of the first pinned magnetic layer (lower) 32, i.e., synthetic magnetic moment, is determined by the magnetic moment of the second pinned magnetic layer (lower) 34 having higher $Ms \cdot tP_2$, and oriented in the Y direction shown in the drawings.

On the other hand, in the pinned magnetic layers formed above the free magnetic layer 36, $Ms \cdot tP_1$ of the first pinned magnetic layer (upper) 43 is higher than $Ms \cdot tP_2$ of the second pinned magnetic layer (upper) 41, the magnetization of the first pinned magnetic layer (upper) 43 having higher $Ms \cdot tP_1$ being fixed in the direction opposite to the Y direction. Furthermore, the sum of $Ms \cdot tP_1$ of the first pinned magnetic layer (upper) 43 and $Ms \cdot tP_2$ of the second pinned magnetic layer (upper) 41, i.e., synthetic magnetic moment, is determined by the magnetic moment of the first pinned magnetic layer (upper) 43 having higher $Ms \cdot tP_1$, and oriented in the direction opposite to the Y direction shown in the drawings.

Namely, in the dual spin-valve thin film element shown in FIGS. 9 and 10, the synthetic magnetic moment obtained by adding $Ms \cdot tP_1$ of the first pinned magnetic layer to $Ms \cdot tP_2$ of the second pinned magnetic layer is oriented in opposite directions above and below the free magnetic layer 36. Therefore, the synthetic magnetic moment in the Y direction formed below the free magnetic layer 36 and the synthetic magnetic moment in the direction opposite to the Y direction formed above the free magnetic layer 36 form a counterclockwise magnetic field as shown in the drawings.

Therefore, the magnetic field formed by the synthetic magnetic moments permits magnetizations of the first pinned magnetic layers (lower) 32 and (upper) 43, and magnetizations of the second pinned magnetic layers (lower) 34 and (upper) 41 to be maintained in a more stable ferrimagnetic state.

Furthermore, a sensing current 114 mainly flows through the nonmagnetic conductive layers 35 and 40 having low resistivity to form a sensing current magnetic field by the right-handed screw rule. However, by flowing the sensing current 114 in the direction shown in FIG. 9, the direction of the sensing current magnetic field formed by the sensing current in a portion including the first pinned magnetic layer (lower) 32, the nonmagnetic intermediate layer (lower) 33, and the second pinned magnetic layer (lower) 34, which are formed below the free magnetic layer 36, can be caused to coincide with the direction of synthetic magnetic moment of the first pinned magnetic layer (lower) 32, the nonmagnetic intermediate layer (lower) 33, and the second pinned magnetic layer (lower) 34. In addition, the direction of the sensing current magnetic field formed by the sensing current in a portion including the first pinned magnetic layer (upper) 43, the nonmagnetic intermediate layer (upper) 42, and the second pinned magnetic layer (upper) 41, which are formed above the free magnetic layer 36, can be caused to coincide with the direction of synthetic magnetic moment of the first pinned magnetic layer (upper) 43, the nonmagnetic intermediate layer (upper) 42, and the second pinned magnetic layer (upper) 41.

The merit of the coincidence between the sensing current magnetic field and the synthetic magnetic moment will be described later. In brief, there is the significant merit that the thermal stability of the pinned magnetic layers can be increased, and a large sensing current can be caused to flow to improve reproduced output.

The relation between the sensing current magnetic field and the direction of the synthetic magnetic moment is obtained due to the formation of a counterclockwise magnetic field by the synthetic magnetic moments of the pinned magnetic layers formed above and below the free magnetic layer 36.

Generally, the temperature of the element is locally increased to about 200° C. (473 K) at most due to the environmental temperature in a hard disk device and Joule heat of the sensing current flowing through the element, and tends to be further increased by increases in the rotational speed of the recording medium, the Joule heat of the sensing current, etc. in future. Such an increase in the element temperature decreases the exchange coupling magnetic field. However, in this embodiment, magnetizations of the first pinned magnetic layers (lower) 32 and (upper) 43, and magnetizations of the second pinned magnetic layers (lower) 34 and (upper) 41 can be thermally stably maintained in the ferrimagnetic state by the magnetic field formed by the synthetic magnetic moments and the sensing current magnetic field.

The formation of the magnetic field by the synthetic magnetic moments, and the directional relation between the magnetic field by the synthetic magnetic moments and the sensing current magnetic field are characteristic features of the present invention. These features cannot be attained by a conventional dual spin-valve thin film element comprising pinned magnetic layers which are respectively formed in single layers above and below a free magnetic layer, with magnetizations fixed in the same direction.

In the fourth embodiment, $Ms \cdot tP_1$ of the first pinned magnetic layer (lower) 32 formed below the free magnetic layer 36 may be higher than $Ms \cdot tP_2$ of the second pinned magnetic layer (lower) 34, and $Ms \cdot tP_1$ of the first pinned magnetic layer (upper) 43 formed above the free magnetic layer 36 may be lower than $Ms \cdot tP_2$ of the second pinned magnetic layer (upper) 41.

In this case, a magnetic field of 400 kA/m (5 kOe) or more is applied in a desired direction in which the first pinned magnetic layers (lower) 32 and (upper) 43 are magnetized, i.e., the Y direction shown in the drawings, or the direction opposite to the Y direction, to fix magnetizations of the second pinned magnetic layers (lower) 34 and (upper) 41 formed above and below the free magnetic layer 36 in the same direction, to form a clockwise or counterclockwise magnetic field by synthetic magnetic moments.

As described above, in the spin-valve thin film element shown in FIGS. 7 to 10, the pinned magnetic layer is divided into the two layers including the first and second pinned magnetic layers through the nonmagnetic intermediate layer so that magnetizations of these two pinned magnetic layers are brought into the antiparallel state (ferrimagnetic state) by the exchange coupling magnetic field (RKKY interaction) produced between the two pinned magnetic layers, to maintain the pinned magnetic layers in a thermally stable magnetization state as compared with a conventional element.

Particularly, in this embodiment, an alloy selected from PtMn alloys having a high blocking temperature and causing a high exchange coupling magnetic field (exchange anisotropic magnetic field) in the interface with the first pinned magnetic layer, alloys represented by the formula X—Mn, and alloys represented by the formula X'—Pt—Mn is used for the antiferromagnetic layer, thereby the magnetization states of the first and second pinned magnetic layers have excellent thermal stability.

In this embodiment, furthermore, the first and second pinned magnetic layers are formed to have different values of $Ms \cdot tP_1$ and $Ms \cdot tP_2$, and the magnitude and direction of the magnetic field applied during heat treatment are appropriately controlled so that the first pinned magnetic layer (and the second pinned magnetic layer) can be magnetized in the desired direction.

Particularly, in the dual spin-valve thin film element shown in FIGS. 9 and 10, $Ms \cdot tP_1$ of the fist pinned magnetic layers (lower) 32 and (upper) 43, and $Ms \cdot tP_2$ of the second pinned magnetic layers (lower) 34 and (upper) 41 are appropriately adjusted, and the magnitude and direction of the magnetic field applied during heat treatment are appropriately controlled. As a result, magnetizations of the two second pinned magnetic layers (lower) 34 and (upper) 41, which are formed above and below the free magnetic layer 36 concerning ΔMR, can be fixed in the same direction, and synthetic magnetic moments formed above and below the free magnetic layer 36 can be oriented in opposite directions. It is thus possible to form a magnetic field by the synthetic magnetic moments, form the directional relation between the magnetic field by the synthetic magnetic moments and the sensing current magnetic field, and further improve thermal stability of the magnetizations of the pinned magnetic layers.

In the spin-valve thin film element of the fourth embodiment of the present invention, the upper surfaces 62A of the hard bias layers 62 are joined to the sides b4 of the lamination a4 at positions lower than the upper edges d4 of the sides b4 of the lamination a4 above the substrate. Unlike in the structure shown in FIG. 18, the spin-valve thin film element does not have the ends 126a having a pointed sectional shape and joined to the upper edges of the sides of the lamination a10. Therefore, a leakage magnetic field from the hard bias layers 62 is less absorbed by the upper shielding layer to suppress a decrease in the effective magnetic field applied to the free magnetic layer 36. As a result, the free magnetic layer 36 is easily put into a single magnetic domain state, and thus the spin-valve thin film element permits further sufficient control of the magnetic domain of the free magnetic layer 36 and has excellent stability.

In addition, since the hard bias layers 62 are arranged in the same layer level as the free magnetic layer 36, a strong bias magnetic field can easily be applied to the free magnetic layer 36, and the free magnetic layer 36 can easily be put into a single magnetic domain state, further decreasing the occurrence of Barkhausen noise.

Furthermore, in the spin-valve thin film element, the upper surfaces 62A of the hard bias layers 62 are joined to the sides b4 of the lamination a4 at positions lower than the uppermost positions of the hard bias layers 62 above the substrate. Unlike in the structure shown in FIG. 18, the spin-valve thin film element does not have the ends 126a having a pointed sectional shape and joined to the upper edges of the sides of the lamination a10. Therefore, a magnetic field little occurs near the upper edges d4 of the sides b4 of the lamination a4, which exerts a magnetic field in the direction opposite to the magnetization direction of the free magnetic layer 36. As a result, the free magnetic layer 36 is easily put into a single magnetic domain state, and thus the spin-valve thin film element permits further sufficient control of the magnetic domain of the free magnetic layer 36 and has excellent properties.

Fifth Embodiment

Figure 11:
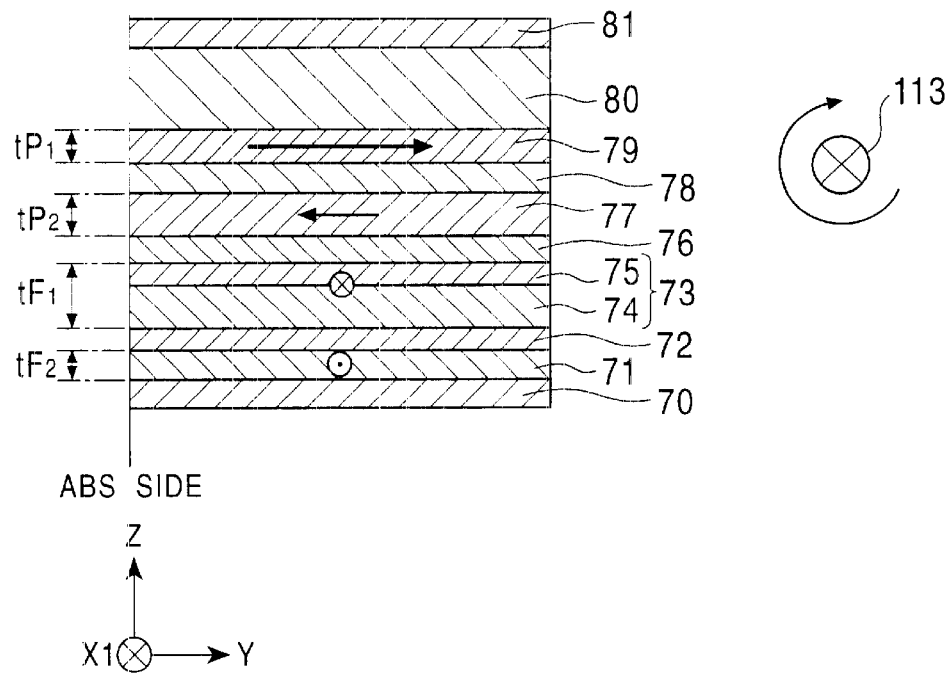
FIG. 11 is a cross-sectional view schematically showing a spin-valve thin film element in accordance with a fifth embodiment of the present invention.
Figure 12:
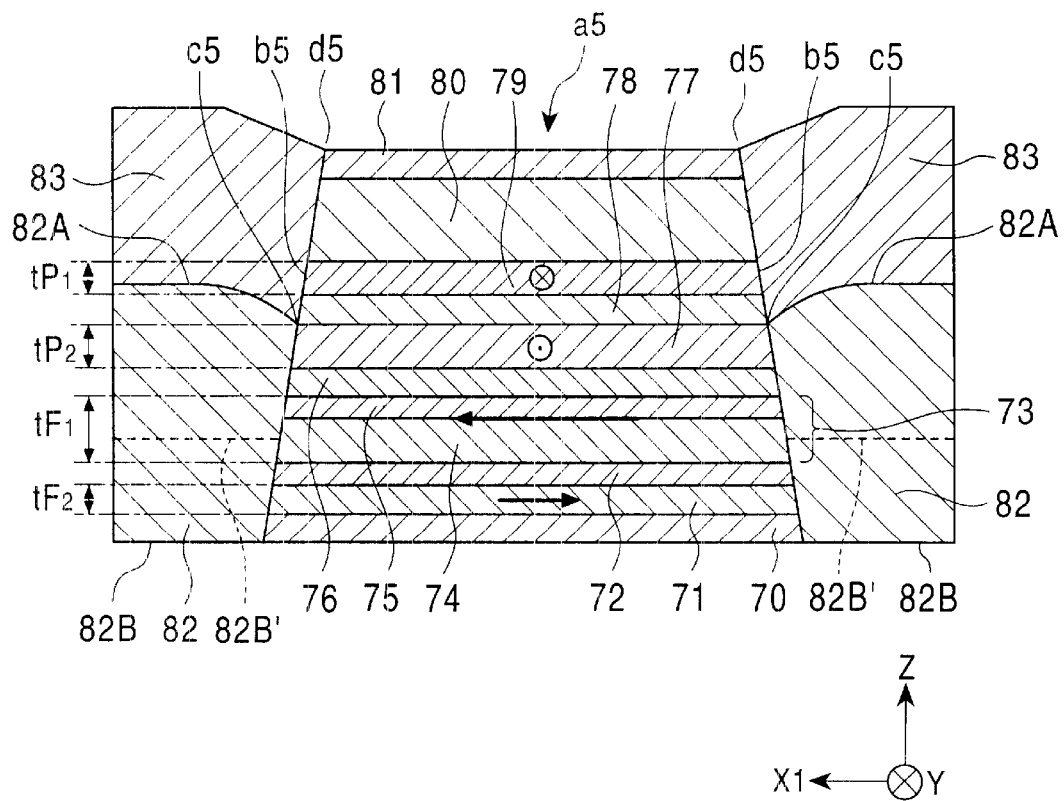
FIG. 12 is a sectional view showing the structure of the spin-valve thin film shown in FIG. 11 as viewed from the side opposing a recording medium.

FIG. 11 is a cross-sectional view schematially showing a spin-valve thin film element of a fifth embodiment of the present invention, and FIG. 12 is a sectional view showing the structure of the spin-valve thin film element shown in FIG. 11 as viewed from the side facing a recording medium.

In this spin-valve thin film element, the magnetic recording medium such as a hard disk or the like is moved in the Z direction shown in the drawings, and a leakage magnetic field from the magnetic recording medium is applied in the Y direction.

In the spin-valve thin film element of this embodiment, not only a pinned magnetic layer is divided into two layers, but also a free magnetic layer is divided into two layers including a first and second free magnetic layers through a nonmagnetic intermediate layer.

In the spin-valve thin film element of the fifth embodiment of the present invention, as shown in FIGS. 11 and 12, a base film 70, a second free magnetic layer 71, a nonmagnetic intermediate layer 72, a first free magnetic layer 73, a nonmagnetic conductive layer 76, a second pinned magnetic layer 77, a nonmagnetic intermediate layer 78, a first pinned magnetic layer 79, an antiferromagnetic layer 80, and a protecting layer 81 are laminated in this order on a substrate (not shown).

In the spin-valve thin film element of the fifth embodiment of the present invention, the base layer 70 and the protecting layer 81 are made of Ta or the like, for example.

Like in the spin-valve thin film element of the first embodiment, the antiferromagnetic layer 80 is preferably made of a PtMn alloy. The antiferromagnetic layer 80 may be made of an alloy represented by the formula X—Mn (wherein X is one element of Pd, Ru, Ir, Rh, and Os), or the formula Pt—Mn—X' (wherein X' is at least one element of Pd, Ru, Ir, Rh, Os, Au, Ag, Ne, Ar, Xe, and Kr) in place of the PtMn alloy.

Each of the first and second pinned magnetic layers 79 and 77 comprises a Co film, a NiFe alloy film, a CoFe alloy film, or a CoNiFe alloy film.

The nonmagnetic intermediate layer 78 is preferably made of any one of Ru, Rh, Ir, Cr, Re, and Cu, or an alloy of at least two elements thereof.

The nonmagnetic conductive layer 76 is made of Cu or the like.

The first and second pinned magnetic layers 79 and 77 are magnetized in antiparallel with each other in the ferrimagnetic state. For example, magnetization of the first pinned magnetic layer 79 is fixed in the Y direction shown in the drawings; magnetization of the second pinned magnetic layer 77 is fixed in the direction opposite to the Y direction. In order to maintain stability of the ferrimagnetic state, a high exchange coupling magnetic filed is required. In this embodiment, in order to obtain a higher exchange coupling magnetic field, the following various controls are performed.

In FIGS. 11 and 12, the nonmagnetic intermediate layer 72 is formed on the second free magnetic layer 71. The second free magnetic layer 71 comprises, for example, a NiFe alloy, a CoFe alloy, or a CoNiFe alloy.

Furthermore, the first free magnetic layer 73 is formed on the nonmagnetic conductive layer 72, and the nonmagnetic conductive layer 76 is formed on the first free magnetic layer 73.

As shown in FIGS. 11 and 12, the first free magnetic layer 73 comprises two layers including a NiFe alloy film 74 and a Co film 75, the Co film 75 being formed in contact with the nonmagnetic conductive layer 76. The Co film 75 in contact with the nonmagnetic conductive layer 76 is formed first for increasing ΔMR and secondarily for preventing diffusion to the nonmagnetic conductive layer 76.

The lamination a5 ranging from the base film 70 to the protecting layer 81 shown in FIGS. 11 and 12 is formed in a trapezoidal shape having the inclined sides b5. In the spin-valve thin film element, hard bias layers 82 and conductive layers 83 are formed on both sides of the lamination a5. The hard bias layers 82 are made of a Co—Pt alloy, a Co—Cr—Pt alloy, or the like, the conductive layers 83 are made of Cr, Ta, Au, or the like.

The hard bias layers 82 are arranged in the same layer level as the first free magnetic layer 73 to have a larger thickness than the thickness of the first free magnetic layer 73. The upper surfaces 82A of the hard bias layers 82 are arranged at positions more apart from the substrate than the upper surface of the first free magnetic layer 73, and the lower surfaces of the hard bias layers 82 are arranged at positions lower than the lower surface of the first free magnetic layer 73 above the substrate.

The joints c5 between the upper surfaces 82A of the hard bias layers 82 and the sides b5 of the lamination a5 are preferably arranged at positions lower than the upper edges d5 of the sides b5 of the lamination a5 and lower than the uppermost positions of the hard bias layers 82 above the substrate.

The conductive layers 83 are preferably formed on the hard bias layers 82 to be joined to the sides b5 of the lamination a5.

In FIGS. 11 and 12, the nonmagnetic intermediate layer 72 is interposed between the first and second free magnetic layers 73 and 71, and magnetizations of the first and second free magnetic layers 73 and 71 are antiparallel to each other (ferrimagnetic state) due to the exchange coupling magnetic field (RKKY interaction) produced between the first and second free magnetic layers 73 and 71.

In the spin valve thin film element shown in FIGS. 11 and 12, for example, the thickness $tF_1$ of the first free magnetic layer 73 is larger than the thickness $tF_2$ of the second free magnetic layer 71.

In addition, $Ms \cdot tF_1$ of the first free magnetic layer 73 is set to be larger than $Ms \cdot tF_2$ of the second free magnetic layer 71. When a bias magnetic field is applied from the hard bias layers 82 in the X direction, magnetization of the first free magnetic layer 73 having higher $Ms \cdot tF_1$ is oriented in the X direction by the influence of the bias magnetic field, and magnetization of the second free magnetic layer 71 having lower $Ms \cdot tF_2$ is oriented in the direction opposite to the X direction by the exchange coupling magnetic field (RKKY interaction) with the first free magnetic layer 73. In the present invention, the thickness $tF_1$ of the first free magnetic layer 73 may be smaller than the thickness $tF_2$ of the second free magnetic layer 71, and $Ms \cdot tF_1$ of the first free magnetic layer 73 may be set to be smaller than $Ms \cdot tF_2$ of the second free magnetic layer 71.

When an external magnetic field enters in the Y direction, magnetizations of the first and second free magnetic layers 73 and 71 are rotated by the influence of the external magnetic field while maintaining the ferrimagnetic state. Therefore, the electric resistance is changed in accordance with the relation between variable magnetization of the first free magnetic layer 73 concerning ΔMR and fixed magnetization of the second pinned magnetic layer 77 so that a signal of the external magnetic field can be detected.

In the present invention, the nonmagnetic intermediate layer 72 interposed between the first and second free magnetic layers 73 and 71 is preferably made of one of Ru, Rh, Ir, Cr, Re, and Cu, or an alloy of at least two elements thereof.

Where $Ms \cdot tF_1$ of the first free magnetic layer 73 is larger than $Ms \cdot tF_2$ of the second free magnetic layer 71, more preferably, the lower surfaces 82b of the hard bias layers 82 are joined to the sides of the lamination a5 in the same layer level as the free magnetic layer 73 ranging from the upper side to the lower side thereof, as shown by broken lines 82B'. Therefore, a dipole magnetic field (external demagnetizing field) little occurs near the upper edges of the sides of the lamination a5, which exerts a magnetic field in the direction opposite to the direction of magnetization to be applied to the free magnetic layer 73, thereby preventing the magnetization directions at both ends of the free magnetic layer 73 from being disturbed by the dipole magnetic field. It is thus possible to orient the magnetization of the free magnetic layer 73 by a leakage magnetic field from the hard bias layers 82, easily put the free magnetic layer 73 into a single magnetic domain state, and further improve the control of the magnetic domain of the free magnetic layer 73. It is also possible to prevent the occurrence of abnormality in reproduced waveforms at both ends of the track width, further decrease Barkhausen noise, and improve stability of the reproduced waveforms.

More preferably, the lower surfaces 82b of the hard bias layers 82 are joined to the sides of the lamination a5 in the same layer level as the half-thickness position of the free magnetic layer 73, as shown by broken lines 82B'.

Therefore, it is possible to prevent the magnetization directions at both ends of the free magnetic layer 73 from being disturbed by the dipole magnetic field, and easily apply a strong bias magnetic field to the free magnetic layer 73. It is also possible to easily put the free magnetic layer 73 into a single magnetic domain state, and further improve stability of reproduced waveforms.

The absolute value of synthetic magnetic moment of the first and second free magnetic layers 73 and 71 is set to be higher than the absolute value of synthetic magnetic moment of the first and second pinned magnetic layers 79 and 77 so that magnetizations of the first and second free magnetic layers 73 and 71 are little affected by the synthetic magnetic moment of the first and second pinned magnetic layers 79 and 77. Therefore, magnetizations of the first and second free magnetic layers 73 and 71 are rotated with high sensitivity to an external magnetic field, thereby improving output.

In the spin-valve thin film element of the fifth embodiment of the present invention, the upper surfaces of the hard bias layers 82 are joined to the sides b5 of the lamination a5 at positions lower than the upper edges d5 of the sides b5 of the lamination a5. Unlike in the structure shown in FIG. 18, the spin-valve thin film element does not have the ends 126a having a pointed sectional shape and joined to the upper edges of the sides of the lamination a10. Therefore, a leakage magnetic field from the hard bias layers 82 is less absorbed by the upper shielding layer to suppress a decrease in the effective magnetic field applied to the first free magnetic layer 73. As a result, the first free magnetic layer 73 is easily put into a single magnetic domain state, and thus the spin-valve thin film element permits further sufficient control of the magnetic domain of the first free magnetic layer 73 and has excellent stability.

In addition, since the hard bias layers 82 are arranged in the same layer level as the first free magnetic layer 73, a strong bias magnetic field can easily be applied to the first free magnetic layer 73, and the first free magnetic layer 73 can easily be put into a single magnetic domain state, further decreasing the occurrence of Barkhausen noise.

Furthermore, in the spin-valve thin film element, the upper surfaces 82A of the hard bias layers 82 are joined to the sides b5 of the lamination a5 at positions lower than the uppermost positions of the hard bias layers 82 above the substrate. Unlike in the structure shown in FIG. 18, the spin-valve thin film element does not have the ends 126a having a pointed sectional shape and joined to the upper edges of the sides of the lamination a10. Therefore, a magnetic field little occurs near the upper edges d5 of the sides b5 of the lamination a5, which exerts a magnetic field in the direction opposite to the magnetization direction of the first free magnetic layer 73. As a result, the first free magnetic layer 73 is easily put into a single magnetic domain state, and thus the spin-valve thin film element permits further sufficient control of the magnetic domain of the first free magnetic layer 73 and has excellent properties.

Sixth Embodiment

Figure 14:
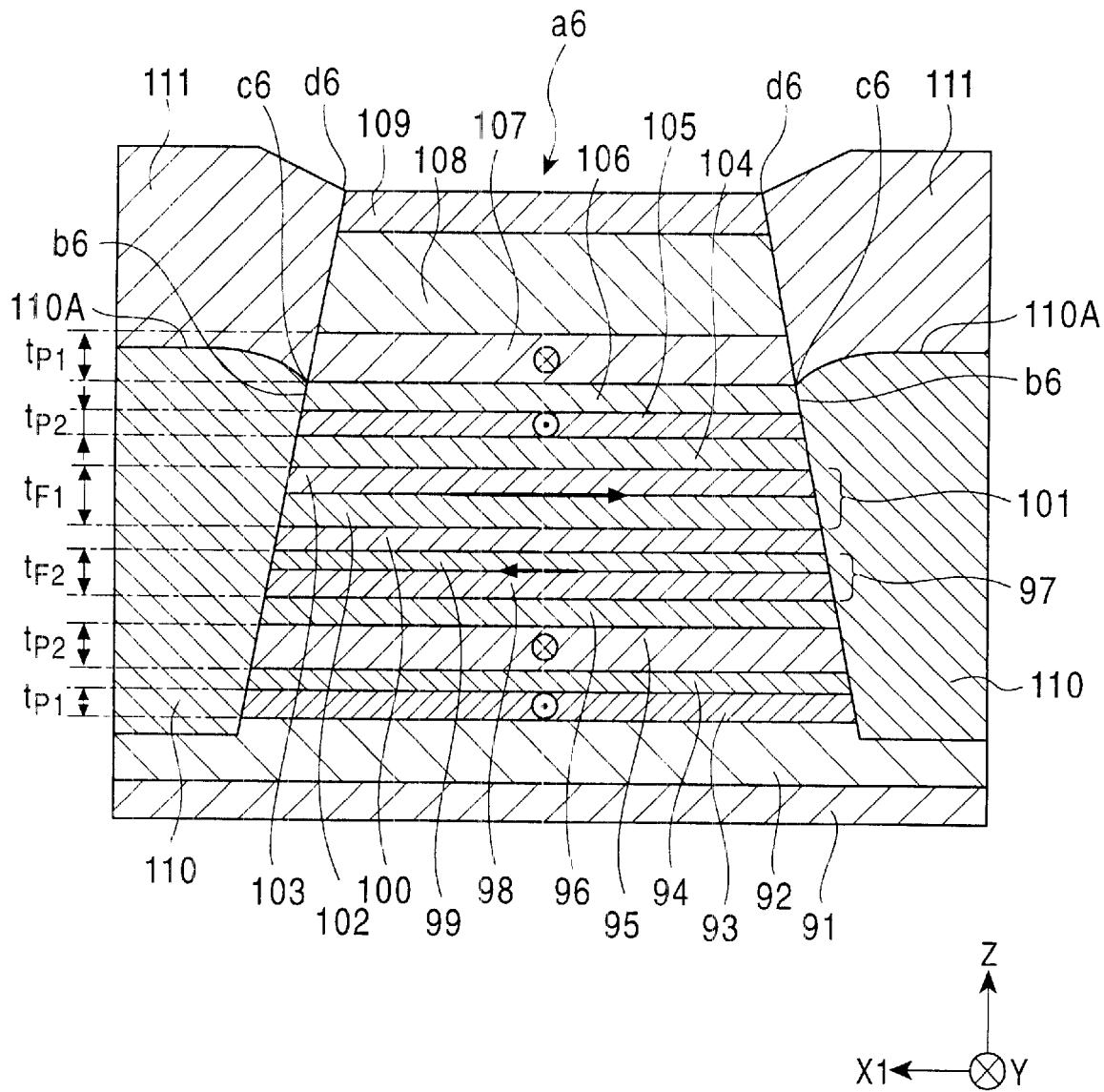
FIG. 14 is a sectional view showing the structure of the spin-valve thin film shown in FIG. 13 as viewed from the side opposing a recording medium.
Figure 15:
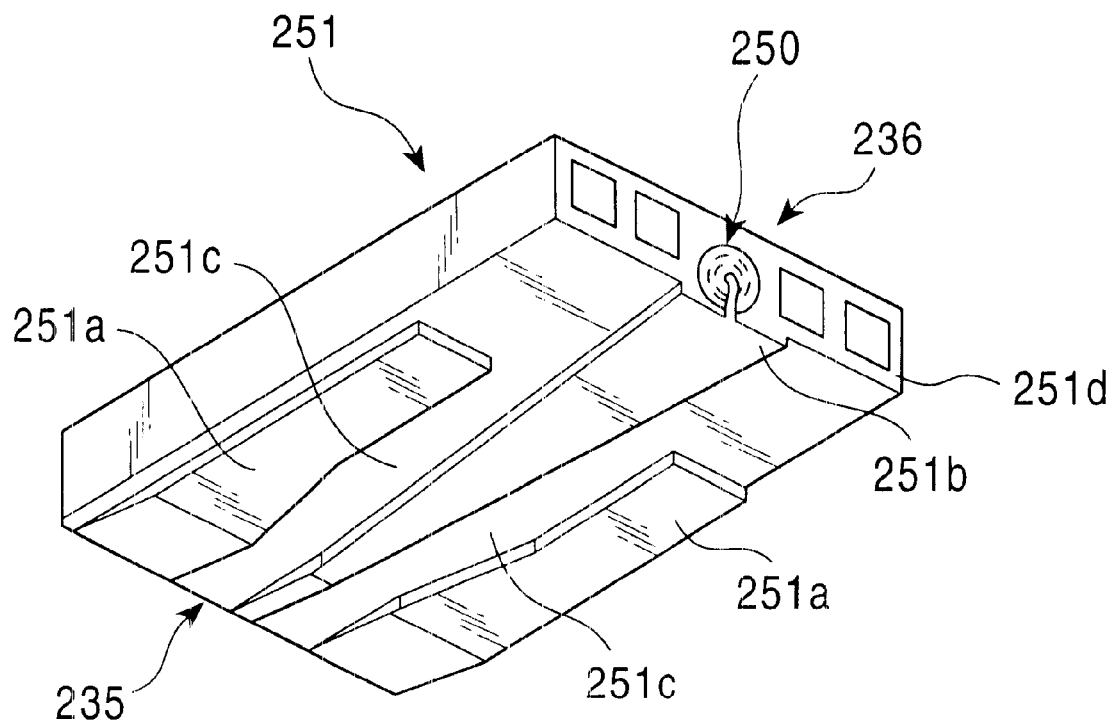
FIG. 15 is a perspective view showing an example of thin film magnetic heads.

FIG. 13 is a cross-sectional view showing the structure of a spin-valve thin film magnetic in accordance with a sixth embodiment of the present invention, and FIG. 14 is a sectional view showing the spin-valve thin film element shown in FIG. 13 as viewed from the side facing a recording medium.

The spin-valve thin film element of this embodiment is a dual spin-valve thin film element in which a nonmagnetic conductive layer, a pinned magnetic layer and an antiferromagnetic layer are formed above and below a free magnetic layer as a center, and each of the free magnetic layer and the pinned magnetic layer is divided into two layers through a nonmagnetic intermediate layer.

In FIGS. 13 and 14, a base film 91 is formed as the lowermost layer on a substrate (not shown), and an antiferromagnetic layer 92, a first pinned magnetic layer (lower) 93, a nonmagnetic intermediate layer (lower) 94, a second pinned magnetic layer (lower) 95, a nonmagnetic conductive layer 96, a second free magnetic layer 97, a nonmagnetic intermediate layer 100, a first free magnetic layer 101, a nonmagnetic conductive layer 104, a second pinned magnetic layer (upper) 105, a nonmagnetic intermediate layer (upper) 106, a first pinned magnetic layer (upper) 107, an antiferromagnetic layer 108, and a protecting layer 109 are laminated in this order on the base film 91.

The material of each of the layers is first described.

Like in the spin-valve thin film element of the second embodiment, each of the antiferromagnetic layers 92 and 108 preferably made of a PtMn alloy. The antiferromagnetic layers 92 and 108 may be made of an alloy represented by the formula X—Mn (wherein X is one element of Pd, Ru, Ir, Rh, and Os), or the formula Pt—Mn—X' (wherein X' is at least one element of Pd, Ru, Ir, Rh, Os, Au, Ag, Ne, Ar, Xe, and Kr) in place of the PtMn alloy.

Each of the first pinned magnetic layers (lower) 93 and (upper) 107, and the second pinned magnetic layers (lower) 95 and (upper) 105 comprises a Co film, a NiFe alloy, a CoFe alloy, a CoNiFe alloy, or the like.

Each of the nonmagnetic intermediate layers (lower) 94 and (upper) 106 interposed between the first pinned magnetic layers (lower) 93 and (upper) 107 and the second pinned magnetic layers (lower) 95 and (upper) 105, respectively, and the nonmagnetic intermediate layer 100 formed between first and second free magnetic layers 101 and 97 is preferably made of one of Ru, Rh, Ir, Cr, Re, and Cu, or an alloy of at least two elements thereof.

The nonmagnetic conductive layers 96 and 104 are made of Cu or the like.

As shown in FIGS. 13 and 14, each of the first and second free magnetic layers 101 and 97 comprises two layers. The first and second free magnetic layers 101 and 97 include Co film layers 103 and 98, respectively, which are formed in contact with the nonmagnetic conductive layers 104 and 96, respectively. The layer 102 of the first free magnetic layer 101, and the layer 99 of the second free magnetic layer 97, which free magnetic layers are formed with the nonmagnetic intermediate layer 100 provided therebetween, are made of, for example, a NiFe alloy, a CoFe alloy, a CoNiFe alloy, or the like. Since each of the layers 98 and 103 in contact with the nonmagnetic conductive layers 96 and 104, respectively, comprises a Co film, ΔMR can be increased, and diffusion to the nonmagnetic conductive layers 96 and 104 can be prevented.

The lamination a6 ranging from the base film 91 to the protecting layer 109 shown in FIGS. 13 and 14 is formed in a trapezoidal shape having the inclined sides b6. In the spin-valve thin film element, hard bias layers 110 and conductive layers 111 are formed on both sides of the lamination a6. The hard bias layers 110 are made of a Co—Pt alloy, a Co—Cr—Pt alloy, or the like, the conductive layers 111 are made of Cr, Ta, Au, or the like.

The hard bias layers 110 are arranged in the same layer level as the first free magnetic layer 101 to have a larger thickness than the thickness of the first free magnetic layer 101. The upper surfaces 110A of the hard bias layers 110 are arranged at positions more apart from the substrate than the upper surface of the first free magnetic layer 101, and the lower surfaces of the hard bias layers 110 are arranged at positions lower than the lower surface of the first free magnetic layer 101 above the substrate.

The joints c6 between the upper surfaces 110A of the hard bias layers 110 and the sides b6 of the lamination a6 are preferably arranged at positions lower than the upper edges d6 of the sides b6 of the lamination a6 and lower than the uppermost positions of the hard bias layers 110 above the substrate.

The conductive layers 111 are preferably formed on the hard bias layers 110 to be joined to the sides b6 of the lamination a6.

The upper or lower surfaces of the hard bias layers 110 are preferably joined to the sides of the lamination a6 at the same layer level as the free magnetic layer of the first and second free magnetic layers 101 and 97, which has higher magnetic moment (Ms×thickness t), between the upper surface and the lower surface. More preferably, the upper or lower surfaces are joined to the sides of the lamination a6 at the half-thickness position of the free magnetic layer having higher magnetic moment.

As described above, this embodiment uses, for the antiferromagnetic layers 92 and 108, an antiferromagnetic material which requires heat treatment for producing an exchange coupling magnetic field (exchange anisotropic magnetic field) in the interfaces with the first pinned magnetic layers (lower) 93 and (upper) 107.

However, diffusion of a metal element readily occurs in the interface between the antiferromagnetic layer 92 and the first pinned magnetic layer (lower) 93 formed below the free magnetic layer to easily form a thermal diffusion layer or an initial growth layer with low saturation magnetization. Therefore, the magnetic thickness having the function as the first pinned magnetic layer (lower) 93 is smaller than the actual thickness $tP_1$.

In order that the exchange coupling magnetic field produced in the laminated films above the free magnetic layer is substantially equal to the exchange coupling magnetic field produced in the laminated films below the free magnetic layer, therefore, the ratio of the thickness $tP_1$ of the first pinned magnetic layer (lower) 93 to the thickness $tP_2$ of the second pinned magnetic layer (lower) 95, which are formed below the free magnetic layer, is preferably higher than the ratio of the thickness $tP_1$ of the first pinned magnetic layer (upper) 107 to the thickness $tP_2$ of the second pinned magnetic layer (upper) 105, which are formed above the free magnetic layer. Where the exchange coupling magnetic field produced in the laminated films above the free magnetic layer is equal to the exchange coupling magnetic field produced in the laminated films below the free magnetic layer, the manufacturing process is little deteriorated by the exchange coupling magnetic fields, thereby improving the reliability of a magnetic head.

However, in the dual spin-valve thin film element shown in FIGS. 13 and 14, it is necessary to orient the magnetizations of both the second pinned magnetic layers (lower) 95 and (upper) 105, which are respectively formed below and above the free magnetic layer, in opposite directions. The reason for this is that the free magnetic layer is divided into two layers including the first free magnetic layer 101 and the second free magnetic layer 97 so that the magnetization directions of the first and second free magnetic layers 101 and 97 are antiparallel to each other.

For example, as shown in FIGS. 13 and 14, when the first free magnetic layer 101 is magnetized in the direction opposite to the X1 direction shown in the drawings, the second free magnetic layer 97 is magnetized in the X1 direction by the exchange coupling magnetic field (RKKY interaction) with the first free magnetic layer 101. Therefore, magnetizations of the first and second free magnetic layers 101 and 97 are reversed by the influence of an external magnetic field while maintaining the ferrimagnetic state.

In the dual spin-valve thin film element shown in FIGS. 13 and 14, magnetizations of both the first and second free magnetic layers 101 and 97 concern ΔMR, and electric resistance changes in accordance with the relation between the variable magnetizations of the first and second free magnetic layers 101 and 97, and the fixed magnetizations of the second pinned magnetic layers (lower) 95 and (upper) 105. In order to exhibit the function of the dual spin-valve thin film element from which high ΔMR can be expected, as compared with a single spin-valve thin film element, it is necessary to control the magnetization directions of the second pinned magnetic layers (lower) 95 and (upper) 105 so that the resistance of the first free magnetic layer 101 and the second pinned magnetic layer (upper) 105 and the resistance of the second free magnetic layer 97 and the second pinned magnetic layer (lower) 95 change in the same manner. Namely, when changes in resistance of the first free magnetic layer 101 and the second pinned magnetic layer (upper) 105 become maximum, changes in resistance of the second free magnetic layer 97 and the second pinned magnetic layer (lower) 95 also become maximum; when changes in resistance of the first free magnetic layer 101 and the second pinned magnetic layer (upper) 105 become minimum, changes in resistance of the second free magnetic layer 97 and the second pinned magnetic layer (lower) 95 also become minimum.

In the dual spin-valve thin film element shown in FIGS. 13 and 14, therefore, the first free magnetic layer 101 and the second free magnetic layer 97 are magnetized in antiparallel with each other, causing the need to magnetize the second pinned magnetic layers (upper) 105 and (lower) 95 in opposite directions.

As described above, the second pinned magnetic layers (upper) 105 and (lower) 95 formed above and below the free magnetic layer are magnetized in opposite directions, thereby obtaining the same level of ΔMR as a conventional dual spin-valve thin film element.

In the spin-valve thin film element of the sixth embodiment of the present invention, the upper surfaces 110A of the hard bias layers 110 are joined to the sides b6 of the lamination a6 at positions lower than the upper edges d6 of the sides b6 of the lamination a6. Unlike in the structure shown in FIG. 18, the spin-valve thin film element does not have the ends 126a having a pointed sectional shape and joined to the upper edges of the sides of the lamination a10. Therefore, a leakage magnetic field from the hard bias layers 110 is less absorbed by the upper shielding layer to suppress a decrease in the effective magnetic field applied to the first free magnetic layer 101. As a result, the first free magnetic layer 101 is easily put into a single magnetic domain state, and thus the spin-valve thin film element permits further sufficient control of the magnetic domains of the first and second free magnetic layers 101 and 97, and has excellent stability.

In addition, since the hard bias layers 110 are arranged in the same layer level as the first free magnetic layer 101, a strong bias magnetic field can easily be applied to the first free magnetic layer 101, and the first free magnetic layer 101 can easily be put into a single magnetic domain state, further decreasing the occurrence of Barkhausen noise.

Furthermore, in the spin-valve thin film element, the upper surfaces 110A of the hard bias layers 110 are joined to the sides b6 of the lamination a6 at positions lower than the uppermost positions of the hard bias layers 110 above the substrate. Unlike in the structure shown in FIG. 18, the spin-valve thin film element does not have the ends 126a having a pointed sectional shape and joined to the upper edges of the sides of the lamination a10. Therefore, a magnetic field little occurs near the upper edges d6 of the sides b6 of the lamination a6, which exerts a magnetic field in the direction opposite to the magnetization direction of the first free magnetic layer 101. As a result, the first free magnetic layer 101 is easily put into a single magnetic domain state, and thus the spin-valve thin film element permits further sufficient control of the magnetic domains of the first and second free magnetic layers 101 and 97, and has excellent properties.

In the spin-valve thin film elements shown in FIGS. 11 to 14, not only the pinned magnetic layer is divided into two layers, but also the free magnetic layer is divided into two layers including the first and second free magnetic layers through the nonmagnetic intermediate layer so that magnetizations of the two free magnetic layers are brought into the antiparallel state (ferrimagnetic state) by the exchange coupling magnetic field (RKKY interaction) produced between the two free magnetic layers. It is thus possible to reverse the magnetizations of the first and second free magnetic layers with high sensitivity to an external magnetic field.

In the present invention, the thickness ratio between the first and second free magnetic layers, and the thickness of the nonmagnetic intermediate layer interposed between the first and second free magnetic layers, or the thickness ratio between the first and second pinned magnetic layers, and the thickness of the nonmagnetic intermediate layer interposed between the first and second pinned magnetic layers, and the thickness of the antiferromagnetic layer are controlled in appropriate ranges so that the exchange coupling magnetic field can be increased, the pinned magnetization states of the first and second pinned magnetic layers, and the variable magnetization states of the first and second free magnetic layers can be maintained in the thermally stable ferrimagnetic state, and the same level of ΔMR as a conventional element can be obtained.

In the present invention, the direction of a sensing current is adjusted so that magnetizations of the first and second pinned magnetic layers can be maintained in the antiparallel state (ferrimagnetic state) with higher thermal stability.

In a spin-valve thin film magnetic element, conductive layers are formed on both sides of a lamination comprising an antiferromagnetic layer, a pinned magnetic layer, a nonmagnetic conductive layer, and a free magnetic layer, for flowing a sensing current from the conductive layers. The sensing current flows to the nonmagnetic conductive layer having low resistivity, the interface between the nonmagnetic conductive layer and the pinned magnetic layer, and the interface between the nonmagnetic conductive layer and the free magnetic layer. In the present invention, the pinned magnetic layer is divided into first and second pinned magnetic layers, and thus the sensing current mainly flows to the interface between the second pinned magnetic layer and the nonmagnetic conductive layer.

By flowing the sensing current, a sensing current magnetic field is formed by the right-handed screw rule. In the present invention, the flowing direction of the sensing current is controlled so that the direction of the sensing current magnetic field is the same as the direction of synthetic magnetic moment obtained by adding up magnetic moments of the first and second pinned magnetic layers.

Action of Sensing Current Magnetic Field

Description will now be made of the action of the sensing current magnetic field in the structure of each of the third to sixth embodiments shown in FIGS. 7 to 14.

In the spin-valve thin film element shown in FIGS. 7 and 8, the second pinned magnetic layer 25 and the first pinned magnetic layer 27 are formed above the nonmagnetic conductive layer 24. As shown in FIG. 7, the magnetic moment of the first pinned magnetic layer 27 is higher than that of the second pinned magnetic layer 25, and the magnetic moment of the first pinned magnetic layer 27 is oriented in the Y direction (the rightward direction shown in the drawing).

Therefore, the synthetic magnetic moment obtained by adding up the magnetic moments of the first and second pinned magnetic layers 27 and 25 is oriented in the rightward direction shown in the drawing.

As shown in FIG. 7, the sensing current 113 is caused to flow in the X direction. Since the sensing current easily flows to the nonmagnetic conductive layer 24 having lowest resistivity, the sensing current magnetic field is formed in the clockwise direction by flowing the sensing current 113 based on the right-handed screw rule, as shown by an arrow in FIG. 7. Since the second and first pinned magnetic layers 25 and 27 are formed above the nonmagnetic conductive layer 24, the sensing current magnetic field in the rightward direction shown in FIG. 8 (the Y direction) enters the second and first pinned magnetic layers 25 and 27. Thus, the direction of the sensing current magnetic field coincides with the synthetic magnetic moment, thereby the low probability of breaking the antiparallel magnetization state between the first and second pinned magnetic layers 27 and 25.

With the synthetic magnetic moment in the leftward direction (the direction opposite to the Y direction), it is necessary to flow the sensing current 113 in the direction opposite to the X1 direction to form the sensing current magnetic field in the counterclockwise direction shown in the drawing so that the direction of the synthetic magnetic moment of the first and second pinned magnetic layers 27 and 25 coincides with the direction of the sensing current magnetic field.

The spin-valve thin film element shown in FIGS. 9 and 10 is a dual spin-valve thin film element in which the first pinned magnetic layers (lower) 32 and (upper) 43 and the second pinned magnetic layers (lower) 34 and (upper) 41 are formed below and above the free magnetic layer 36.

In this dual spin-valve thin film element, it is necessary to control the directions and magnitudes of the magnetic moments of the first pinned magnetic layers (lower) 32 and (upper)43, and the directions and magnitudes of the magnetic moments of the second pinned magnetic layers (lower) 34 and (upper)41 so that the synthetic magnetic moments are formed above and below the free magnetic layer 36 in the opposite directions.

As shown in FIG. 9, the magnetic moment of the second pinned magnetic layer (lower) 34 formed below the free magnetic layer 36 is larger than the magnetic moment of the first pinned magnetic layer (lower) 32, and the magnetic moment of the second pinned magnetic layer (lower) 34 is in the rightward direction (the Y direction shown in the drawing). Therefore, the synthetic magnetic moment obtained by adding up the magnetic moments of the first pinned magnetic layer (lower) 32 and the second pinned magnetic layer (lower) 34 is also in the rightward direction (the Y direction shown in the drawing).

On the other hand, the magnetic moment of the first pinned magnetic layer (upper) 43 formed above the free magnetic layer 36 is larger than the magnetic moment of the second pinned magnetic layer (upper) 41, and the magnetic moment of the first pinned magnetic layer (upper) 43 is in the leftward direction (the direction opposite to the Y direction shown in the drawing). Therefore, the synthetic magnetic moment obtained by adding up the magnetic moments of the first pinned magnetic layer (upper) 43 and the second pinned magnetic layer (upper) 41 is also in the leftward direction (the direction opposite to the Y direction shown in the drawing). In the present invention, therefore, the synthetic magnetic moments are formed above and below the free magnetic layer 36 in the opposite directions.

In this embodiment, as shown in FIG. 9, the sensing current 114 mainly flows to the non magnetic conductive layers 35 and 40, and is caused to flow in the direction 180 opposite to the X1 direction shown in the drawing. Therefore, the sensing current magnetic field is formed by flowing the sensing current 114 in the counterclockwise direction shown by an arrow in FIG. 9.

The synthetic magnetic moment formed below the free magnetic layer 36 is oriented in the rightward direction (the Y direction shown in the drawing); the synthetic magnetic moment above the free magnetic layer 36 is oriented in the leftward direction (the direction opposite to the Y direction shown in the drawing). Thus, the directions of the two synthetic magnetic moments coincide with the direction of the sensing current magnetic fields, thereby maintaining the antiparallel magnetization state between the first and second pinned magnetic layers (lower) 32 and 34 formed below the free magnetic layer 36, and the antiparallel magnetization state between the first and second pinned magnetic layers (upper) 43 and 41 formed above the free magnetic layer 36 in a thermally stable state.

With the synthetic magnetic moment formed below the free magnetic layer 36 in the leftward direction shown in the drawing, and the synthetic magnetic moment formed above the free magnetic layer 36 in the rightward direction, it is necessary that the directions of the sensing current magnetic fields formed by flowing the sensing current in the X1 direction shown in the drawing coincide with the directions of the synthetic magnetic moments.

In the spin-valve thin film element shown in FIGS. 11 and 12, where the first and second pinned magnetic layers 79 and 77 are formed above the nonmagnetic conductive layer 76, the flowing direction of the sensing current may be controlled in the same manner as the spin-valve thin film element shown in FIG. 7.

As described above, in each of the above embodiments, the direction of the sensing current magnetic field formed by flowing the sensing current is caused to coincide with the direction of the synthetic magnetic moment obtained by adding up magnetic moments of the first and second pinned magnetic layers to stabilize the exchange coupling magnetic field (RKKY interaction) exerting between the first and second pinned magnetic layers and maintain the antiparallel magnetization state (ferrimagnetic state) between the first and second pinned magnetic layers in a thermally stable state.

Particularly, in this embodiment, in order to further improve thermal stability, an antiferromagnetic material having a high blocking temperature is used for the antiferromagnetic layer, thereby causing the low probability of breaking the antiparallel state (ferrimagnetic state) between the first and second pinned magnetic layers even when the environmental temperature is significantly increased, as compared with a conventional element.

When the amount of the sensing current is increased to increase reproduced output in order to comply with a high recording density, the sensing current magnetic field is increased. However, in the present invention, the sensing current magnetic field has the function to stabilize the exchange coupling magnetic field exerting between the first and second pinned magnetic layers, and thus the magnetization states of the first and second pinned magnetic layers are further stabilized.

The control of the sensing current direction can also be applied to cases where any antiferromagnetic material is used for the antiferromagnetic layer regardless of the need for heat treatment for producing An exchange coupling magnetic field (exchange coupling anisotropic magnetic field) in the interface between the antiferromagnetic layer and the pinned magnetic layer (the first pinned magnetic layer).

In each of the single spin valve thin film elements of the first to third embodiments shown in FIGS. 1 to 3, where the pinned magnetic layer comprises a single layer, the direction of the sensing current magnetic field formed by flowing the sensing current is caused to coincide with the magnetization direction of the pinned magnetic layer, thereby thermally stabilizing magnetization of the pinned magnetic layer.

Seventh Embodiment

Figure 25:
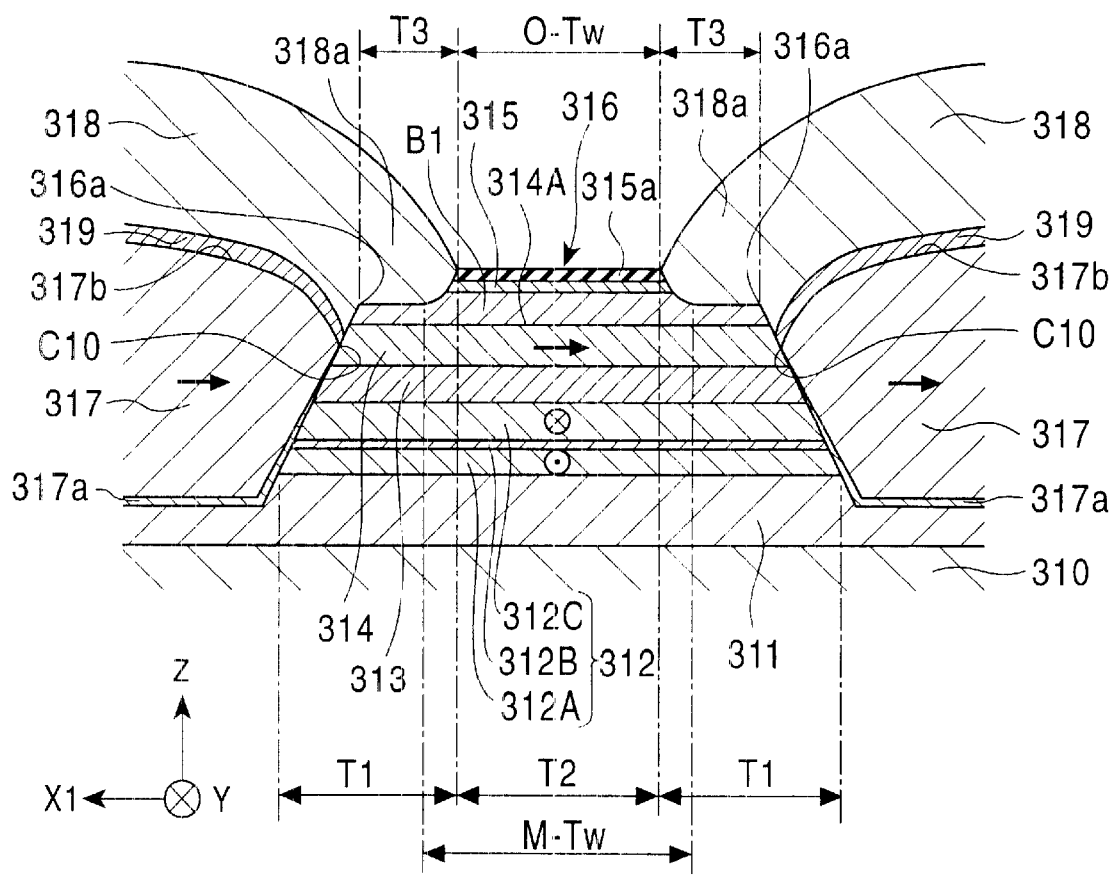
FIG. 25 is a sectional view showing the structure of a spin-valve thin film element in accordance with a seventh embodiment of the present invention as viewed from the side opposing a recording medium

FIG. 25 is a sectional view showing the structure of a spin-valve thin film element in accordance with a seventh embodiment of the present invention as viewed from the side facing a recording medium.

The spin-valve thin film element of the seventh embodiment of the present invention is a bottom type comprising an antiferromagnetic layer, two pinned magnetic layers, a nonmagnetic conductive layer, and a free magnetic layer. The pinned magnetic layers include a first pinned magnetic layer and a second pinned magnetic layer, which are formed with a nonmagnetic intermediate layer provided therebetween so that the magnetization direction of the first pinned magnetic layer is antiparallel to the magnetization direction of the second pinned magnetic layer. Namely, the spin-valve thin film element of this embodiment is a synthetic-ferri-pinned type single spin valve thin film element in which the pinned magnetic layers are brought into a synthetic ferrimagnetic state.

In FIG. 25, reference numeral 311 denotes an antiferromagnetic layer provided on a substrate 310, a pinned magnetic layer 312 being formed on the antiferromagnetic layer 311.

The pinned magnetic layer 312 comprises a first pinned magnetic layer 312A and a second pinned magnetic layer 312C which are formed with a nonmagnetic intermediate layer 312B provided therebetween so that the magnetization direction of the first pinned magnetic layer 312A is antiparallel to the magnetization direction of the second pinned magnetic layer 312C.

A nonmagnetic conductive layer 313 made of Cu (copper) or the like is formed on the second pinned magnetic layer 312, and a free magnetic layer 314 is formed on the nonmagnetic conductive layer 313. A backed layer B1 is provided on the free magnetic layer 314, and a protecting layer 315 made of Ta or the like is formed on the backed layer B1. An oxide layer 315a made of tantalum oxide (Ta-oxide) is formed on the upper side of the protecting layer 315.

As shown in FIG. 25, layers ranging from a portion of the antiferromagnetic layer 311 to the oxide layer 315a constitute a lamination 316 having a substantially trapezoidal sectional shape.

In FIG. 25, reference numeral 317 denotes a hard bias layer, and reference numeral 318 denotes a conductive layer.

The hard bias layers 317 are formed on the portions of the antiferromagnetic layer 311, which are projected on both sides of the lamination 316, with bias base layers 317a formed between the hard bias layers 311 and the projected portions. The conductive layers 318 are respectively formed on the hard bias layers 317 with intermediate layers 319 of Ta or Cr provided therebetween.

In a top type in which the antiferromagnetic layer is provided on the upper side, a large quantity of shunt component of the sensing current flows directly into the first and second pinned magnetic layers, the nonmagnetic conductive layer, and the free magnetic layer below the antiferromagnetic layer, i.e., the lower portion of the lamination, through the hard bias layers. However, in the bottom type of this embodiment, the ratio of the sensing current supplied to the lamination without through the antiferromagnetic layer 311 having high resistivity can be increased. It is thus possible to prevent side reading, and comply with the demand for higher-density magnetic recording.

Furthermore, as described below, the overlay portions 318a of the conductive layers 318 are brought into contact with the exposed backed layer B1 to decrease contact resistance, thereby further decreasing the shunt component flowing into the lower portion of the lamination 316 from the hard bias layers 317.

In further detail, in the spin-valve thin film element of the seventh embodiment of the present invention, the antiferromagnetic layer 311 has a thickness of about 8 to 11 nm (80 to 100 Å) at the center of the lamination 316, and preferably comprises a PtMn alloy like the antiferromagnetic layer 2 of the first embodiment.

Like the antiferromagnetic layer 2 of the first embodiment, the antiferromagnetic layer may be made of an alloy represented by the formula X—Mn (wherein X represents one element selected from Pd, Ru, Ir, Rh, and Os), or the formula X'—Pt—Mn (wherein X' represents at least one element selected from Pd, Ru, Ir, Rh, Os, Au, Ag, Ne, Ar, Xe, and Kr) in place of the PtMn alloy.

Each of the first and second pinned magnetic layers 312A and 312C comprises a ferromagnetic thin film such as a Co film, a NiFe alloy film, a CoNiFe alloy film, a CoFe alloy film, a CoNi alloy film, or the like, and preferably has a thickness of about 40 Å. For example, the thickness of the first pinned magnetic layer 312A is set to 1.3 to 1.5 nm (13 to 15 Å), and the thickness of the second pinned magnetic layer 312C is set to 2 to 2.5 nm (20 to 25 Å).

The nonmagnetic intermediate layer 312B is preferably made of any one of Ru, Rh, Ir, Cr, Re, and Cu, or an alloy of at least two elements thereof, and generally has a thickness of about 0.8 nm (8 Å).

The first pinned magnetic layer 312A is formed in contact with the antiferromagnetic layer 311, and is annealed (heat-treated) in a magnetic field to produce an exchange coupling magnetic field (exchange anisotropic magnetic field) in the interface between the first pinned magnetic layer 312A and the antiferromagnetic layer 311, fixing magnetization of the first pinned magnetic layer 312A in the direction opposite to the Y direction as shown in FIG. 25. When the magnetization of the first pinned magnetic layer 312A is fixed in the direction opposite to the Y direction, magnetization of the second pinned magnetic layer 312C opposed to the first pinned magnetic layer 312A with the nonmagnetic intermediate layer 312B formed therebetween is fixed in the state antiparallel to the magnetization of the first pinned magnetic layer 312A, i.e., in the Y direction.

The higher the exchange coupling magnetic field, the more the magnetizations of the first and second pinned magnetic layers 312A and 312C are stably maintained in the antiparallel state. Particularly, since the antiferromagnetic layer 311 is formed by using an PtMn alloy having a higher blocking temperature, and causing a higher exchange coupling magnetic field (exchange anisotropic magnetic field) in the interface with the first pinned magnetic layer 312A, the magnetization states of the first and second pinned magnetic layers 312A and 312C can be thermally stably maintained.

In this embodiment, the thickness ratio between the first and second pinned magnetic layers 312A and 312C is set in an appropriate range so that the exchange coupling magnetic field (Hex) can be increased, magnetizations of the first and second pinned magnetic layers 312A and 312C can be thermally stably maintained in the antiparallel state (ferrimagnetic state), and the same degree of ΔR/R (rate of resistance change) as a conventional element can be obtained. Furthermore, the magnitude and direction of the magnetic field applied during heat treatment are appropriately controlled so that the magnetization directions of the first and second pinned magnetic layers 312A and 312C can be controlled in desired directions.

The nonmagnetic conductive layer 313 is made of Cu (copper) or the like, and has a thickness of 2 to 2.5 nm (20 to 25 Å).

The free magnetic layer 314 generally has a thickness of about 20 to 50 Å, and is preferably made of the same material as the first and second pinned magnetic layers 312A and 312C.

The backed layer B1 can be made of a metallic material such as Cu or the like, a nonmagnetic conductive material, or a material selected from the group consisting of Au, Ag, and Cu, and the thickness thereof is set to 1.2 to 2 nm (12 to 20 Å), for example.

The protecting layer 315 is made of Ta, and comprises the oxide layer 315A in the surface thereof. The protecting layer 315 is formed so that the length in the track width direction (the X1 direction shown in FIG. 25) is shorter than the upper surface of the lamination 316. Therefore, both ends of the backed layer B1 are exposed from the upper surface of the lamination 316.

The bias base layer 317a comprises a buffer oriented film, and is preferably made of Cr or the like. For example, the thickness of the bias base layer 317a is 2 to 5 nm (20 to 50 Å), preferably 3.5 nm (35 Å). For example, the intermediate layer 319 is made of Ta, and has a thickness of about 5 nm (50 Å).

The bias base layer 317 and the intermediate layer 319 function as diffusion barrier in the subsequent step (UV during or hard baking step) of curing insulating resist at high temperature in a process for manufacturing an inductive head (writing head), thereby preventing thermal diffusion between the hard bias layers 317 and the peripheral layers, and deterioration in the magnetic properties of the hard bias layers 317.

Each of the hard bias layers 317 generally has a thickness of about 20 to 50 nm (200 to 500 Å), and is preferably made of a Co—Pt alloy, a Co—Cr—Pt alloy, or a Co—Cr—Ta (cobalt-chromium-tantalum) alloy, for example. The hard bias layers 317 are magnetized in the X1 direction shown in FIG. 25 to orient magnetization of the free magnetic layer 314 in the X1 direction. Therefore, variable magnetization of the free magnetic layer 314 crosses at 90° the fixed magnetization of the second pinned magnetic layer 312C.

The hard bias layers 317 are preferably arranged in the same layer level as the free magnetic layer 314, and have a larger thickness than that of the free magnetic layer 314 in the thickness direction thereof. The lower surfaces of the hard bias layers 317 are arranged at positions (i.e., on the lower side in FIG. 25) lower than the upper surface of the free magnetic layer 314 above the substrate.

The joints c10 between the upper surfaces 317b of the hard bias layers 317 and the sides of the lamination 316 are preferably arranged at positions (i.e., on the lower side in FIG. 25) lower than the upper edges 316a of the sides of the lamination 316, and lower than the uppermost positions of the hard bias layers 317, which are apart from the lamination 316.

Therefore, it is possible to prevent flux control in the magnetic field applied to the free magnetic layer 314 from the hard bias layers 317, in which a leakage magnetic field from the hard bias layers 317 is absorbed by an upper shielding layer provided above the lamination 316 to decrease the effective magnetic field applied to the free magnetic layer 314. As a result, the free magnetic layer 314 can easily be put into a single magnetic domain state, and the magnetic domain of the free magnetic layer 314 can be sufficiently controlled.

Since each of the conductive layers 318 comprises a single layer film or multilayer film made of at least one selected from Cr, Au, Ta and W, the resistance can be decreased. In this embodiment, the conductive layers 318 are formed by epitaxially growing Cr on the intermediate layer 319 of Ta, thereby decreasing the electrical resistance value.

The conductive layers 318 are extended to the exposed portions of the backed layer B1 to form the overlay portions 318a which are coated on the lamination 316 to be connected to the backed layer B1.

In the lamination 316 formed by laminating the antiferromagnetic layer 311, the first pinned magnetic layer 312A, the nonmagnetic intermediate layer 312B, the second pinned magnetic layer 312C, the nonmagnetic conductive layer 313, the free magnetic layer 314, and the backed layer 315, in fact, not the entire lamination 316 exhibits 1magnetoresistance, but only the central region thereof having excellent reproduction sensitivity is substantially a sensitive region exhibiting magnetoresistance.

The region of the lamination, which has excellent reproduction sensitivity, is referred to as the "sensitive region", and the sensitive region and insensitive region in the lamination are measured by a microtrack profile method.

The microtrack profile method will be described with reference to FIG. 43.

Figure 43:
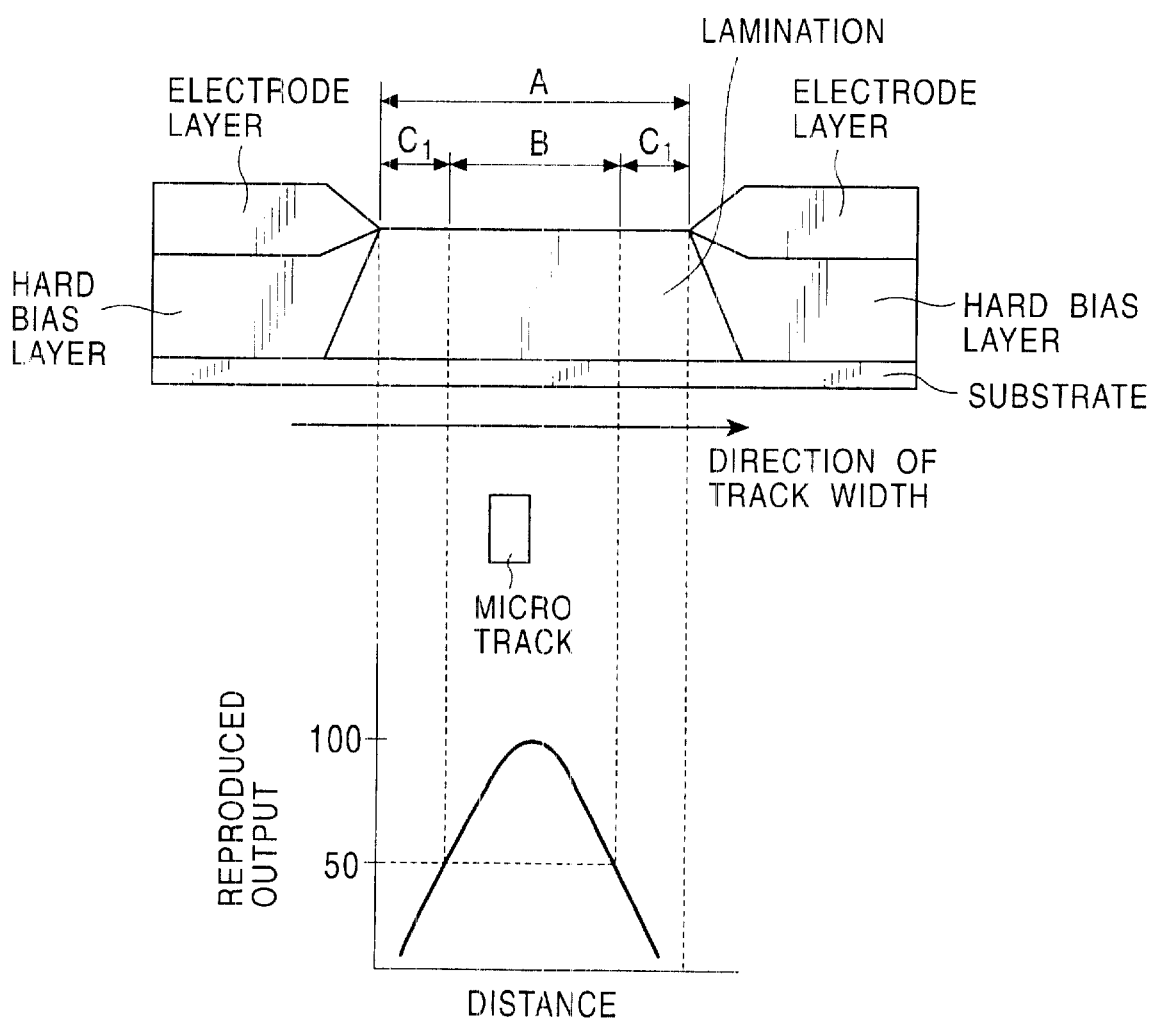
FIG. 43 is a schematic drawing showing the method of measuring a sensitive region and an insensitive region in a lamination of a spin-valve thin film element.

As shown in FIG. 43, a spin-valve thin film element (spin valve thin film magnetic element) comprising a lamination exhibiting magnetoresistance, hard bias layers formed on both sides of the lamination, and conductive layers formed on the hard bias layers is formed on a substrate. The conductive layers are formed only on both sides of the lamination, with no overlay portion provided.

Next, the width dimension A of the upper surface of the lamination which is not covered with the conductive layers is measured by an optical microscope. The width dimension A is defined as the track width Tw (referred to as the "optical track width O-Tw" hereinafter) measured by an optical method.

Then, a predetermined signal is recorded as a microtrack on a magnetic recording medium, and the spin-valve thin film magnetic element is scanned on the microtrack in the track width direction to measure the relation between the width dimension A of the lamination and reproduced output.

Alternatively, the magnetic recording medium on which the microtrack is formed may be scanned on the spin-valve thin film magnetic element in the track width direction to measure the relation between the width dimension A of the lamination and reproduced output. The measurement results are shown on the lower side of FIG. 43.

The measurement results indicate that the reproduced output is high near the center of the lamination, while it is low near the ends of the lamination. It is thus found that magnetoresistance is sufficiently exhibited near the center of the lamination to contribute to the reproduction function, while magnetoresistance deteriorates near the both ends of the lamination to decrease the reproduced output, decreasing the reproduction function.

In the present invention, a region of the upper surface of the lamination, which has a width dimension B and produces 50% or more of the maximum reproduced output, is defined as the sensitive region, and a region of the upper surface of the lamination, which has a width dimension $C_1$ and produces only 50% or less of the maximum reproduced output, is defined as the insensitive region.

The sensitive region of the lamination 316 is defined as the region in which in scanning a spin-valve thin film magnetic element (spin-valve thin film element) on a microtrack on which a signal is recorded in the track width direction, 50% or more of the maximum reproduced output is obtained; the insensitive region of the lamination 316 is defined as the region on either side of the sensitive region, in which 50% or less of the maximum reproduced output is obtained.

The conductive layers 318 are formed to extend to the insensitive regions.

The dimension of the portion of the upper surface of the lamination 316, in which the overlay portions 318a are not formed, in the track width direction (the X1 direction shown in FIG. 25) is the optical track width dimension O-Tw, which defines the magnetic track width dimension M-Tw of the sensitive region. In this embodiment, the optical track width dimension O-Tw is set to be substantially the same as the magnetic track width dimension M-Tw, or the magnetic track width dimension M-Tw is set to be slightly larger than the optical track width dimension O-Tw.

Therefore, the sensing current supplied to the lamination 316 from the conductive layers 318 little flows to the lamination through the hard bias layers 317, and thus the ratio of the sensing current flowing directly to the lamination 316 without passing through the hard bias layers 317 can be increased. In this case, the area of junction between the lamination 316 and the conductive layers 316 can be increased to decrease the junction resistance which does not contribute to magnetoresistance, thereby improving the reproduction properties of the element.

In the spin-valve thin film element having the structure shown in FIG. 25, the sensing current is supplied to the lamination 316 from the conductive layers 318. When a magnetic field is applied in the Y direction shown in FIG. 25 from the magnetic recording medium, magnetization of the free magnetic layer 314 is changed from the X1 direction to the Y direction shown in FIG. 25. At the same time, spin-dependent conduction electron scattering occurs due to the GMR effect in the interface between the nonmagnetic conductive layer 313 and the free magnetic layer 314 to cause a change in electric resistance, thereby detecting a leakage magnetic field from the recording medium.

In the spin valve thin film element, the mean free path of +spin (up spin) electrons contributing to magnetoresistance is extended by the backed layer B1, and thus high ΔR/R (rate of change in resistance) can be obtained by a so-called spin filter effect, thereby complying with the demand for high-density recording.

The spin filter effect will be described below.

Figure 38B:
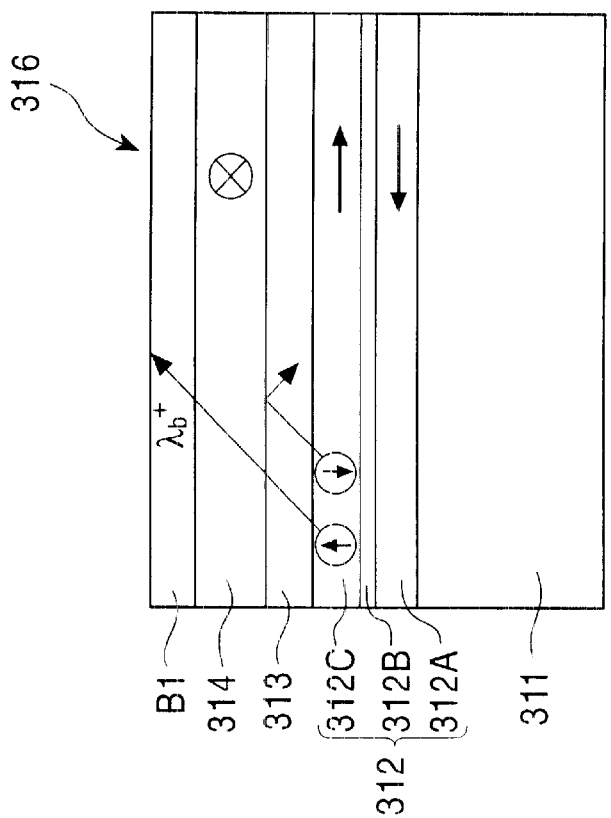
FIGS. 38A and 38B are schematic drawings illustrating contribution of a backed layer to the spin filter effect in a spin-valve thin film element.
Figure 38A:
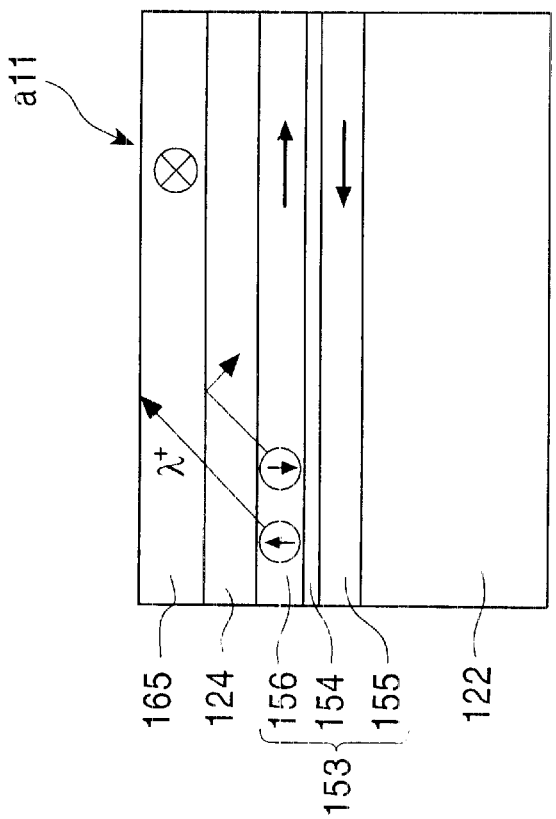

FIGS. 38a and 38b are schematic drawings illustrating the contribution of the backed layer to the spin filter effect in the spin valve thin film element.

The giant magnetoresistive GMR effect observed in a magnetic material is mainly due to "spin-dependent scattering" of electrons, i.e., a difference between the mean free path $\lambda^+$ of conduction electrons having spin (for example, +spin (up spin)) parallel to the magnetization direction of the magnetic material, e.g., the free magnetic layer 314, and the mean free path $\lambda^-$ of conduction electrons having spin (for example, −spin (down spin)) antiparallel to the magnetization direction of the magnetic material. In FIG. 38, the conduction electrons having up spin are shown by an upward arrow, and the conduction electrodes having down spin are shown by a downward arrow.

In passage of electrons through the free magnetic layer 314, the electrons having +spin parallel to the magnetization direction of the free magnetic layer 314 can freely move. Conversely, electrons having −spin are immediately scattered.

This is due to the fact that the mean free path of electrons having +spin is, for example, about 5 nm (50 Å), while the mean free path of electrons having −spin is about 0.6 nm (6 Å), which is as small as about 1/10 of the electrons having +spin.

In this embodiment, the thickness of the free magnetic layer 314 is set to be larger than the mean free path of about 6 of −spin electrons, and smaller than the mean free path of about 5 nm (50 Å) of +spin electrons.

Therefore, in passage through the free magnetic layer 314, the −spin conduction electrons (minority carriers) are effectively blocked (i.e., filtered out) by the free magnetic layer 314, while the +spin conduction electrons (i.e., majority carriers) are substantially transmitted through the free magnetic layer 314.

The majority carriers and minority carries produced in the second pinned magnetic layer 312C, i.e., +spin electrons and −spin electrons corresponding to the magnetization direction of the second pinned magnetic layer 312C, move toward the free magnetic layer 314 to cause charge movement, i.e., carriers.

In rotation of magnetization of the free magnetic layer 314, the two types of carriers are scattered in different states. Namely, the carriers pass through the free magnetic layer 314 in different states to cause the GMR.

Although the electrons which move to the second pinned magnetic layer 312C from the free magnetic layer 314 also contribute to GMR, the electrons moving from the second pinned magnetic layer 312C to the free magnetic layer 314 and the electrons moving from the free magnetic layer 314 to the second pinned magnetic layer 312C move in the same direction in average. Therefore, description of the electrons moving to the second pinned magnetic layer 312C from the free magnetic layer 314 is omitted. Since the number of the +spin electrons produced in the nonmagnetic conductive layer 313 is the same as the number of the −spin electrons produced therein, the sum of the mean free paths is the same, and thus description thereof is also omitted.

The number of the minority carriers, i.e., −spin electrons, produced in the second pinned magnetic layer 312C, and passing through the nonmagnetic conductive layer 313, is equal to the number of −spin electrons scattered in the interface between the second pinned magnetic layer 312C and the nonmagnetic conductive layer 313. The −spin electrons are scattered near the interface between the nonmagnetic conductive layer 313 and the second pinned magnetic layer 312C immediately before they reach the interface with the free magnetic layer 314. Namely, even when the magnetization direction of the free magnetic layer 314, the mean free path of the −spin electrons is not changed, and remains shorter than the mean free path of the +spin electrons, thereby causing no effect on a change in resistance which contributes to a rate of change in resistance causing the GMR effect.

Therefore, for the GMR effect, only the behavior of the +spin electrons is taken into consideration.

The majority carriers, i.e., +spin electrons, produced in the second pinned magnetic layer 312C move in the nonmagnetic conductive layer 313 shorter than the mean free path $\lambda^+$ of the +spin electrons to reach the free magnetic layer 314.

Where the magnetization direction of the free magnetic layer 314 with no external magnetic field applied thereto, the +spin electrons have +spin parallel to the magnetization direction of the free magnetic layer 314 and can thus freely pass through the free magnetic layer 314.

As shown in FIG. 38B, in the backed layer B1, the +spin electrons passing through the free magnetic layer 314 move for the additional mean free path $\lambda^+_b$ determined by the material of the backed layer B1, and are then scattered.

This means that without the backed layer B1 shown in FIG. 38B, the +spin electrons move in the free magnetic layer 314, and are then scattered in the upper surface thereof, while with the backed layer B1, the mean free path is increased by the additional mean free path $\lambda^+_b$.

Therefore, the use of a conductive material having a relatively low resistance value (i.e., a long mean free path) decreases the resistance value of the spin valve thin film element.

On the other hand, where the magnetization direction of the free magnetic layer 314 is rotated with an external magnetic field applied thereto, +spin electrons are scattered in the free magnetic layer 314 because the magnetization direction of the magnetic material is different from the spin direction, decreasing the effective mean free path. Namely, the resistance value is decreased.

As a result, the GMR effect with high ΔR/R (rate of change in resistance) can be obtained, and the reproduced output property of the spin-valve thin film element can be improved, as compared with cases without the backed layer B1.

The direction of variable magnetization of the free magnetic layer 314 having an effect on asymmetry of output will be described with reference to the drawings.

Figure 39:
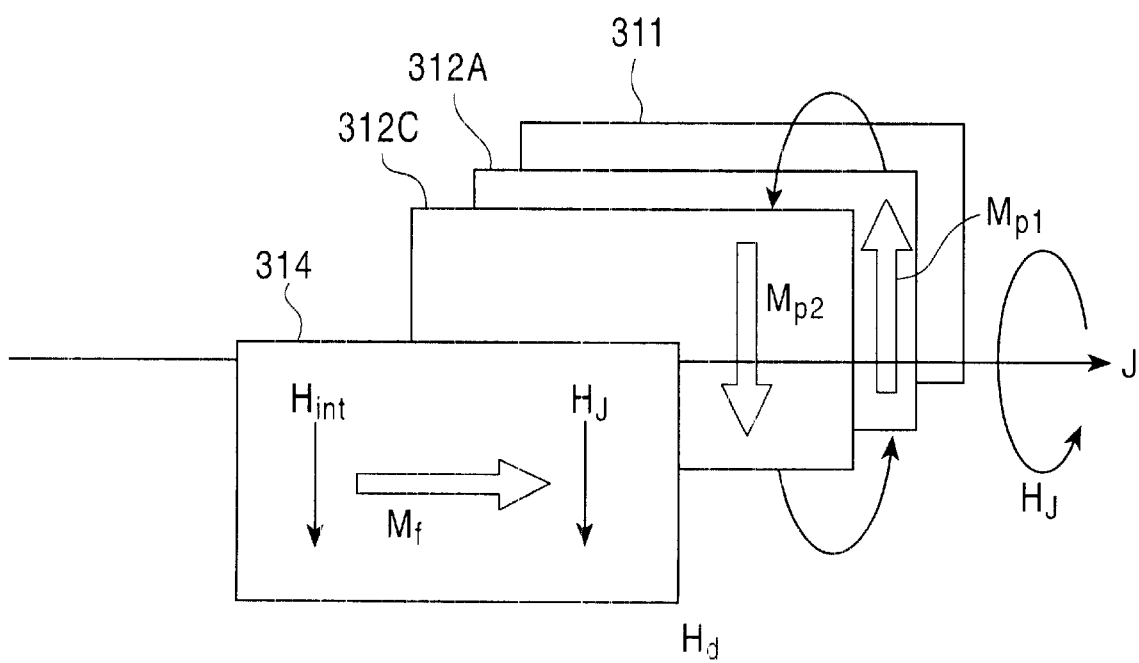
FIG. 39 is a schematic drawing illustrating definition of the direction of variable magnetization $M_f$ of a free magnetic layer of a spin-valve thin film element.

FIG. 39 is a schematic drawing illustrating the definition of the direction of variable magnetization $M_f$ of the free magnetic layer 314.

Magnetic fields having effects on the direction of variable magnetization $M_f$ of the free magnetic layer 314 include the following three magnetic fields, i.e., the sensing current magnetic field $H_j$ of the sensing current, the demagnetizing field (dipole magnetic field) $H_d$ due to fixed magnetization of the pinned magnetic layers 312A, 312B and 312C, and the interaction magnetic field $H_{int}$ due to layer interaction between the free magnetic layer 314 and the pinned magnetic layers 312A, 312B and 312C. With these magnetic fields having no contribution to the variable magnetization $M_f$ of the free magnetic layer 314, asymmetry is decreased. Namely, in order to decrease asymmetry, it is preferred to satisfy the following relation with no external magnetic field applied.

$$H_j + H_d + H_{int} = 0$$

In the spin-valve thin film magnetic element (spin valve thin film element) of this embodiment, in the lamination 316, the first and second pinned magnetic layer 312A and 312C which are formed with the nonmagnetic intermediate layer 312B provided therebetween so that the magnetization direction of the second pinned magnetic layer 312C is antiparallel to the magnetization direction of the first pinned magnetic layer 312A, and the pinned magnetic layers are brought into the synthetic ferromagnetic state to form the synthetic-ferri-pinned type. As shown in FIG. 39, therefore, the demagnetizing field (dipole magnetic field) $H_d$ can be cancelled with the magnetostatic coupling magnetic field $H_{p1}$ of the first pinned magnetic layer 312A and the magnetostatic coupling magnetic field $H_{p2}$ of the second pinned magnetic layer 312C.

As a result, the demagnetizing field (dipole magnetic field) $H_d$ having an influence on the variable magnetization direction of the free magnetic layer 314 can be made substantially zero, thereby significantly decreasing the contribution of the demagnetizing field (dipole magnetic field) $H_d$ due to fixed magnetization of the pinned magnetic layers to the variable magnetization $M_f$ of the free magnetic layer 314.

Description will now be made of a decrease in contribution of the sensing current magnetic field $H_j$ due to the sensing current J affecting asymmetry.

FIG. 40 is a drawing illustrating the phenomenon that contribution of the sensing current magnetic field $H_j$ due to the sensing current J to the variable magnetization Mf of the free magnetic layer 314 is described by the backed layer B1. FIG. 40A is a cross-sectional view of a spin-valve thin film element having no backed layer taken along line perpendicular to the side (ABS side) facing a medium, and FIG. 40B is a cross-sectional view of a spin-valve thin film element having a backed layer taken along line perpendicular to the side (ABS side) facing a medium.

Figure 22:
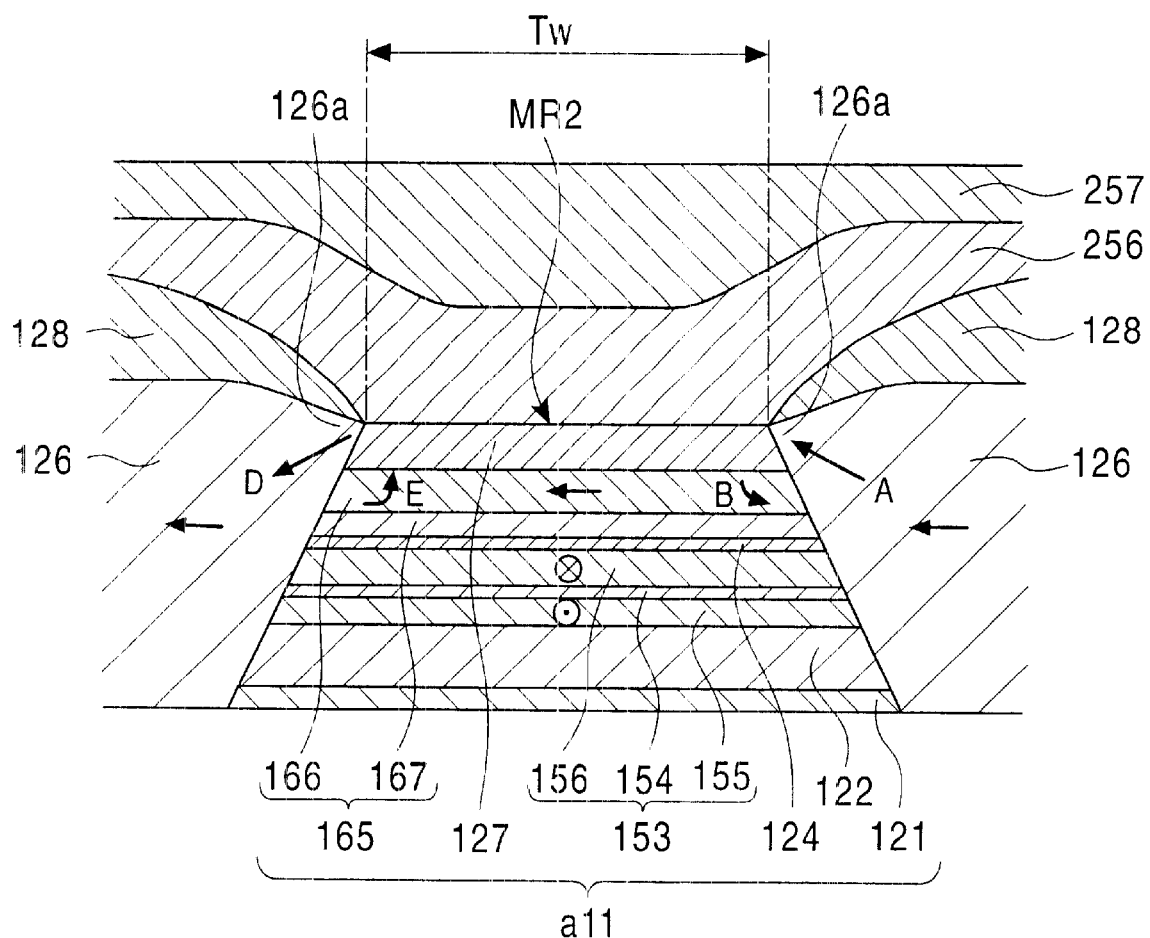
FIG. 22 is a sectional view showing the structure of a principal portion of a thin film magnetic head comprising another conventional spin-valve thin film element as viewed from the side opposing a recording medium.

In FIG. 40A, reference numerals 122 to 165 respectively denote portions corresponding to the conventional synthetic-ferri-pinned type spin valve thin film element having no backed layer shown in FIG. 22.

As shown in FIG. 40A, in such a bottom type spin valve thin film element having no backed layer, when a sensing current J is supplied to an antiferromagnetic layer 122, a first pinned magnetic layer 155, a nonmagnetic intermediate layer 154, a second pinned magnetic layer 156, a nonmagnetic conductive layer 124, and a free magnetic layer 165, the sensing current J tends to mainly flow to a portion near the center of the lamination comprising these layers.

However, since the thick antiferromagnetic layer 122 is present in the lower portion of these layers, the sensing current J tends to flow to a portion below the free magnetic layer 165 to which the sensing current J is desired to flow, i.e., a portion near the lower side of the nonmagnetic conductive layer 124, as shown in FIG. 40A.

Therefore, the sensing current magnetic field $H_j$ due to the sensing current J significantly contributes to the free magnetic layer 165 in the rightward direction shown in FIG. 38A, thereby causing difficulties in correcting the direction of the variable magnetization $M_f$ of the free magnetic layer 165 in the desired direction in order to decrease asymmetry, as described above.

On the other hand, in this embodiment, as shown in FIG. 40B, the backed layer B1 is provided in the uppermost portion of the lamination 316 to move the center of the current in the lamination 316 to the free magnetic layer side. Therefore, the center of the sensing current J flows through substantially the free magnetic layer 314. Thus, it is possible to remove the significant contribution of the sensing current magnetic field $H_j$ to the free magnetic layer 314 in the lateral direction of the drawing. Namely, the sensing current magnetic field $H_j$ can be made substantially zero.

In other words, this corresponds to the phenomenon that the sensing current J shown in FIG. 40B is divided into shunts J1 and J2 in the same direction in the nonmagnetic conductive layer 313 and the backed layer B1, as shown in FIG. 40C. In this case, in the free magnetic layer 314, the rightward magnetic field formed by shunt J1 is cancelled by the leftward magnetic field formed by shunt J2, and thus the sensing current magnetic field $H_j$ in the free magnetic layer 314 can be made substantially zero.

Therefore, of the three magnetic fields having influences on the direction of variable magnetization Mf noholddom of the free magnetic layer 314 shown in FIG. 39, the two magnetic fields having large contribution can be substantially cancelled.

Namely, since the sensing current magnetic field $H_j$ due to the sensing current J and the demagnetizing magnetic field (dipole magnetic field) $H_d$ due to fixed magnetization of the pinned magnetic layer 312 are substantially cancelled, only the interaction magnetic field $H_{int}$ due to layer interaction between the free magnetic layer 314 and the pinned magnetic layer 312, which has smallest contribution with no external magnetic field applied, must be taken into consideration in order to decrease asymmetry.

Therefore, in a state in which the spin-valve thin film element is not operated, i.e., in a state in which no sensing current J is supplied to cause no sensing current magnetic field $H_j$, variable magnetization $M_f$ of the free magnetic layer 314 may be oriented in the direction close to the X1 direction shown in FIG. 25 by magnetization of the hard bias layers 317.

Namely, with no sensing current J supplied, the variable magnetization $M_f$ of the free magnetic layer 314, which is defined by the hard bias layers 317, may be oriented in the direction perpendicular to the fixed magnetization $M_p$ of the second pinned magnetic layer 312C, thereby eliminating the need for setting in consideration of the contribution of the sensing current J so that with the sensing current J supplied, these magnetization directions cross at a right angle.

Therefore, where no sensing current J is supplied to produce no sensing current magnetic field $H_j$, there is no tendency that the variable magnetization $M_f$ of the free magnetic layer 314 is in the direction opposite to the fixed magnetization $M_p$ of the second pinned magnetic layer 312C.

The spin-valve thin film element comprises the overlay portions 318a formed by extending the conductive layers 318 formed on the hard bias layers 317 to the upper side of the lamination 316, as shown in FIG. 25. Therefore, when the sensing current J is supplied to the second pinned magnetic layer 312C, the nonmagnetic conductive layer 313, and the free magnetic layer 314 from the conductive layers 318, the sensing current J mostly flows into the lamination through the overlay portions 318a.

Therefore, the free magnetic layer 314 has the central portion to which the sensing current J flows, and the both sides to which substantially no sensing current flows.

Since the sensing current magnetic field $H_j$ is very low over the whole free magnetic layer 314, there is less difference in contribution of each magnetic field between the central portion 314a to which the sensing current J flows, and both sides 314b to which substantially no sensing current J flows, thereby causing no deviation in the magnetization direction over the whole free magnetic layer 314.

Figure 41:
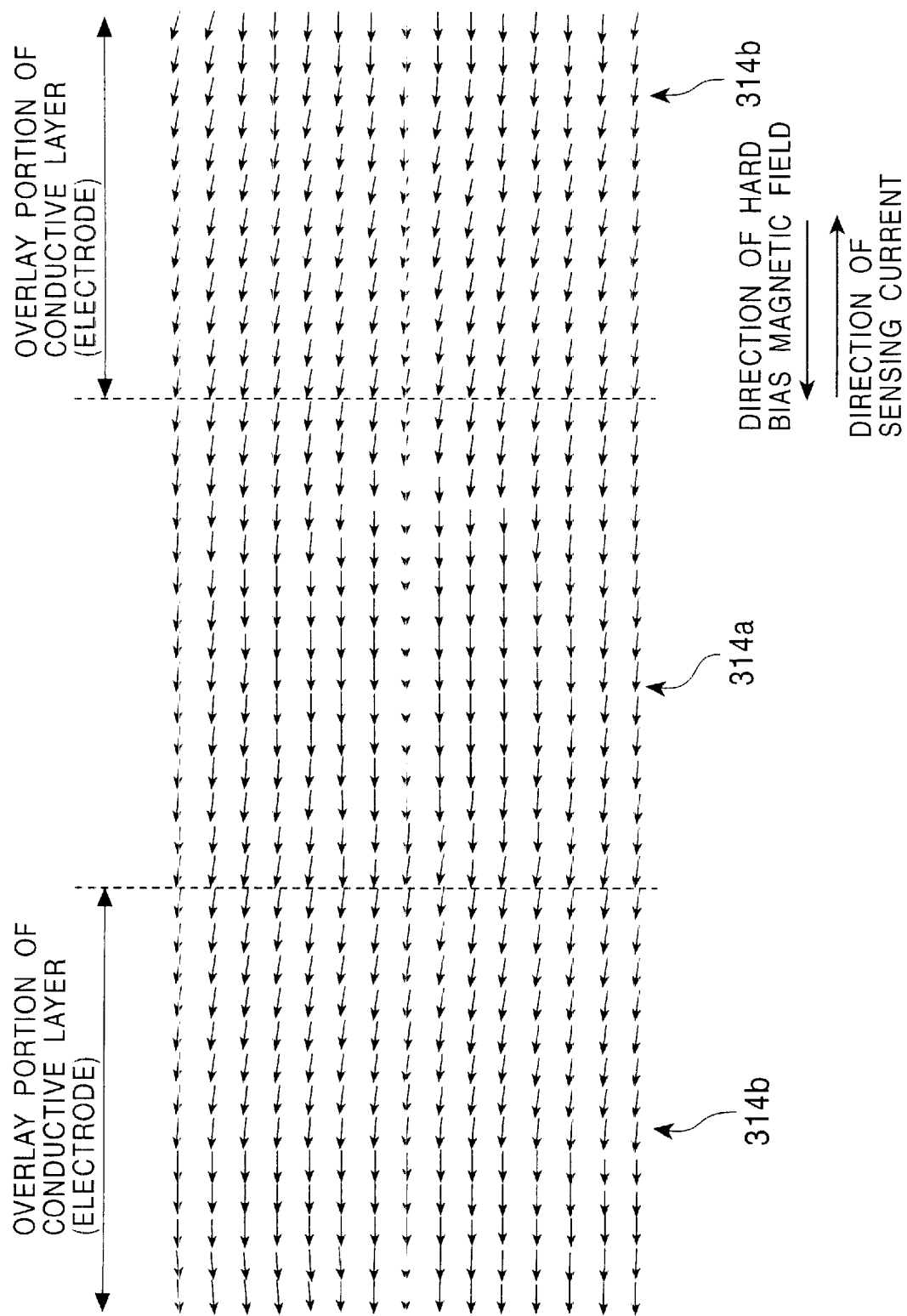
FIG. 41 is a diagram showing the magnetization direction distribution of a free magnetic layer of a spin valve thin film element of the present invention.

FIG. 41 is a vector map showing the magnetization distribution of the free magnetic layer 314 in a spin vale type thin film element comprising the backed layer B1 made of Cu having a thickness of 1.5 nm (15 Å), which was obtained by micromagnetic simulation with a sensing current of 5 mA supplied. FIG. 41 indicates that a difference between the magnetization direction in the element central portion 314a and the magnetization direction at both ends 314b below the electrode overlay portions 318a is significantly improved, as compared with the case without the backed layer shown in FIG. 22.

It is thus possible to prevent the formation of a magnetic wall which inhibits the formation of a single magnetic domain state in the free magnetic layer, preventing the occurrence of nonuniformity in magnetization. In the spin-valve thin film element, therefore, the occurrence of Barkhausen noise can be prevented, and stability of processing of signals input from the magnetic recording medium can be improved.

The method of manufacturing the spin-valve thin film element of this embodiment will be described with reference to the drawings.

FIGS. 26 to 30 are cross-sectional front views illustrating the method of manufacturing the spin-valve thin film element of this embodiment.

The method (second manufacturing method) of manufacturing the spin-valve thin film element of this embodiment is briefly described. The method comprises the steps of forming, on the substrate 310, the layered films 316' comprising at least the antiferromagnetic layer 311, the first pinned magnetic layer 312A formed in contact with the antiferromagnetic layer 311 so that the magnetization direction is fixed by an exchange coupling magnetic field with the antiferromagnetic layer 311, the second pinned magnetic layer 312C formed on the first pinned magnetic layer 312A with the nonmagnetic intermediate layer 312B provided therebetween so that the magnetization direction is antiparallel to the magnetization direction of the first pinned magnetic layer 312A, the free magnetic layer 314 formed on the second pinned magnetic layer 312C with the nonmagnetic conductive layer 313 provided therebetween so that the magnetization direction crosses the magnetization direction of the second pinned magnetic layer 312C, the backed layer B1 made of a nonmagnetic conductive material and formed in contact with the side of the free magnetic layer 314 opposite to the nonmagnetic conductive layer 313;

forming on the layered films 316' lift off resist 372 in which notch portions 372a are formed in the lower surface facing the layered films 316'; removing portions not covered with the lift off resist 372 by ion milling to leave a portion of the antiferromagnetic layer 311, to form substantially the trapezoidal lamination 316; forming the hard bias layers 317 on both sides of the lamination 316 by any one sputtering method of an ion beam sputtering method, a long throw sputtering method, and a collimation sputtering method, or a combination thereof so that they are arranged in the same layer level as the free magnetic layer in order to orient magnetization of the free magnetic layer 314 in the direction cross the magnetization direction of the second pinned magnetic layer 312C; and forming the conductive layers 318 on the hard bias layers 317 and the portions of the lamination corresponding to the notch portions 372a of the lift off resist 372 with a target 376 inclined at an angle with the substrate 310 by any one sputtering method of an ion beam sputtering method, a long throw sputtering method, and a collimation sputtering method, or a combination thereof in order to supply the sensing current to the lamination 316.

Figure 26:
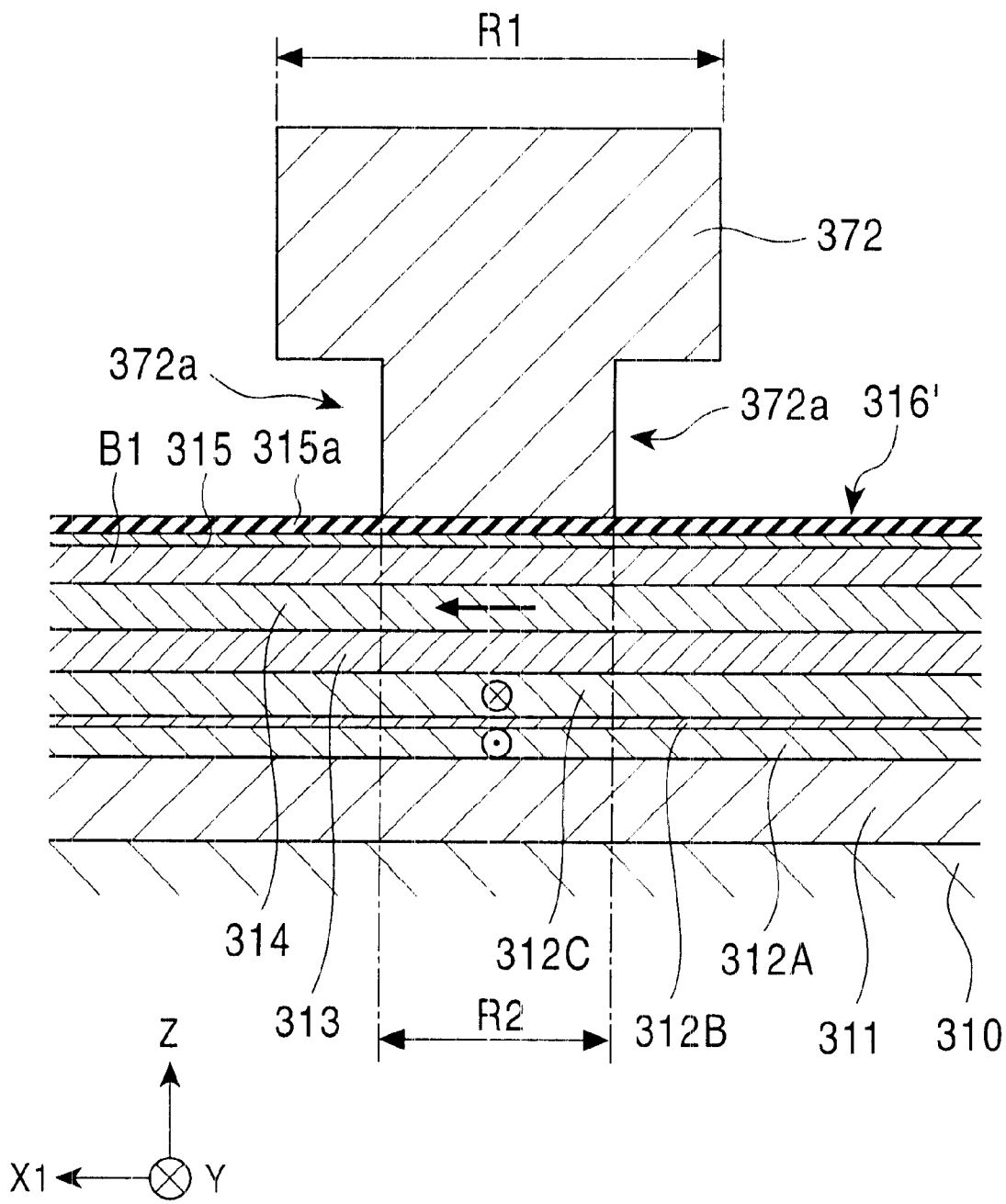
FIG. 26 is a sectional front view illustrating a method (second manufacturing method) of manufacturing a spin-valve thin film element in accordance with an embodiment of the present invention.

In further detail, as shown in FIG. 26, the layered films 316' are first formed on the substrate 310, which comprise at least the antiferromagnetic layer 311, the first pinned magnetic layer 312A formed in contact with the antiferromagnetic layer 311 so that the magnetization direction is fixed by an exchange coupling magnetic field with the antiferromagnetic layer 311, the second pinned magnetic layer 312C formed on the first pinned magnetic layer 312A with the nonmagnetic intermediate layer 312B provided therebetween so that the magnetization direction is antiparallel to the magnetization direction of the first pinned magnetic layer 312A, the free magnetic layer 314 formed on the second pinned magnetic layer 312C with the nonmagnetic conductive layer 313 provided therebetween so that the magnetization direction crosses the magnetization direction of the second pinned magnetic layer 312C, the backed layer B1 made of a nonmagnetic conductive material and formed in contact with the side of the free magnetic layer 314 opposite to the nonmagnetic conductive layer 313.

Preferably, the antiferromagnetic layer 311 comprises an alloy represented by the formula X—Mn (wherein X represents one element selected from Pd, Ru, Ir, Rh, and Os) in which the amount of X is in the range of 37 to 63 atomic %, or an alloy represented by the formula X'—Pt—Mn (wherein X' represents at least one element selected from Pd, Ru, Ir, Rh, Os, Au, Ag, Ne, Ar, Xe, and Kr) in which the total amount of X' and Pt is in the range of 37 to 63 atomic %. With the antiferromagnetic layer 311 made of the above material, heat treatment is required for producing an exchange coupling magnetic field in the interface with the first pinned magnetic layer 312A.

In the spin-valve thin film element in which the hard bias layers and conductive layers are formed only on both sides of the lamination, as shown in FIG. 25, as described above, the spin-valve thin film element is scanned on a microtrack on which a signal is recorded, in the track width direction to detect reproduced output. Then, the sensitive region which produces 50% or more of the maximum reproduced output, and the insensitive region which produces only 50% or less of the maximum reproduced output are previously defined.

Next, on the basis of the results, the lift off resist 372 is formed on the layered films 316' by the microtrack profile method in consideration of the width dimension of the insensitive region, which has previously determined. As shown in FIG. 26, the resist 372 covers the plane portion of the layered films 316' having width dimension R1 in the track width direction (the X1 direction shown in the drawing), and the notch portions 372a are formed in the lower surface of the resist layer 372. The notch portions 372a are formed on the insensitive regions of the layered films 316', and the sensitive region of the layered films 316' is completely covered with the resist 372 with a width dimension R2.

The track width dimension of the upper surface of the lamination 316 is defined by the width dimension R2.

Figure 27:
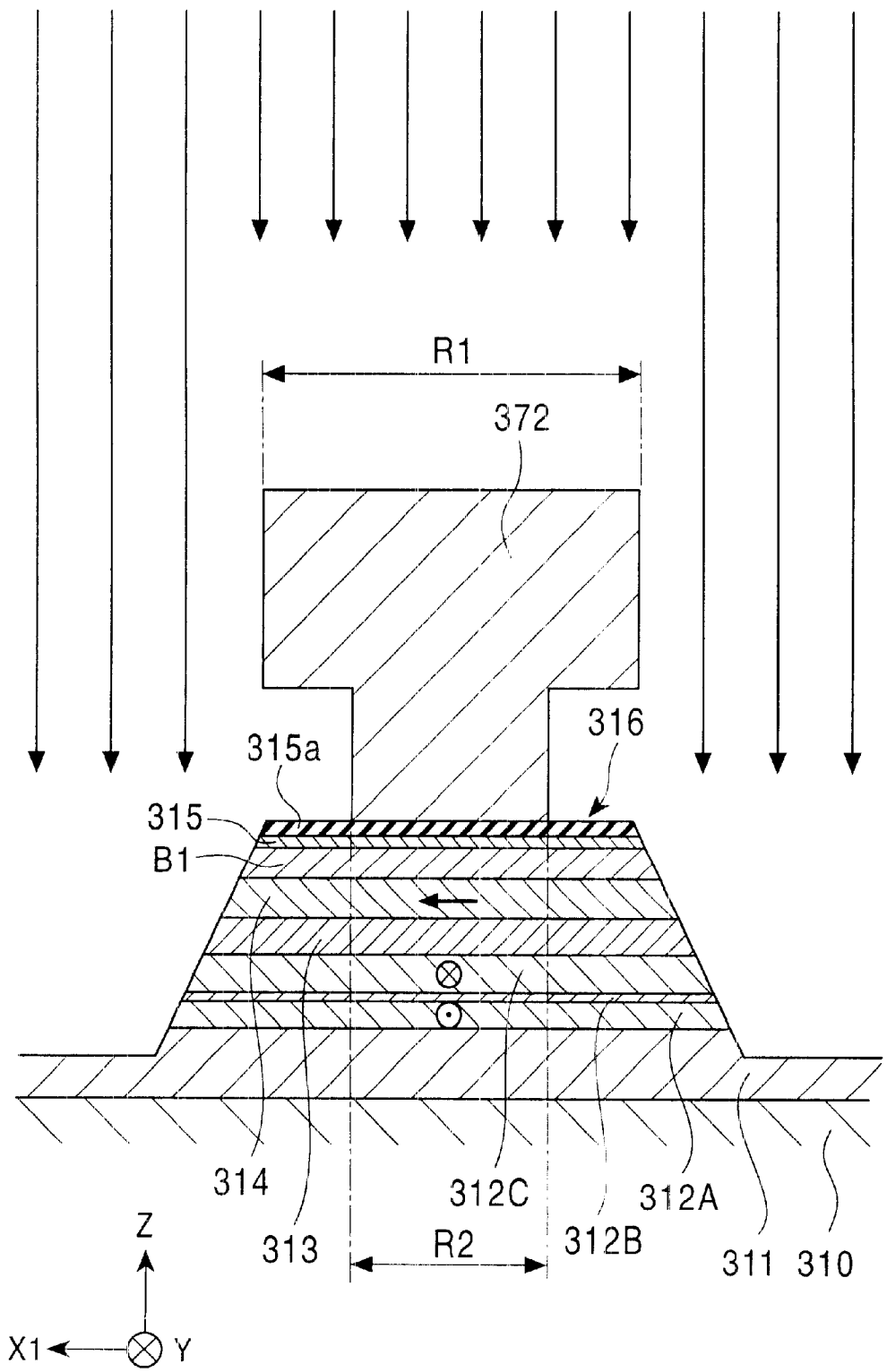
FIG. 27 is a sectional front view illustrating the method (second manufacturing method) of manufacturing a spin-valve thin film element in accordance with an embodiment of the present invention.

Next, in the step shown in FIG. 27, the portions on both sides of the layered films 316' are removed by etching to leave a portion on the lower side of the antiferromagnetic layer 311, to form the lamination 316. In the step shown in FIG. 28, the bias base layers 317a, the hard bias layers 317, and the intermediate layer 319 are formed on both sides of the lamination 316.

In this embodiment, deposition of the hard bias layers 317 and deposition of the conductive layers 318 in the next step are preferably performed by any one sputtering method of an ion beam sputtering method, a long throw sputtering method, and a collimation sputtering method, or a combination thereof.

Figure 28:
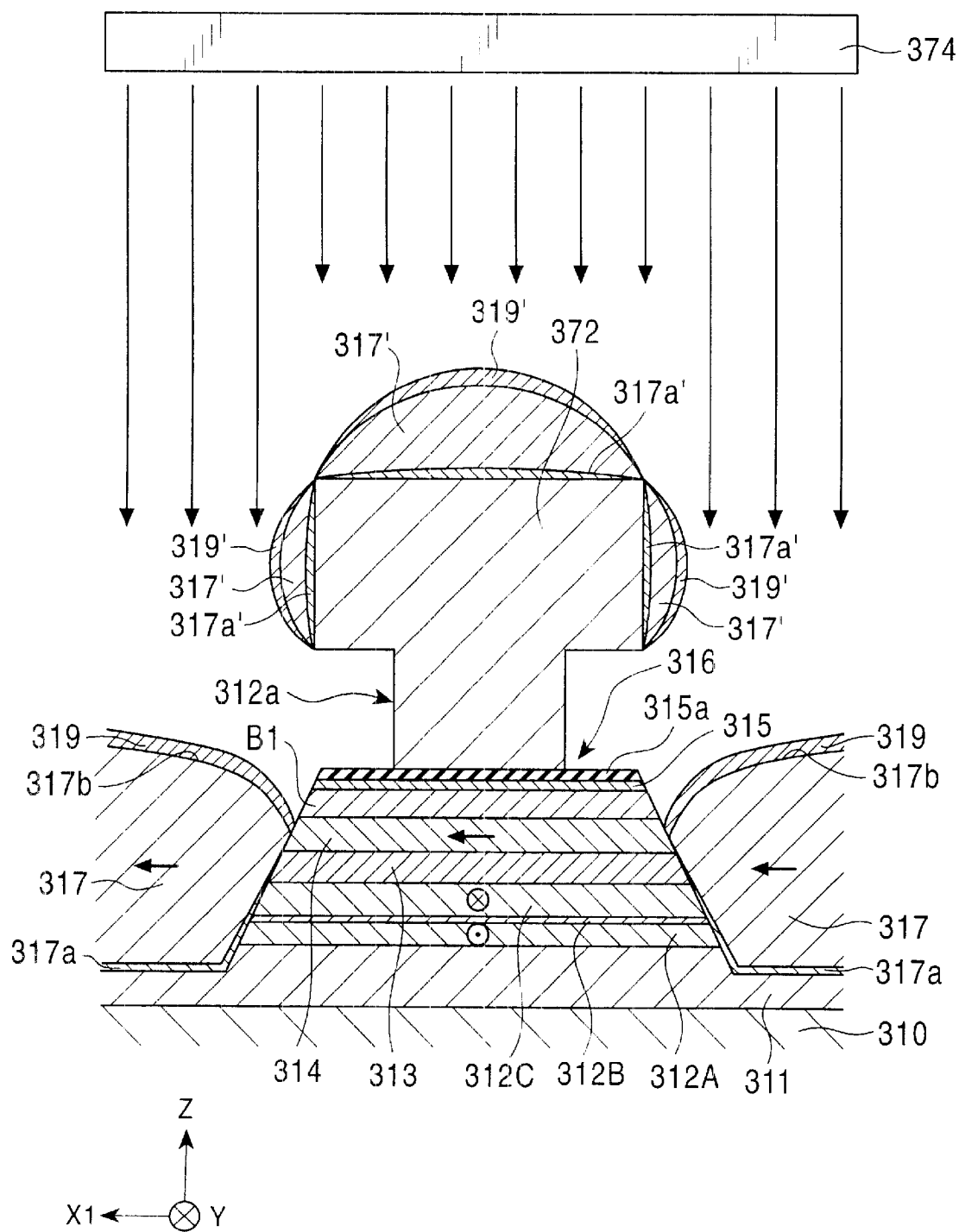
FIG. 28 is a sectional front view illustrating the method (second manufacturing method) of manufacturing a spin-valve thin film element in accordance with an embodiment of the present invention.

In this embodiment, as shown in FIG. 28, the substrate 310 on which the lamination 316 is formed is arranged substantially perpendicularly to a beam emitted from the target 374 comprising the composition of the hard bias layers 317 so that the hard bias layers 317 can be formed in the direction substantially perpendicular to the lamination 316 by, for example, the ion beam sputtering method. Therefore, the hard bias layers 317 are not formed in the notch portions 372a of the resist 372 formed on the lamination 316.

In depositing the particles emitted from the target 374 on the hard bias base layers 317a, the deposit thickness of the particles is controlled so that the upper surfaces 317b of the hard bias layers 317 composed of the particles are joined to the sides of the lamination 316 in the same layer level as the free magnetic layer 314 between the upper and lower surfaces thereof. More preferably, the deposit thickness of the particles is controlled so that the upper surfaces 317b of the hard bias layers 317 composed of the particles are joined to the sides of the lamination 316 in the same layer level as the free magnetic layer 314 between the upper surface and the half-thickness position thereof.

Furthermore, layers 317a', 317' and 319' having the same compositions as the bias base layers 317a, the hard bias layers 317, and the intermediate layers 319, respectively, are formed on the resist 372.

Figure 29:
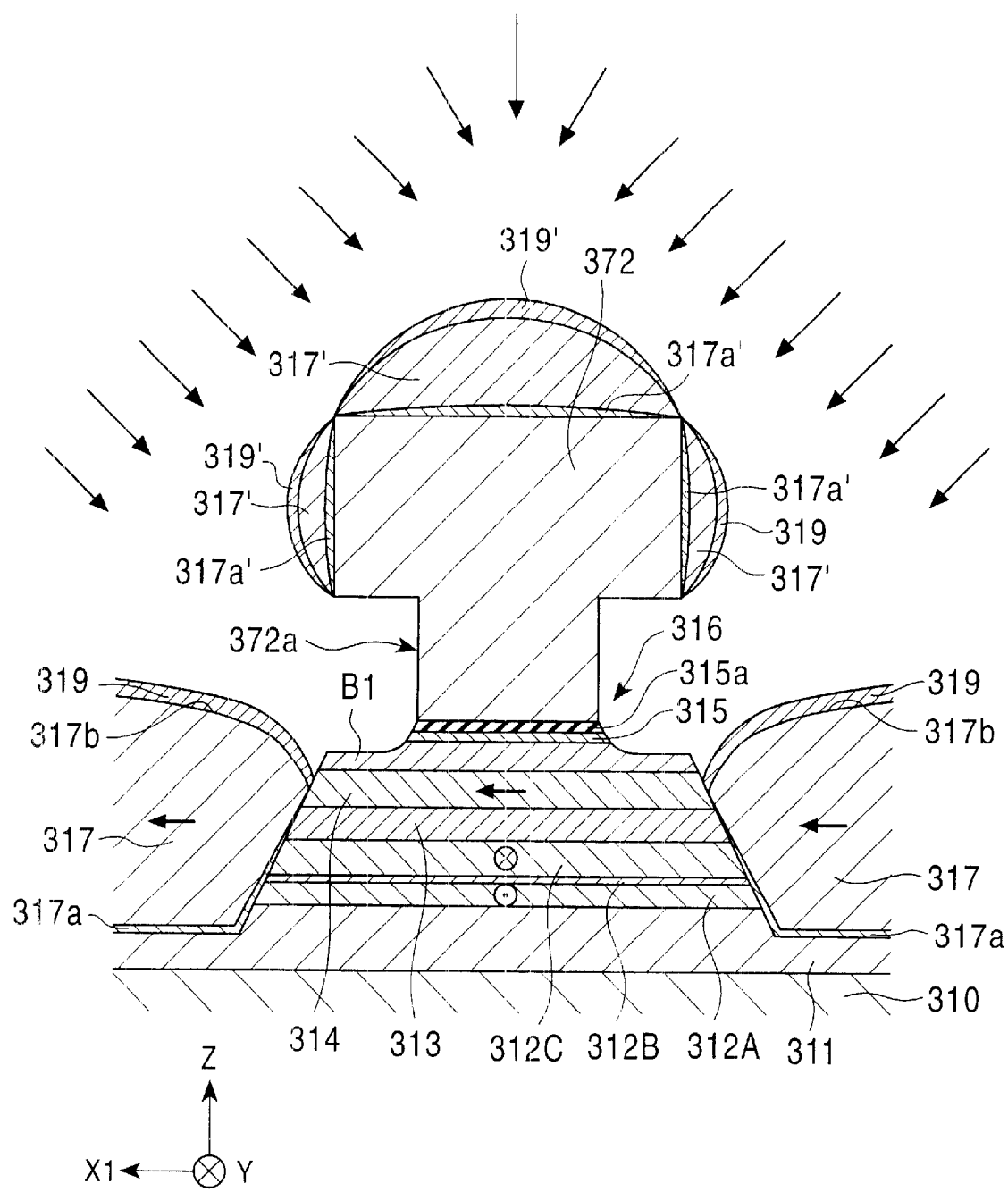
FIG. 29 is a sectional front view illustrating the method (second manufacturing method) of manufacturing a spin-valve thin film element in accordance with an embodiment of the present invention.

Next, in the step shown in FIG. 29, portions of the surface of the lamination 316 corresponding to the insides of the notch portions 372a are removed by Ar ion milling, reverse sputtering, or the like in the direction oblique to the lamination 316. As a result, portions of the oxide layer 315a, the protecting layer 315 and the backed layers B1 are removed to form portions of the conductive layers 318 which directly contact the lamination 316.

Figure 30:
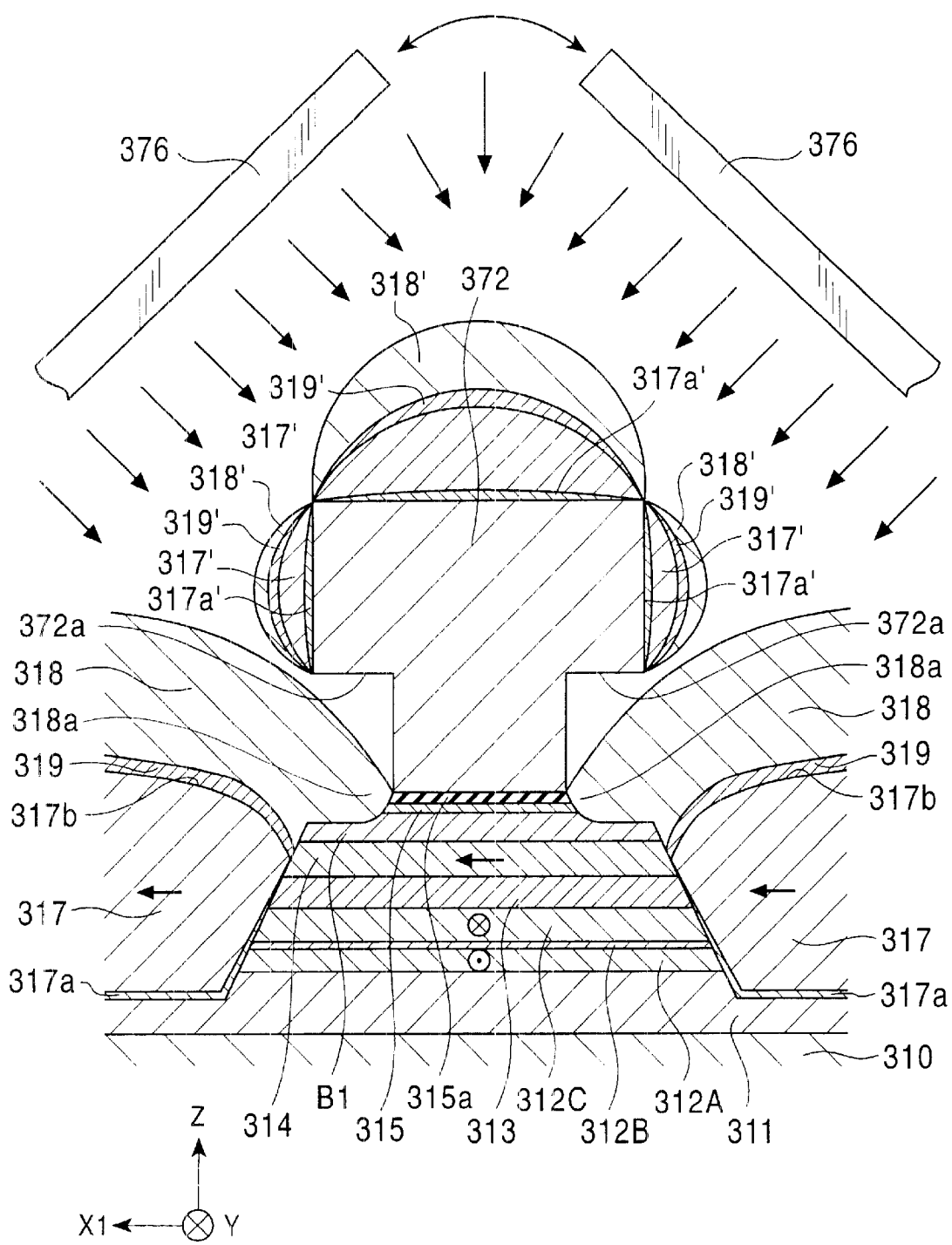
FIG. 30 is a sectional front view illustrating the method (second manufacturing method) of manufacturing a spin-valve thin film element in accordance with an embodiment of the present invention.

In the step shown in FIG. 30, the conductive layers 318 are deposited on the hard bias layers 317 in the direction oblique to the lamination 316. At this time, the conductive layers 318 are formed to the insides of the notch portions 371a of the resist film 372 provided on the lamination 316.

For example, in depositing the conductive layers 318 on the hard bias layers 317 by the ion beam sputtering method, the target 372 comprising the composition of the conductive layers 318 is inclined at an angle with the substrate 310 and moved or rotated above the substrate 310 on which the lamination 316 is formed.

In this deposition, the conductive layers 318 obliquely sputtered are deposited not only on the hard bias layers 317 but also in the notch portions 372a of the resist layer 372 formed on the lamination 316 to form the overlay portions 318a. Namely, the overlay portions 318a of the conductive layers 318, which are deposited in the notch portions 372a, are formed in portions which respectively cover the insensitive regions of the lamination 316.

Although, in FIG. 30, the target 376 is move or rotated obliquely to the substrate 310 which is fixed, the substrate 310 may be moved or rotated obliquely to the target 376 which is fixed. As shown in FIG. 30, layer 318' having the same composition as the conductive layers 318 is formed on the layer 319' on the resist 372.

In the next step, the resist 372 shown in FIG. 30 is removed by lift off using a resist removing solution to complete the spin-valve thin film magnetic element (spin-valve thin film element) in which the conductive layers 318 are also formed on the insensitive regions of the lamination 316 shown in FIG. 25.

In this embodiment, the dimension of each of the notch portions 372a in the track width direction is set by the width dimension R1 and width dimension R2 of the resist 372 in the track width direction so that the length dimension of the overlay portions 318a of the conductive layer 318 in the track width direction can be set to 0.03 to 0.10 $\mu$m.

In the method of manufacturing the spin-valve thin film element of this embodiment, one formation of the photoresist 372 permits the formation of the lamination 316, the hard bias layers 317 and the conductive layers 318 having the desired shapes, and the hard bias layers 317 and the conductive layers 318 are formed in the desired shapes by the sputtering method in which the target 374 or 376 is opposed to the substrate 310 selectively in an inclined state or noninclined state. Therefore, the spin-valve thin film element shown in FIG. 25 can easily be obtained by a small number of steps.

In the spin-valve thin film element shown in FIG. 25, the overlay portions 318a of the conductive layers 318 are connected to the portions of the backed layer B1 exposed from the upper surface of the lamination 316. However, the intermediate layers 319 between the conductive layers 318 and the hard bias layer 317 may be extended to both sides of the upper surface of the lamination 316 so that the overlay portions 318a may be connected to the backed layer B1 through the intermediate layers 319.

Next, the method (third manufacturing method) of manufacturing the spin-valve thin film element having the above construction is described with reference to FIG. 31 to 35. Outlines of the method of manufacturing the spin-valve thin film element are described. Like the second manufacturing method, the method comprises the steps of forming the layered films 316'; forming fist lift off resist 370 in which notch portions 372a are formed in the same manner as the second manufacturing method; removing portions not covered with the first lift off resist 370 by ion milling to leave a portion of the antiferromagnetic layer 311, to form substantially the trapezoidal lamination 316; forming the hard bias layers 317 on both sides of the lamination 316 by the same sputtering method as the second manufacturing method so that they are arranged in the same layer level as the free magnetic layer 314; removing the first lift off resist 370; forming, on the lamination 316, second lift off resist 382 having a portion in contact with the lamination 316 with a sideward dimension R4 smaller than that of the first lift off resist 370, and having notch portions 382a formed in the lower side facing the lamination 316; and forming the conductive layers 318 on the portions not covered with the second lift off resist 382 by the same sputtering method as the second manufacturing method.

In further detail, like in the method of manufacturing the spin-valve thin film element of the seventh embodiment shown in FIG. 26, the antiferromagnetic layer 311, the first pinned magnetic layer 312A, the nonmagnetic intermediate layer 312B, the second pinned magnetic layer 312C, the nonmagnetic conductive layer 313, the free magnetic layer 314, and the backed layer B1 are deposited in turn on the substrate 310 to form the layered films 316'.

With the antiferromagnetic layer 311 made of an alloy represented by the formula X—Mn or the formula X'—Pt—Mn, heat treatment is required for producing an exchange coupling magnetic field in the interface with the first pinned magnetic layer 312A.

Figure 31:
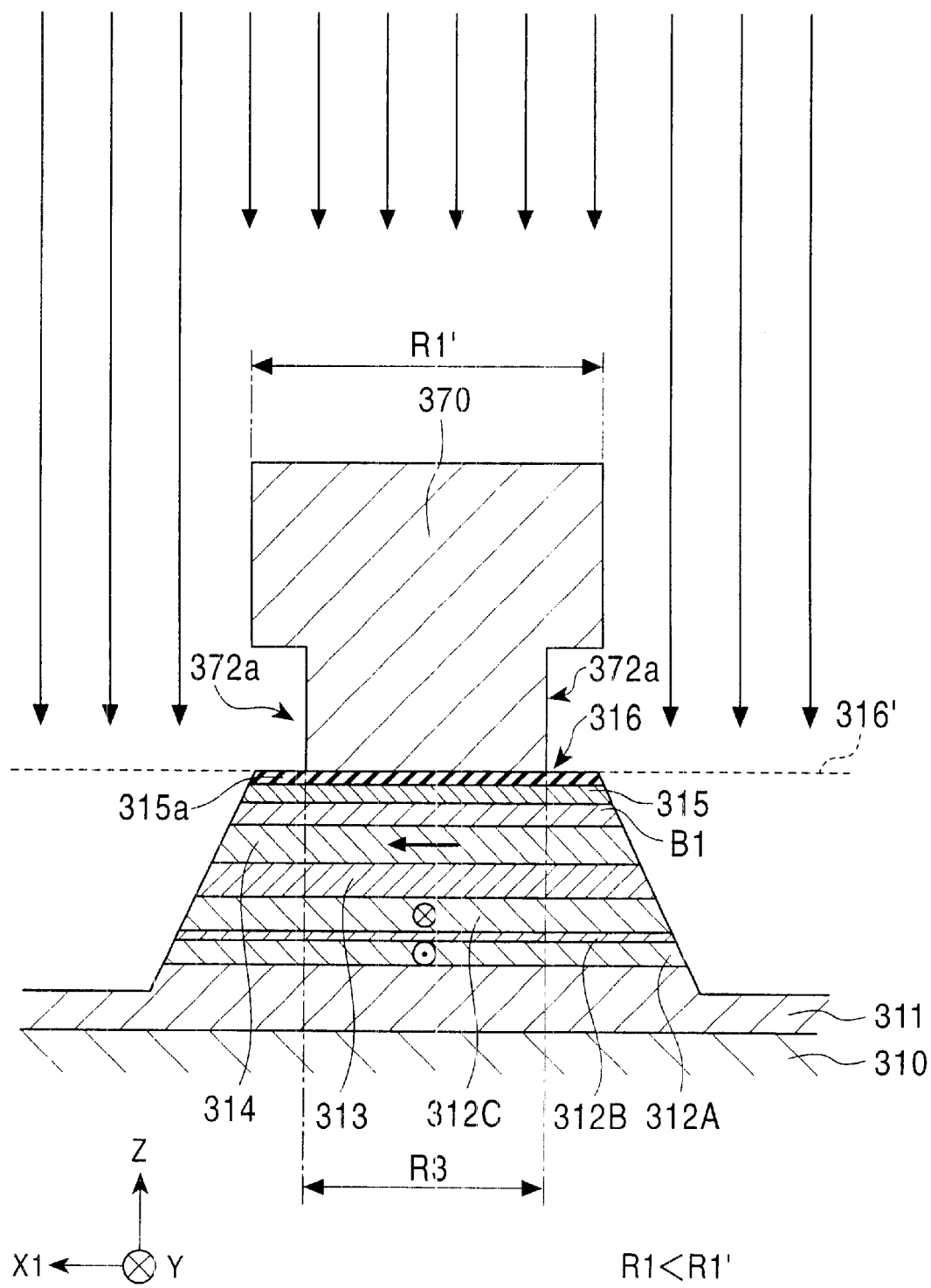
FIG. 31 is a sectional front view illustrating a method (third manufacturing method) of manufacturing a spin-valve thin film element in accordance with an embodiment of the present invention.

Next, the first lift off resist 370 is formed on the layered films 316'. As shown in FIG. 31, the resist 370 is formed to cover a plane portion of the layered films 316' with a width dimension R1' in the track width direction (the X1 direction shown in the drawing) and to be brought into contact with the layered films 316' with a width dimension R3 in the track width direction (the X1 direction).

The resist layer 370 also has the notch portions 372a formed in the lower side thereof. The notch portions 372a preferably have a size which allows the lift off, and the width dimension R3 can be set to be larger than the width dimension R2 of the resist 372 shown in FIG. 26 in the X1 direction.

The dimension of the upper surface of the lamination 316 in the track width direction is defined by the width dimension R1'. The width dimension R1' of the resist layer 370 can be set to be larger than the width dimension R1 of the resist 372 shown in FIG. 26 in the X1 direction. Namely, the following relation is obtained.

$$R1 < R1'$$

This is because even in a case where the overlay portions 328a are formed not only in the insensitive region but also in the sensitive region, as described above in the seventh embodiment, it is possible to decrease the influence of the sensing current magnetic field, and improve the reproduction properties of the element. Namely, the magnetic track width of the spin-valve thin film element can be defined by the width dimension of the distance between the ends of the overlay portions 382a regardless of the length dimension of the overlay portions 382a in the track width direction, i.e., the overlay length.

At the same time, the length dimension of the overlay portions 382a in the track width direction, i.e., the overlay length, can thus be set to be long.

Next, in the step shown in FIG. 31, the portions on both sides of the layered films 316' are removed by etching to leave a portion on the lower side of the antiferromagnetic layer 311, to form the lamination 316. In the step shown in FIG. 32, the bias base layers 317a, and the hard bias layers 317 are formed on both sides of the lamination 316.

In this embodiment, deposition of the hard bias layers 317 and deposition of the conductive layers 318 in the subsequent step are preferably performed by any one sputtering method of an ion beam sputtering method, a long throw sputtering method, and a collimation sputtering method, or a combination thereof.

Figure 32:
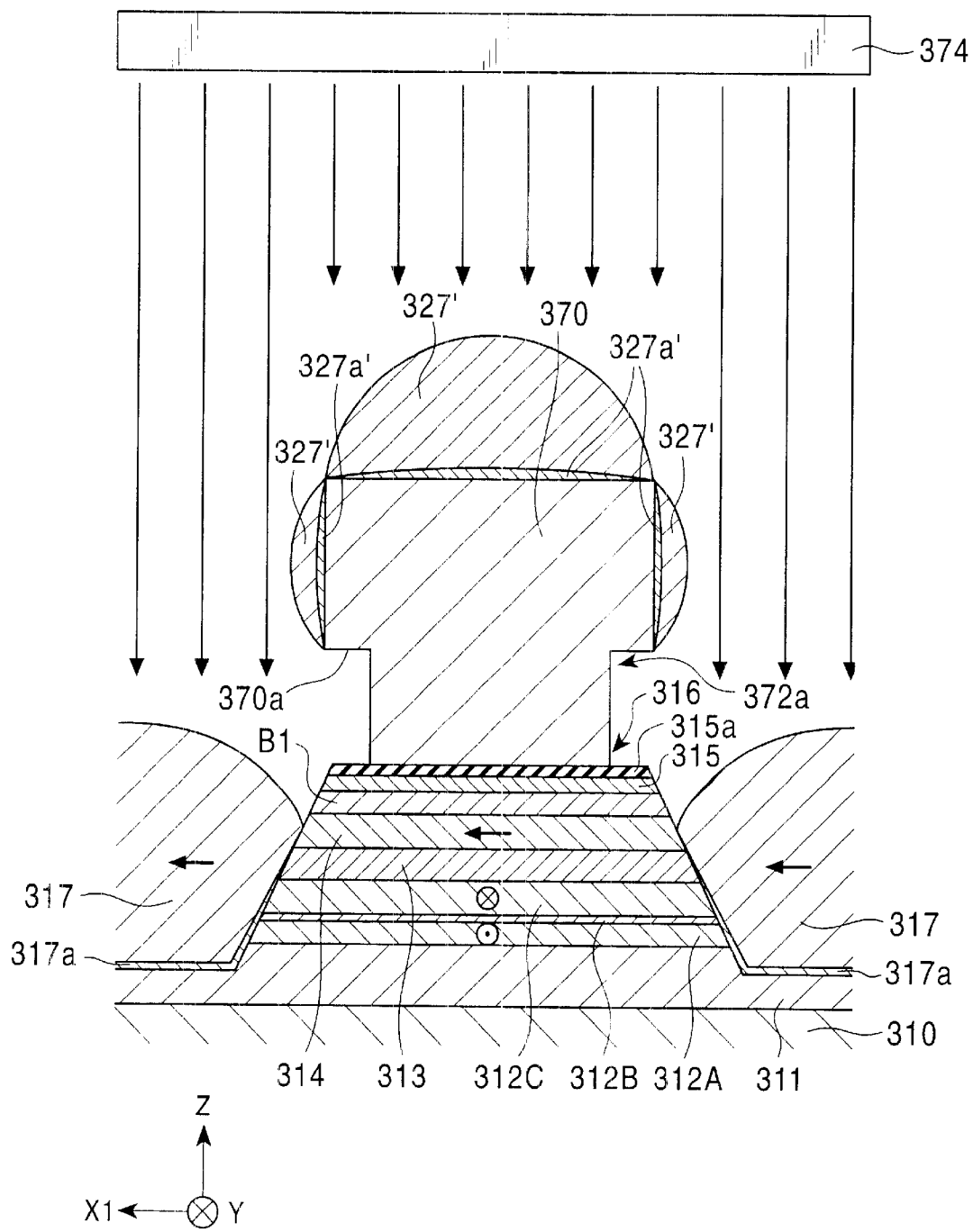
FIG. 32 is a sectional front view illustrating the method (third manufacturing method) of manufacturing a spin-valve thin film element in accordance with an embodiment of the present invention.

In this embodiment, as shown in FIG. 32, the substrate 310 on which the lamination 316 is formed is arranged substantially perpendicularly to a beam emitted from the target 374 comprising the composition of the hard bias layers 317 so that the hard bias layers 317 can be formed in the direction substantially perpendicular to the lamination 316 by, for example, the ion beam sputtering method. Therefore, the hard bias layers 317 are not formed in the notch portions 372a of the resist 372 formed on the lamination 316.

In depositing the particles emitted from the target 374 on the hard bias base layers 317a, the deposit thickness of the particles is controlled so that the upper surfaces 317b of the hard bias layers 317 composed of the particles are joined to the sides of the lamination 316 in the same layer level as the free magnetic layer 314 between the upper and lower surfaces thereof. More preferably, the deposit thickness of the particles is controlled so that the upper surfaces 317b of the hard bias layers 317 composed of the particles are joined to the sides of the lamination 316 in the same layer level as the free magnetic layer 314 between the upper surface and the half-thickness position thereof.

Furthermore, layers 327a' and 327' having the same compositions as the bias base layers 317a and the hard bias layers 317 are formed on the resist 370.

Figure 33:
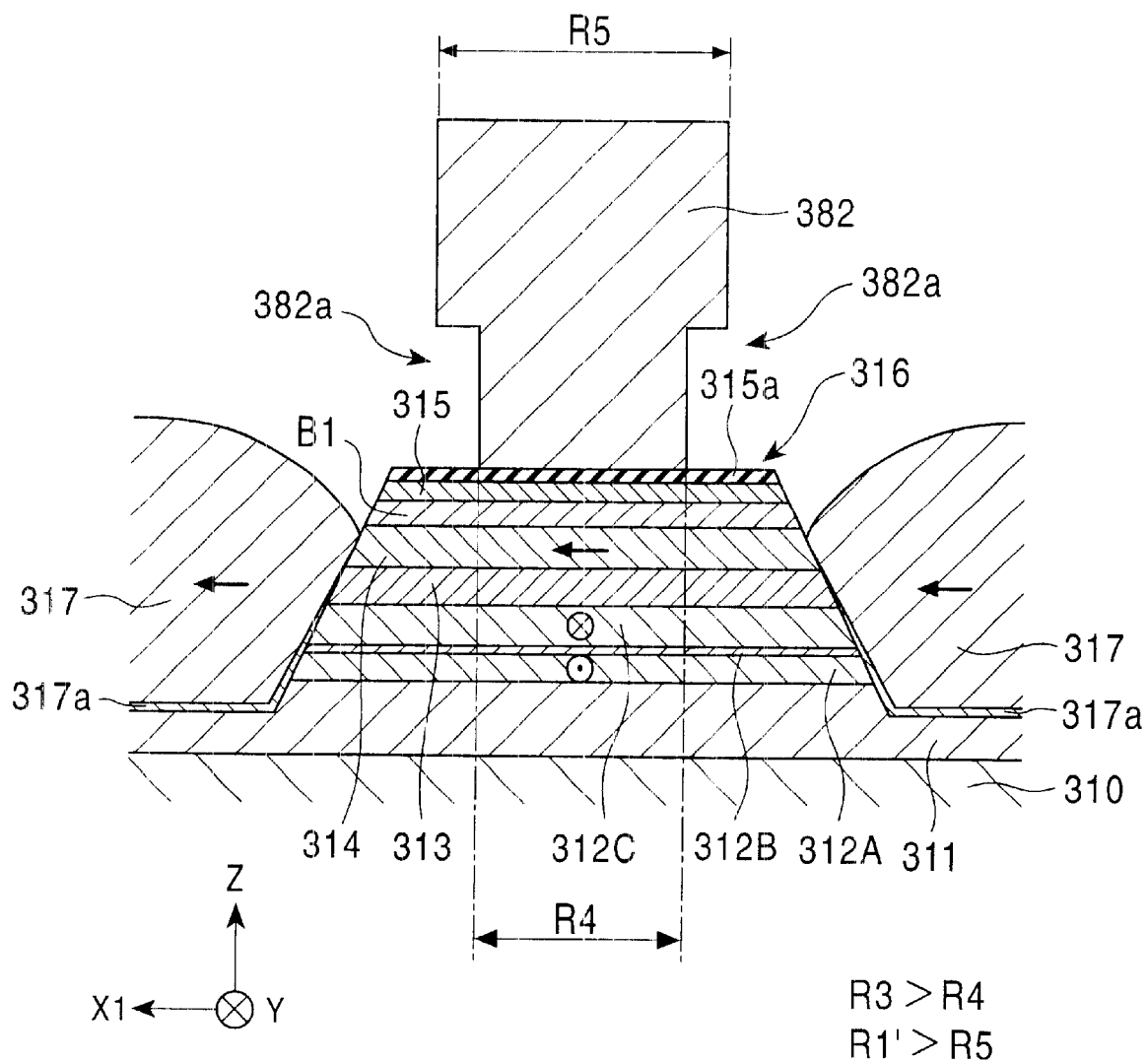
FIG. 33 is a sectional front view illustrating the method (third manufacturing method) of manufacturing a spin-valve thin film element in accordance with an embodiment of the present invention.

Next, the first lift off resist 370 is removed by lift off using a resist removing solution, and the second lift off resist 382 is formed on the lamination 316 in the step shown in FIG. 33.

As shown in FIG. 33, the resist 382 is formed to be brought into contact with the lamination 316 with a width dimension R4 in the track width direction (the X1 direction) and to cover a plane portion of the lamination 316 with a width dimension R5 in the track width direction (the X1 direction shown in the drawing). The resist layer 382 has the notch portions 382a formed in the lower side thereof.

As shown in FIG. 33, the second lift off resist 382 is provided at the center of the lamination 316 in the track width direction. Therefore, the length dimensions of the right and left overlay portions 318a in the track width direction, which are formed in the subsequent step, are set to the same value.

In addition, a difference between the width dimensions R4 and R5, i.e., a difference between the width dimensions at each of both ends in the track width direction, is set to define the length of a position of one of the conductive layers 318 formed for the lamination, which is extended to the surface of the lamination 316 toward the other conductive layer 318, i.e., the dimension of each of the overlay portions 382a in the track width direction, i.e., the overlay length. At the same time, the magnetic track width of the spin-valve thin film element can be set by the width dimension R4.

Figure 34:
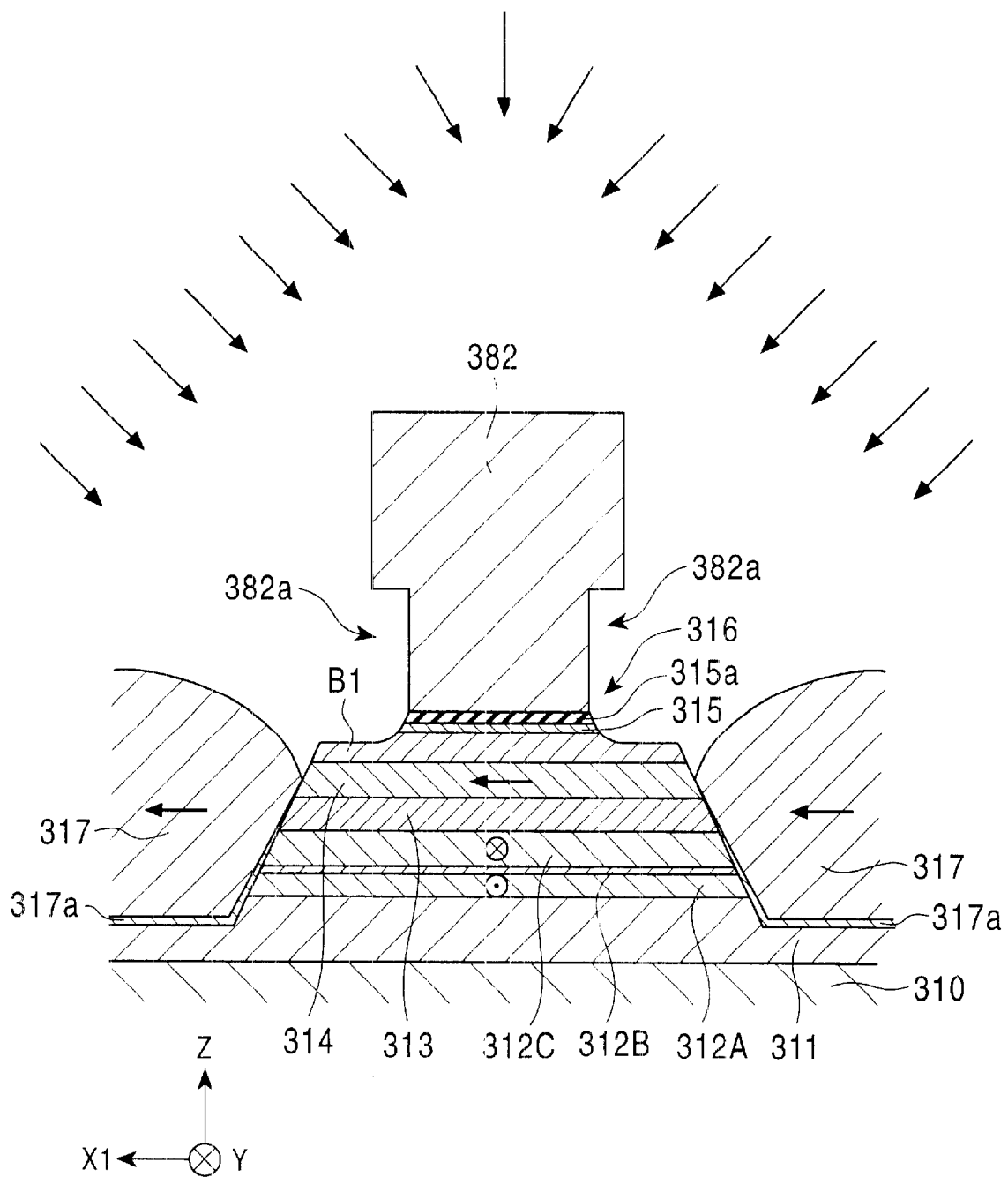
FIG. 34 is a sectional front view illustrating the method (third manufacturing method) of manufacturing a spin-valve thin film element in accordance with an embodiment of the present invention.

Next, in the step shown in FIG. 34, portions of the surface of the lamination 316 corresponding to the portions having no second lift off resist 382 formed are removed by Ar ion milling, reverse sputtering, or the like in the direction oblique to the lamination 316. As a result, portions of the oxide layer 315a, the protecting layer 315 and the backed layers B1 are removed to form portions of the conductive layers 318 which directly contact the lamination 316.

Figure 35:
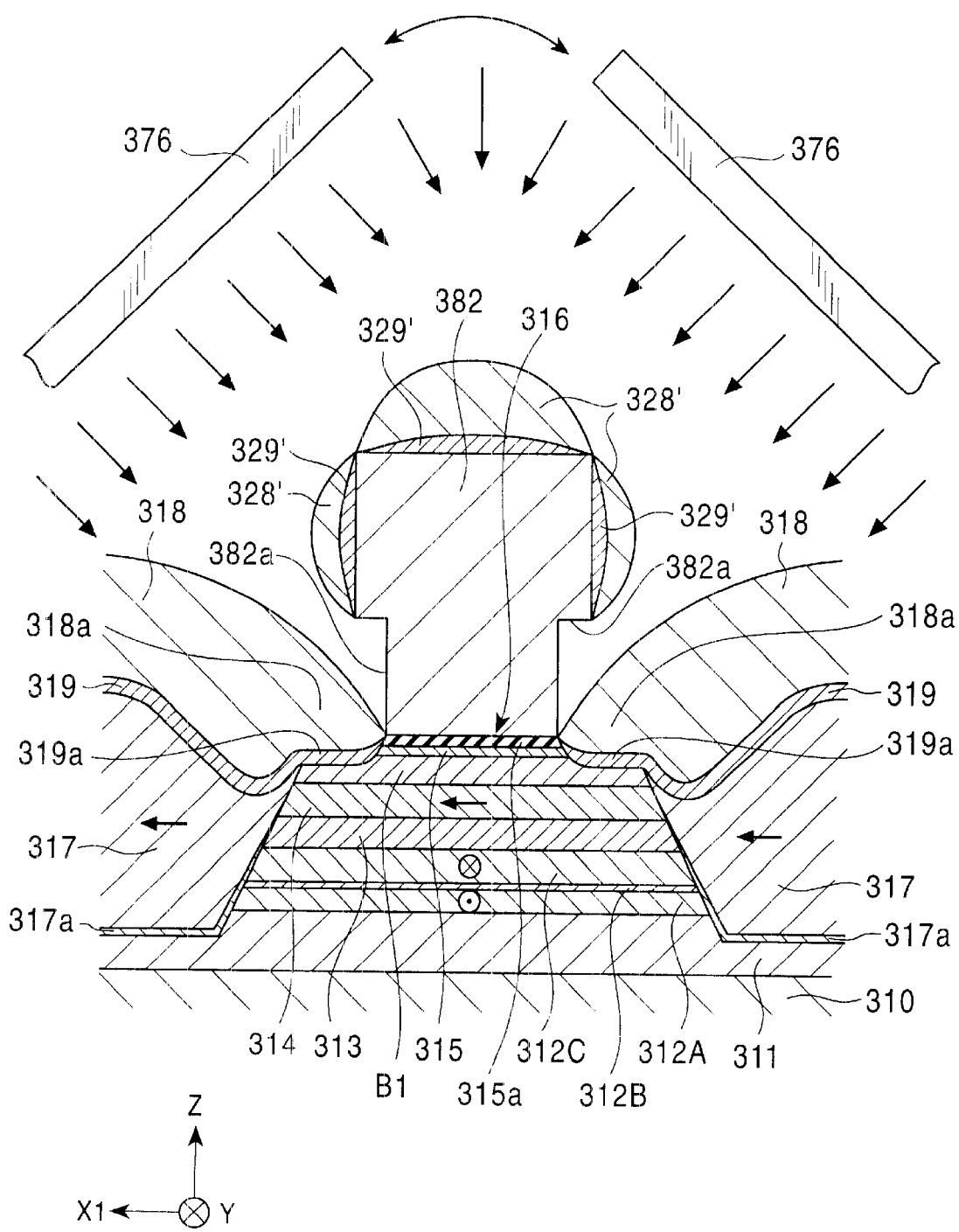
FIG. 35 is a sectional front view illustrating the method (third manufacturing method) of manufacturing a spin-valve thin film element in accordance with an embodiment of the present invention.

In the step shown in FIG. 35, for the lamination 316, the intermediate layers 319 of Ta are formed on the hard bias layers 317 by the ion beam sputtering method. At this time, continued portions 319a continued from the intermediate layers 319 are formed on the exposed portions of the backed layer B1.

Then, the conductive layers 318 made of Cr are formed by epitaxial growth on the intermediate layers 319 and the continued portions 319a using the same ion beam sputtering method.

As shown in FIG. 35, layers 329' and 328' having the same compositions as the intermediate layer 319, and the conductive layers 318, respectively, are formed on the resist 382.

In the next step, the resist 382 shown in FIG. 35 is removed by lift off using the resist removing solution to complete the spin vale type thin film magnetic element (spin-valve thin film element) in which the intermediate layers 319 and the conductive layers 318 are also formed in the insensitive regions of the lamination 316.

In this embodiment, a difference between the dimension R1' in the first lift off resist 370 in the sideward direction (the track width direction) of the lamination 316 and the width dimension R5 in the second lift off resist 382 in the sideward direction (the track width direction) of the lamination 316 is set to 0.2 to 1.0 μm, i.e., a difference (R1'−R5) between the width dimensions of the resists 370 and 382 at each of both ends thereof in the track width direction is set to 0.1 to 0.5 μm, so that the dimension of each of the overlay portions 318a in the track width direction can be set to 0.1 to 0.5 μm.

The third method of manufacturing the spin-valve thin film element comprises two resist steps of respectively forming the two types of lift off resist 370 and 382 having different width dimensions on the lamination 316 to form the lamination 316 and the hard bias layers 317. In addition, the intermediate layers 319 and the conductive layers 319 can be formed in the desired shapes by any one sputtering method of an ion beam sputtering method, a long throw sputtering method, and a collimation sputtering method, or a combination thereof with the target 376 opposed to the substrate 310 selectively in an inclined state or a noninclined state, to obtain the spin valve thin film element.

In this case, the length of the overlay portions 318a of the conductive layers 318 can be set to a large value as compared with the second manufacturing method comprising one step of forming the photoresist 372, and the overlay portions 318a can be formed regardless of the dimension of each of the notch portions 382a in the track width direction. Therefore, the thickness of the overlay portions 318a, particularly the thickness of the tip portions through which the sensing current flows into the lamination 316, can be set to a large value, thereby further preventing the occurrence of side reading.

Eighth Embodiment

Figure 36:
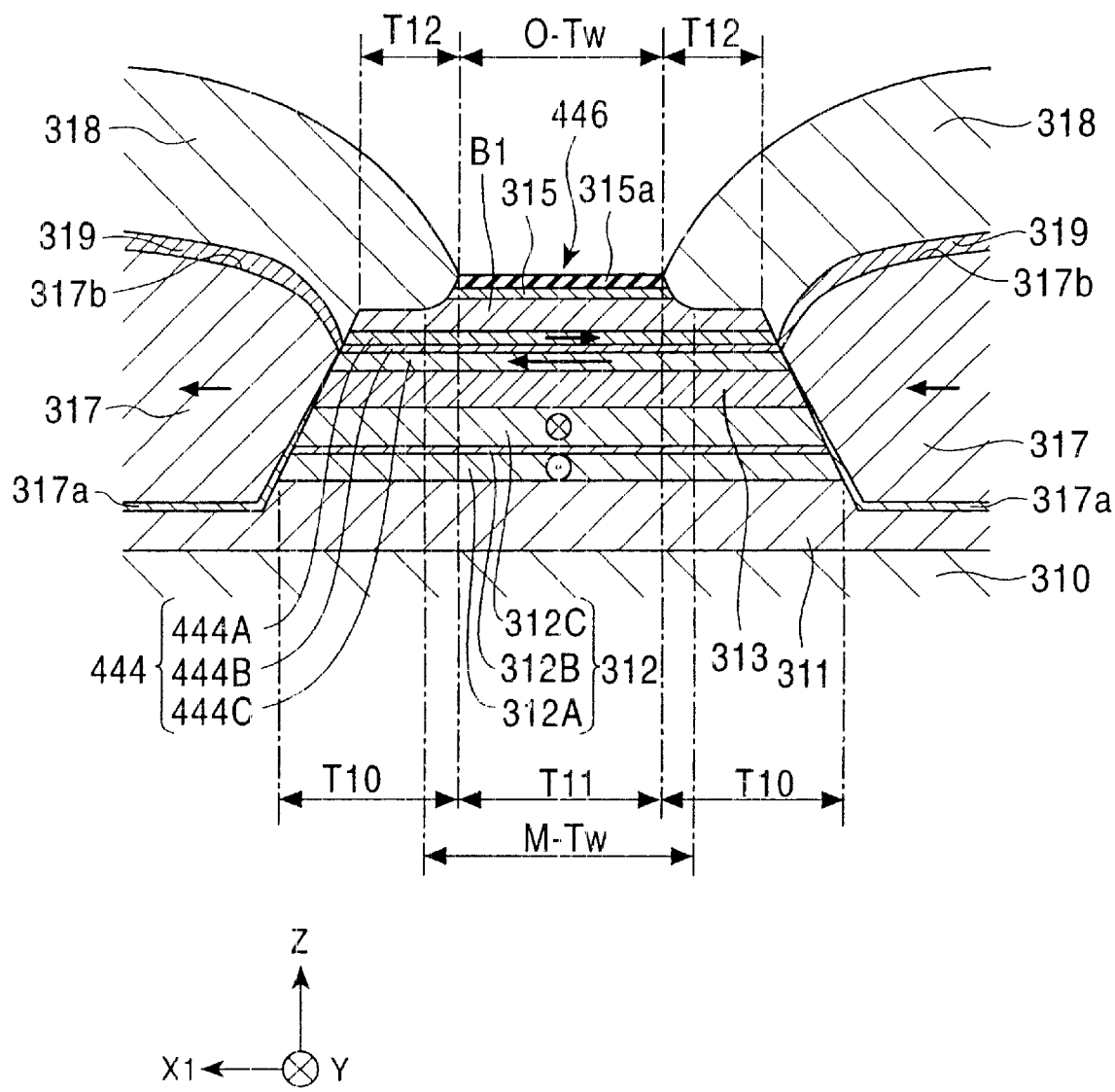
FIG. 36 is a sectional view showing the structure of a spin-valve thin film element in accordance with an eighth embodiment of the present invention as viewed from the side opposing a recording medium
Figure 37:
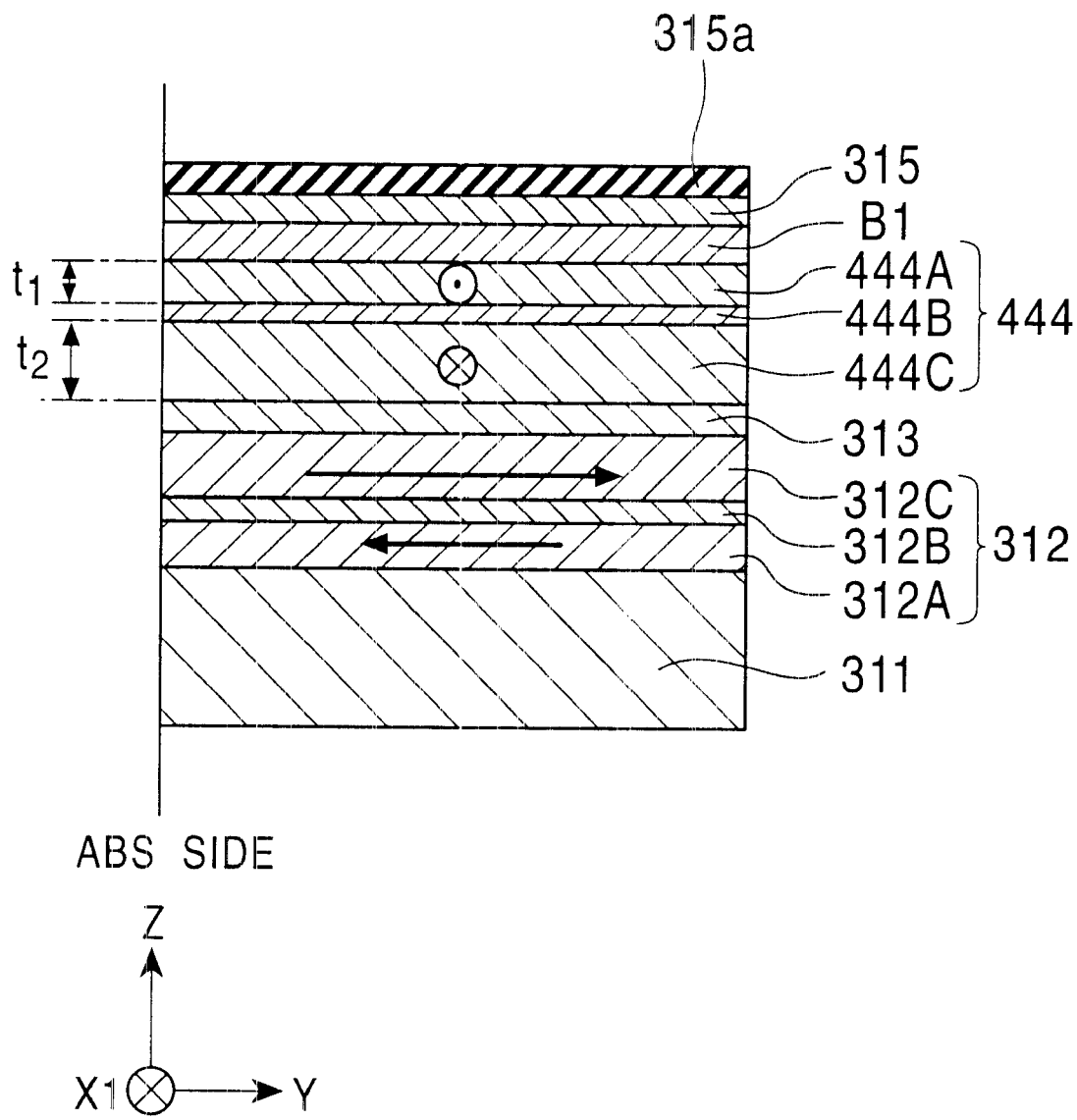
FIG. 37 is a sectional view of the spin-valve thin film element shown in FIG. 36 as viewed from the direction of the track width.

FIG. 36 is a sectional view showing the structure of a spin-valve thin film element in accordance with an eighth embodiment of the present invention as viewed from the side facing a recording medium. FIG. 37 is a sectional view of the spin-valve thin film element as viewed from the track width direction.

The spin-valve thin film element of this embodiment is a bottom type synthetic-ferri-pinned spin valve element, and is different from the seventh embodiment shown in FIG. 25 in that a free magnetic layer is a synthetic-ferri-free type.

In FIG. 36, reference numeral 311 denotes an antiferromagnetic layer provided on a substrate 310, a pinned magnetic layer 312 being formed on the antiferromagnetic layer 311.

The pinned magnetic layer 312 comprises a first pinned magnetic layer 312A and a second pinned magnetic layer 312C which are formed with a nonmagnetic intermediate layer 312B provided therebetween so that the magnetization direction of the first pinned magnetic layer 312A is antiparallel to the magnetization direction of the second pinned magnetic layer 312C.

A nonmagnetic conductive layer 313 made of Cu (copper) or the like is formed on the second pinned magnetic layer 312C, and a synthetic-ferri-free type free magnetic layer 444 is formed on the nonmagnetic conductive layer 313.

The free magnetic layer 444 is divided into two layers including first and second free magnetic layers 444A and 444C with a nonmagnetic intermediate layer 444B provided therebetween so that the divided layers 444A and 444C are brought into the ferromagnetic state where the magnetization 1directions are 180° different from each other. The first free magnetic layer 444A is provided on the backed layer B1 side, and the second free magnetic layer 444C is provided on the nonmagnetic conductive layer 313 side.

The first and second free magnetic layers 444A and 444C comprise the same material as the free magnetic layer 314 of the seventh embodiment, and the nonmagnetic intermediate layer 444B preferably comprises one of Ru, Rh, Ir, Cr, Re and Cu, or an alloy of at least two elements thereof.

Each of the first and second pinned magnetic layers 444A and 444C comprises a NiFe alloy film, a CoFe alloy film, or a CoNiFe alloy film. The first and second free magnetic layers 444A and 444C have different thicknesses.

Each of the first and second free magnetic layers 444A and 444C may comprise two layers.

A Co layer may be formed on each of the sides of the first and second free magnetic layers 444A and 444C which contact the nonmagnetic intermediate layer 444B and the backed layer B1. In this case, the rate of change in resistance can be increased, and diffusion to the nonmagnetic intermediate layer 444B and the backed layer B1 can be prevented.

A Co layer is preferably provided on the sides of the second free magnetic layer 444C and the second pinned magnetic layer 312C which contact the nonmagnetic conductive layer 313.

The backed layer B1 is provided on the free magnetic layer 444, and a protecting layer 315 made of Ta or the like is formed on the backed layer B1. An oxide layer 315a made of tantalum oxide (Ta-oxide) is formed on the upper side of the protecting layer 315.

As shown in FIG. 36, layers ranging from a portion of the antiferromagnetic layer 311 to the oxide layer 315a constitute a lamination 446 having a substantially trapezoidal sectional shape.

In FIG. 25, reference numeral 317 denotes a hard bias layer; reference numeral 318, a conductive layer; reference numeral 319, an intermediate layer.

The hard bias layers 317 are formed on the portions of the antiferromagnetic layer 311, which are projected on both sides of the lamination 316, with bias base layers 317a formed between the hard bias layers 317 and the projected portions. The conductive layers 318 are respectively formed on the hard bias layers 317 with intermediate layers 319 of Ta provided therebetween.

The upper surfaces 317b of the hard bias layers 317 are joined to the sides of the lamination 446 in the same layer level as the second free magnetic layer 444C between the upper and lower surfaces thereof. Therefore, the leakage magnetic field from the hard bias layers 317 can be applied to only the second free magnetic layer 444C.

The upper surfaces 317b of the hard bias layers 317 are preferably joined to the sides of the lamination 446 in the same layer level as the second free magnetic layer 444C between the upper surface and the half-thickness position thereof. Therefore, a strong bias magnetic field from the hard bias layers 317 can be applied the second free magnetic layer 444C.

Like in the seventh embodiment comprising the backed layer B1 described above with reference to FIG. 25, the nonmagnetic intermediate layer 444B and the first free magnetic layer 444A have the function to move the center of the flow sensing current J to the free magnetic layer side to weaken the sensing current magnetic field $H_j$ in the free magnetic layer, to form a synthetic-ferri-free type structure without the backed layer B1.

In the free magnetic layer 444, the magnetization direction of the second free magnetic layer 444C is fixed in the X1 direction by a magnetic flux from the hard bias layers 317, and the magnetization direction of the first free magnetic layer 444A is fixed in the direction opposite to the X1 direction. The first free magnetic layer 444A is magnetically coupled with the second free magnetic layer 444C by the exchange coupling magnetic field (RKKY interaction) to be magnetized in the direction opposite to the X1 direction shown in the drawing. Magnetizations of the first and second free magnetic layers 444A and 444C are freely reversed by the influence of an external magnetic field while maintaining the ferromagnetic state. Namely, when the magnetization of the second free magnetic layer 444C is oriented in the X1 by the hard bias layers 317, the magnetization of the first free magnetic layer 444A is oriented in the direction opposite to the X1 direction.

The thickness $t_2$ of the second free magnetic layer 444C is larger than the thickness $t_1$ of the first free magnetic layer 444A.

When saturation magnetizations of the first and second free magnetic layers 444A and 444C are $M_1$ and $M_2$, respectively, the magnetic thicknesses of the first and second free magnetic layers 444A and 444C are $M_1 \cdot t_1$ and $M_2 \cdot t_2$, respectively.

The free magnetic layer 444 is formed so that the magnetic thicknesses of the first and second free magnetic layers 444A and 444C have the relation $M_2 \cdot t_2 > M_1 \cdot t_1$. Since the magnetic thicknesses of the first and second free magnetic layers 444A and 444C have the relation $M_2 \cdot t_2 > M_1 \cdot t_1$. Ms·tF$_1$, magnetization of the second free magnetic layer 444C remains to orient the magnetization of the whole free magnetic layer 444 in the X1 direction. In this case, the effective thickness of the free magnetic layer 444 is represented by $(M_2 t_2 - M_1 t_1)$.

In addition, the first and second free magnetic layer 444A and 444C are coupled with each other ferromagnetically so that the magnetization directions are antiparallel to each other, and the magnetic thicknesses thereof have the relation $M_2 t_2 > M_1 t_1$, thereby causing an artificial ferrimagnetic state.

Therefore, there is the relation that the magnetization directions of the free magnetic layer 444 and the pinned magnetic layer 312 cross each other.

In the spin-valve thin film element of this embodiment, the magnetic thickness of the second free magnetic layer 444C is larger than the magnetic thickness of the first free magnetic layer 444A so that a difference between the magnetic thicknesses of the first and second free magnetic layers is the effective magnetic thickness of the free magnetic layer. Therefore, the thicknesses of the first and second free magnetic layers 444A and 444C is appropriately adjusted to decrease the effective thickness of the free magnetic layer 444, thereby changing the magnetization direction of the free magnetic layer 444 with an external magnetic field of low magnitude, and increasing the sensitivity of the spin-valve thin film magnetic element (spin-valve thin film element). Since the thickness of the whole free magnetic layer 444 can be increased to some extent, the rate of change in resistance is not much decreased, increasing the sensitivity of the spin-valve thin film element.

Furthermore, the upper surfaces 317b of the hard bias layers 318 are joined to the sides of the lamination 446 in in the same layer level as the second free magnetic layer 444C between the upper and lower surfaces thereof, and are arranged at positions lower than the upper surface of the protecting layer 315 or the backed layer B1 of the lamination 446. Therefore, it is possible to avoid application of a strong magnetic field dipole magnetic field to the ends of the hard bias layers near the upper edges of the sides of the lamination 446 in the direction opposite to the direction of magnetization to be applied to the first free magnetic layer 44A, thereby preventing disturbance of the magnetization directions at both ends of the first free magnetic layer 444A. It is thus possible to prevent disturbance of the magnetization directions at both ends of the second free magnetic layer 444C which are oriented in the direction opposite to the magnetization direction of the first free magnetic layer 444A, and thus stably maintain antiferromagnetic coupling between the first and second free magnetic layers 444A and 444C to maintain the free magnetic layer 444 in the ferrimagnetic layer. Therefore, it is possible to prevent the occurrence of abnormality in the reproduced waveforms at both ends of the track width, and improve the stability of the reproduced waveforms, without deteriorating the sensitivity of the spin-valve thin film element.

Furthermore, the upper surfaces 317b of the hard bias layers 318 are joined to the sides of the lamination 446 in the same layer level as the second free magnetic layer 444C between the upper and the half-thickness position thereof.

Therefore, it is possible to improve disturbance of the magnetization directions at both ends of the first free magnetic layer 444A, and prevent disturbance of the magnetization directions at both ends of the second free magnetic layer 444C which are oriented in the-direction opposite to the magnetization direction of the first free magnetic layer 444A, thereby stably extering a strong magnetic field to the second free magnetic layer in the desired magnetization direction. Therefore, it is possible to increase the sensitivity of the spin-valve thin film element, prevent the occurrence of abnormality in the reproduced waveforms at both ends of the track width, and improve the stability of the reproduced waveforms.

The spin-valve thin film element of this embodiment exhibits the same effect as the spin-valve thin film element of the first embodiment shown in FIGS. 1 to 6, and a high rate of change in resistance ($\Delta R/R$) can be obtained because of the synthetic-ferri-free spin-valve.

The method of manufacturing the spin-valve thin film element of this embodiment is the same as the second manufacturing method shown in FIGS. 26 to 30, or the second method of manufacturing the spin-valve thin film element shown in FIGS. 31 to 35 except that in the step of forming the lamination, the free magnetic layer comprises the second free magnetic layer, the nonmagnetic intermediate layer and the first free magnetic layer, and in sputtering in the step of forming the hard bias layers, the thickness of the hard bias layers is adjusted so that the upper surfaces of the hard bias layers are joined to the sides of the lamination in the same layer level as the second free magnetic layer between the upper and lower surfaces thereof.

Although the above description concerns the case in which the conductive layers 318 are extended to the surface of the lamination 446 toward the center of the lamination 446 from the both sides thereof, the spin-valve thin film element of the eighth embodiment of the present invention includes a type in which the conductive layers 318 are not extended to the surface of the lamination 446.

A thin film magnetic head of the present invention will be described in detail below.

Figure 17:
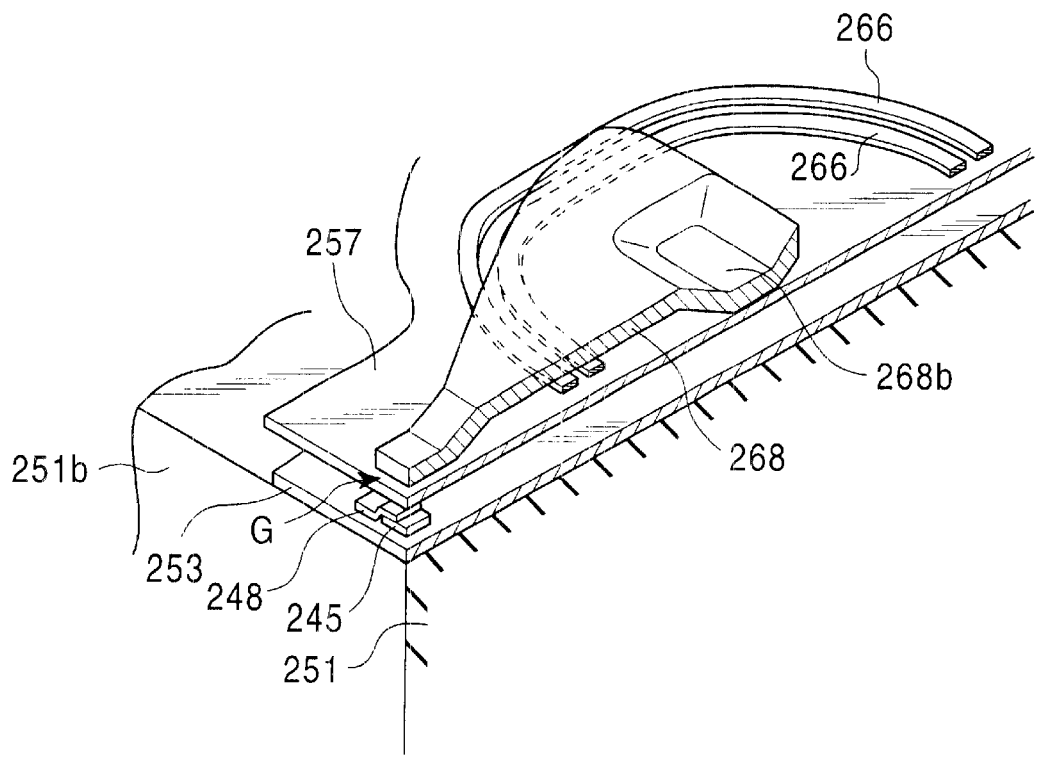
FIG. 17 is a schematic perspective view showing the thin film magnetic head shown in FIG. 16.

FIG. 17 is a drawing showing an example of the thin film magnetic head of the present invention.

The thin film magnetic head of the present invention is different from a conventional thin film magnetic head in that it comprises the spin-valve thin film element of one of the above embodiments of the present invention, which is provided in a magnetoresistive element layer 245.

The spin-valve thin film element is an important element which constitutes the thin film magnetic head (reproduction head).

Figure 16:
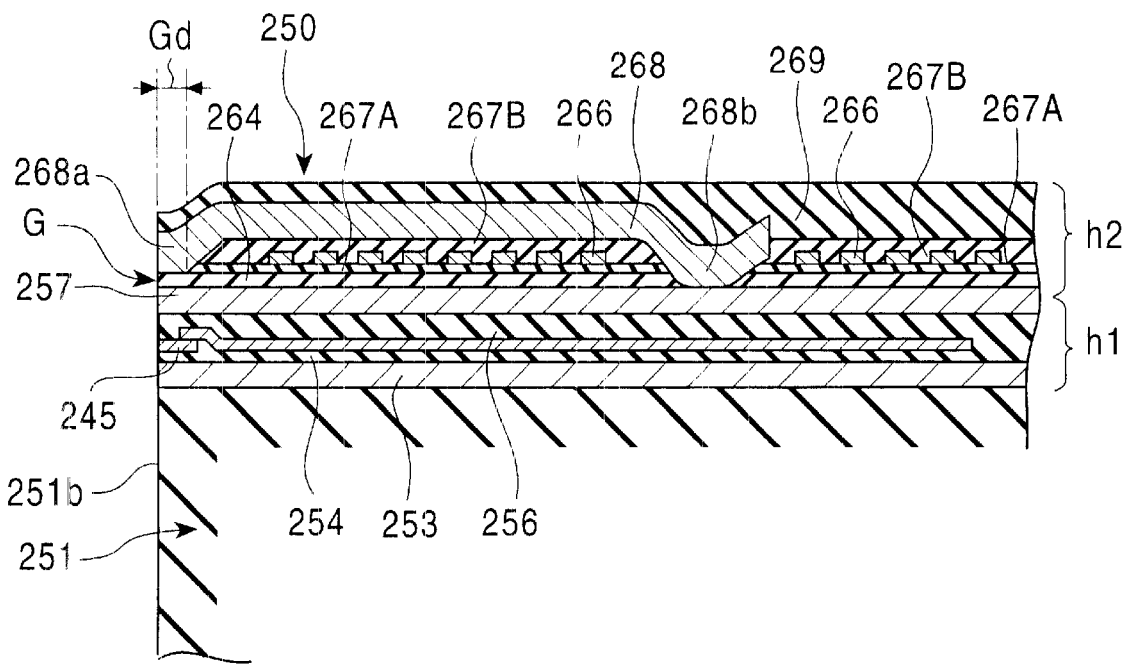
FIG. 16 is a sectional view showing the magnetic core region of the thin film magnetic head shown in FIG. 15.

In manufacturing the thin film magnetic head of the present invention, as shown in FIGS. 16 and 17, a lower gap layer 254 is first formed on a lower shielding layer 253 made of a magnetic material, and the spin-valve thin film element of one of the embodiments of the present invention is then deposited to form the magnetoresistive element layer 245. Then, an upper shielding layer 257 is formed on the spin-valve thin film element with an upper gap layer 256 provided therebetween to complete a MR head (reading head) h1.

Then, a gap layer 264 is formed on the lower core layer 257 also serving as the upper shielding layer of the MR head h1, and a spiral coil layer 266 is formed on the gap layer 264 to be surrounded by first and second insulating material layers 267A and 267B. Then, an upper core layer 268 is formed on the second insulating material layer 267B, and a protecting layer 269 is provided on the upper core layer 268 to obtain the thin film magnetic head.

The thus-obtained thin film magnetic head comprises the spin-valve thin film element of one of the embodiments of the present invention, and thus permits sufficient control of the magnetic domain of the free magnetic layer and exhibits excellent stability.

Of course, the structures of the slider portion and the inductive head of the thin film magnetic head are not limited to those shown in FIGS. 16 to 18, and sliders and inductive heads having various other structures can be used.

Experimental Example 1

In spin-valve thin film element of the present invention, the relation between the backed layer and improvement in asymmetry, and relations of the track width and the overlay portions of the conductive layers to the ratio of reproduced output/executive reproduction track width and noise were measured.

The spin-valve thin film element used in experiment was a spin-valve thin film element manufactured by the same manufacturing method as the third manufacturing method shown in FIGS. 31 to 35. Namely, the spin-valve thin film element was the same as that shown in FIG. 25 except that the conductive layers extended to the surface of the lamination were connected to the backed layer through the intermediate layers.

The track width dimension O-Tw shown in FIG. 25 was 0.5 $\mu$m, and the width dimension T6 of the overlay portions was 0.5 $\mu$m.

The lamination comprised layers set to Ta 30/PtMn 150/Co 20/Ru 8/Co 25/Cu* 27/Co 5/NiFe 30/Cu 20/Ta 20 (each of the numerals denotes the thickness on the Å unit).

In the spin-valve thin film element, the magnitude of the sensing current supplied from the conductive layers was changed to measure asymmetry.

Figure 42A:
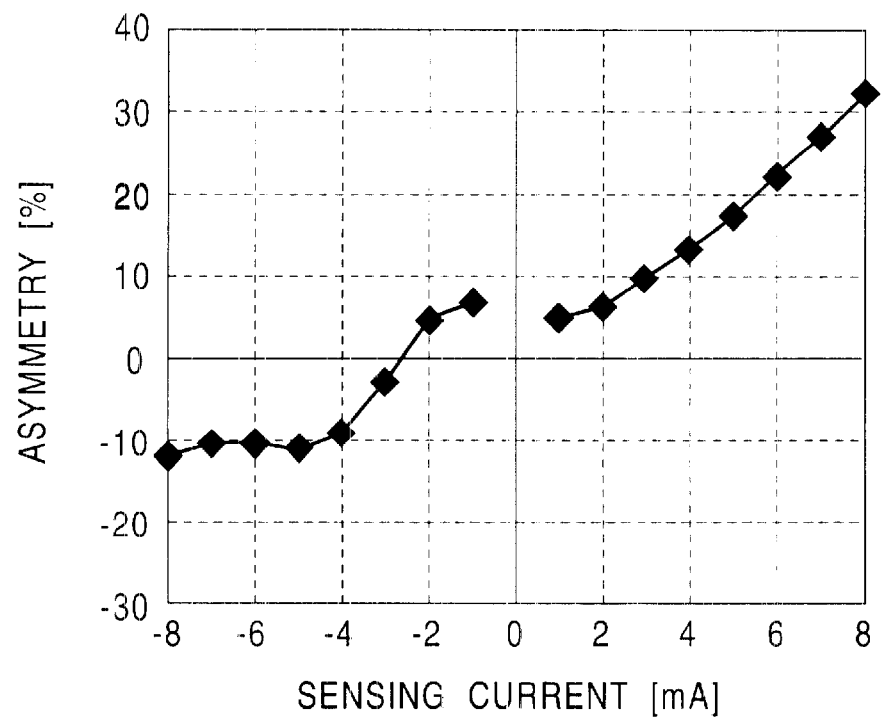
FIGS. 42A and 42B are graphs showing the relation between the sensing current value and asymmetry of a spin-valve thin film element of the present invention, in which A shows a conventional example, and B shows an example.
Figure 42B:
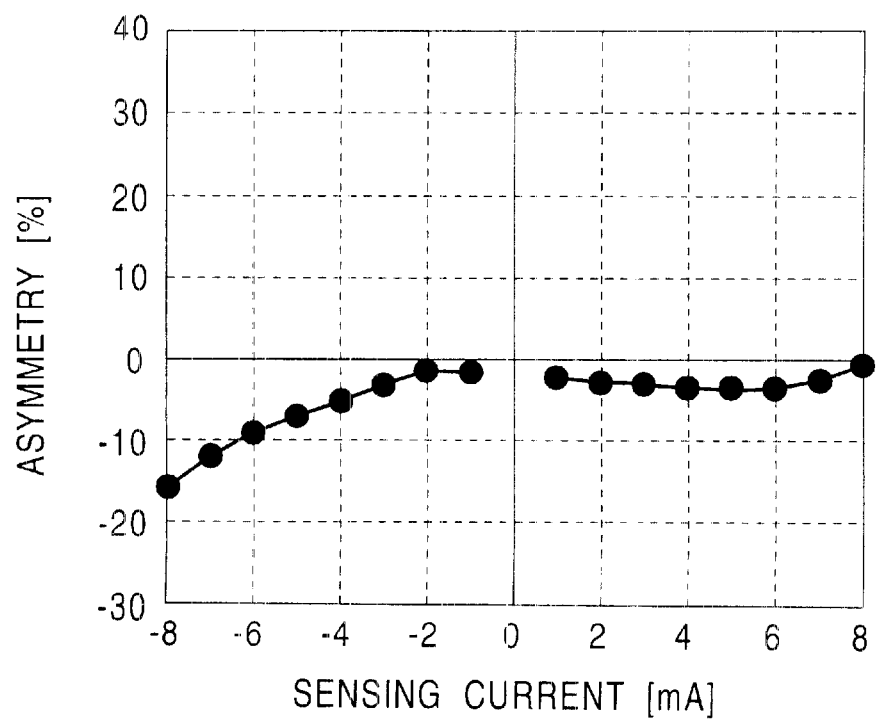

The results are shown in FIG. 42B.

On the other hand, a spin-valve thin film element of a comparative example was manufactured, in which the backed layer (Cu*) was not provided, as schematically shown in FIG. 40A, and the magnitude of the sensing current supplied from the conductive layers was changed to measure asymmetry.

The results are shown in FIG. 42A.

FIG. 42 indicates that the presence of the backed layer decreases asymmetry. Particularly, it is found that with a sensing current of 5 mA in an actual operation state, the comparative example shows asymmetry of 15% or more, while the asymmetry of the present invention is improved to about −3%.

Experimental Example 2

A plurality of spin-valve thin film elements having different element heights were formed, and the ratios of reproduced output/executive reproduction track width were measured. The element height represents the width dimension of the sensitive region in the Y direction shown in FIG. 1.

On the other hand, a plurality of spin-valve thin film elements having different element heights were formed as comparative examples, in which the overlay portions of the conductive layers were not provided, as schematically shown in FIG. 22. The ratios of reproduced output/executive reproduction track width were then measured.

Figure 44:
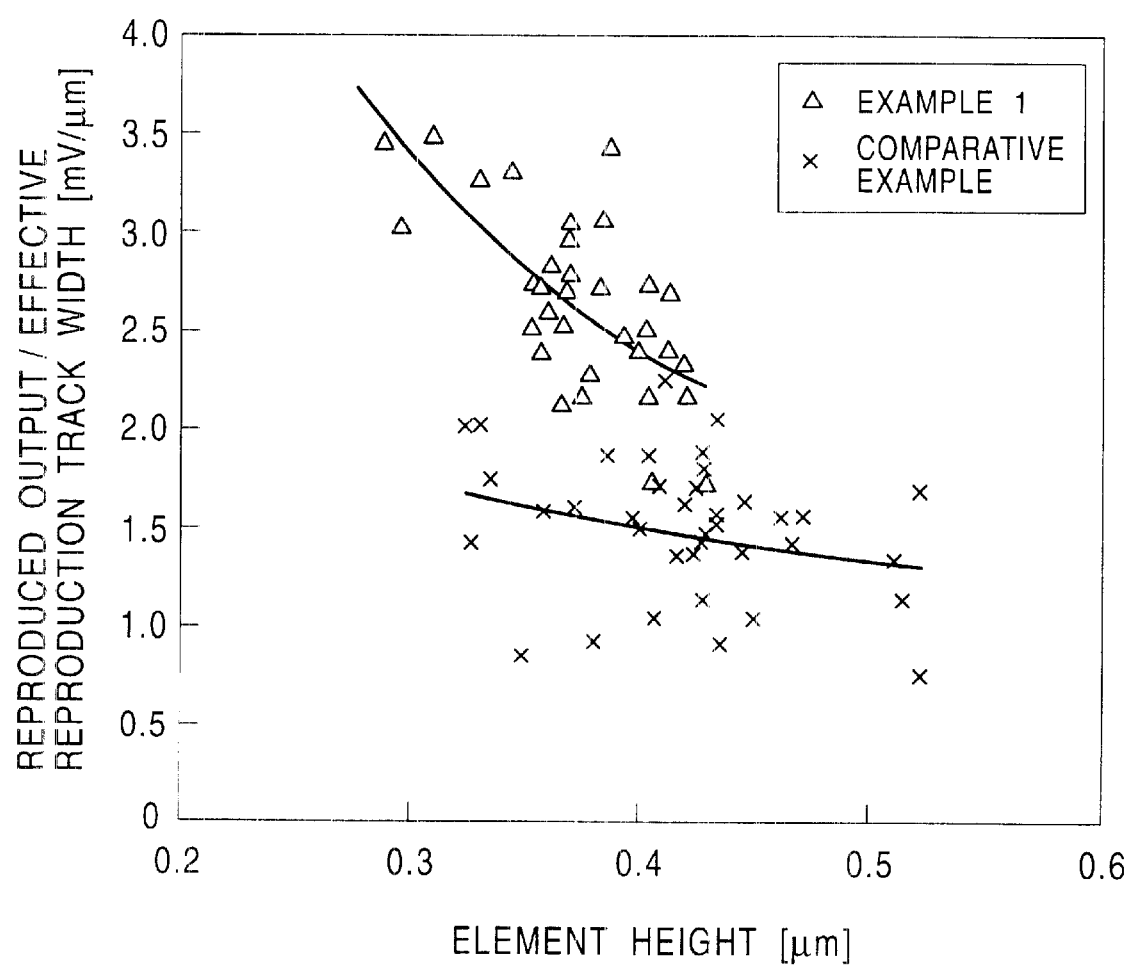
FIG. 44 is a graph showing the relation between the element height and the reproduced output/effective reproduction track width of a spin-valve thin film element of the present invention.

The results are shown in FIG. 44.

FIG. 44 indicates that by providing the overlay portions of the conductive layers, the ratio of reproduced output/executive reproduction track width is improved. Particularly, with an element height of 0.4 $\mu$m, the output obtained in the examples of the present invention is about 1.6 times the output of the comparative examples.

Figure 45A:
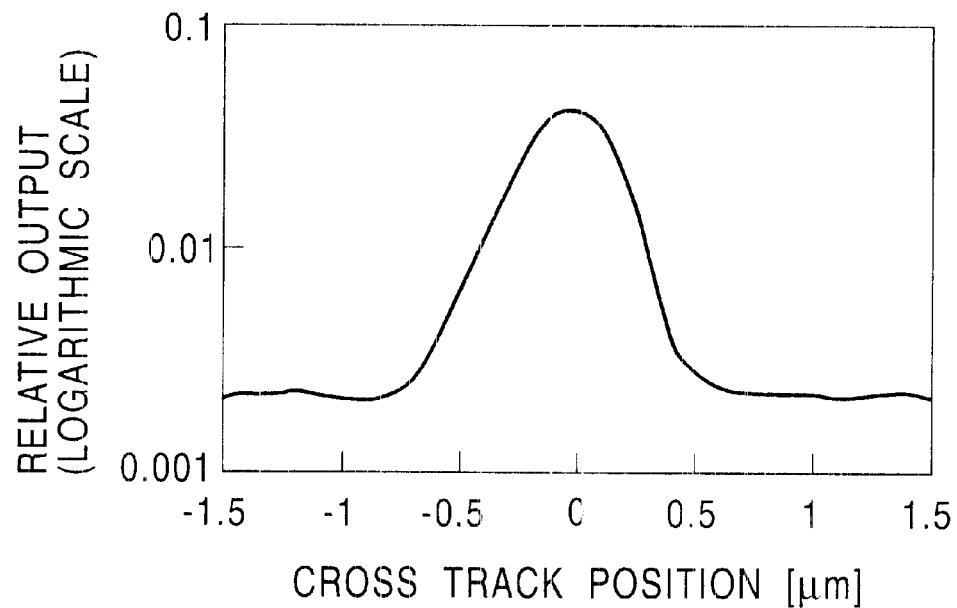
FIGS. 45A and 45B are graphs showing the relation between the cross track position and relative output of a spin-valve thin film element of the present invention.

In the examples, therefore, the reproduced output was measured by the microtrack profile method to obtain the result shown in FIG. 45A. Similarly, in the comparative examples, the reproduced output was measured by the microtrack profile method to obtain the result shown in FIG. 45B.

FIG. 45 reveals that output is substantially obtained at the cross track position with 0±0.5 $\mu$m where the overlay portions are not formed, and output equal to the base output is obtained at the cross track position of −0.5 to 0.5 $\mu$m where the overlay portions are formed. Namely, it is found that the position of the electrode layers substantially coincide with the positions of the sensitive and insensitive regions. The effective reproduction track width is found to be about 0.6 $\mu$m.

Figure 45B:
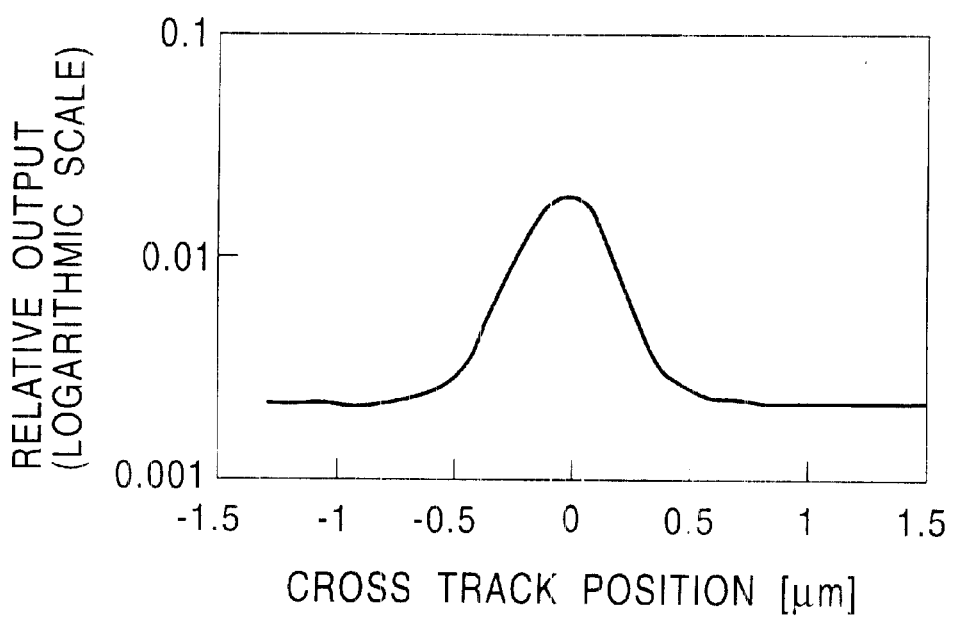

Furthermore, comparison between the example shown in FIG. 45A and the comparative example shown in FIG. 45B indicates that the maximum output is increased relative to the base output.

It is thus found that the DC resistance value can be increased, no noise occurs due to side reading in which reproduced output contains a signal of the adjacent track, and the reproduced output per effective track width can be significantly improved.

Experimental Example 3

Figure 46A:
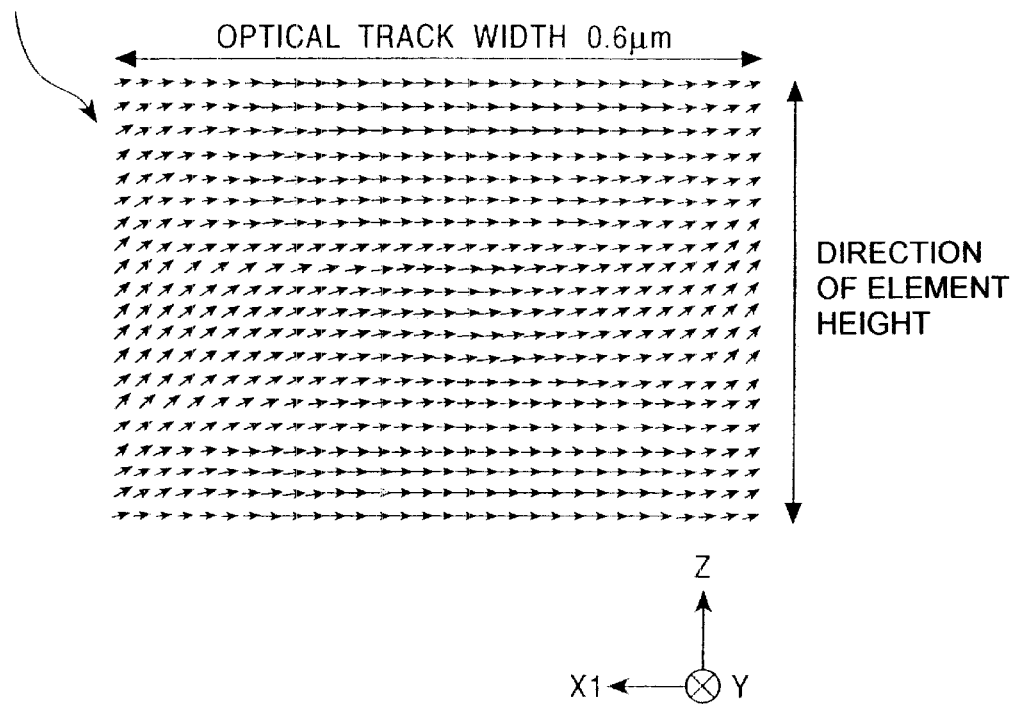
FIGS. 46A and 46B diagrams showing the magnetization distributions of first and second free magnetic layers of a spin-valve thin film element in an example of the present invention.
Figure 46B:
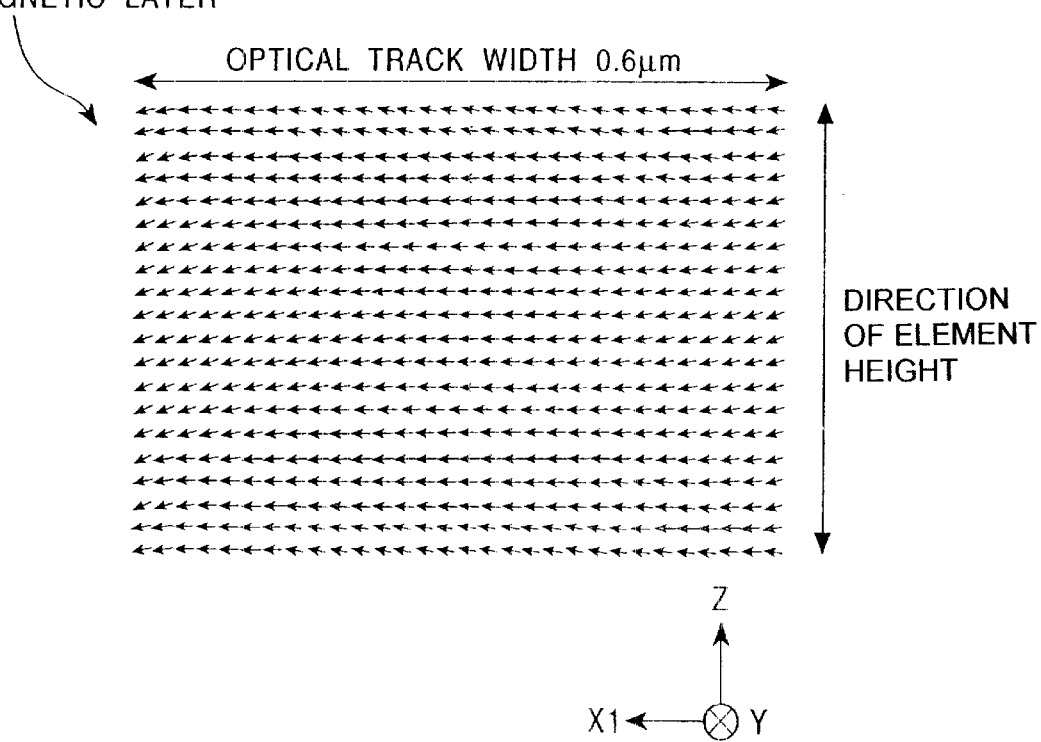

Next, in a bottom type synthetic-ferri-free spin-valve thin film magnetic element in which the upper surfaces of the hard bias layers were joined to the sides of the lamination in the same layer level as the second free magnetic layer between the upper and lower surfaces thereof, disturbance of the magnetization directions at both ends of the first and second free magnetic layers were examined by micromagnetic simulation. The spin-valve thin film element (the element of the example) used in experiment was the same as the spin-valve thin film element shown in FIGS. 36 and 37 except that no backed layer was provided between the free magnetic layer and the protecting layer, and the conductive layers were not extended to the surface of the lamination. The results are shown in FIG. 46. FIG. 46A is a diagram showing the magnetization distribution of the first free magnetic layer of the element of the example, and FIG. 46B is a diagram showing the magnetization distribution of the second free magnetic layer of the element of the example.

In the spin-valve thin film element of the example, the optical track width dimension was 0.6 $\mu$m.

In the spin-valve thin film element of the example, the lamination comprised layers set to Ta 30/PtMn 150/Co 20/Ru 8/Co 25/Cu 27/Co 5/NiFe 40/Ru 8/NiFe 25/Ta 20 (each of the numerals denotes the thickness on the Å unit) from below. The magnetic thickness of the first free magnetic layer was $4.52 \times 10^{-4}$ (T·nm), the magnetic thickness of the second free magnetic layer was $7.16 \times 10^{-4}$ (T·nm), and the antiparallel coupling magnetic field between the first and second free magnetic layers was 58.4 kA/m. The thickness of each of the hard bias layers of CoPt provided on both sides of the lamination was about 30 nm (300 Å), and the thickness of each of the conductive layers of Cr respectively provided on the hard bias layers was about 2.5 nm (25 Å). The magnetic thickness of the hard bias layers was $1.88 \times 10^{-3}$ (T·nm). The joints between the upper surfaces of the hard bias layers and the sides of the lamination was at the half-thickness position of the second free magnetic layer. The thickness of each of the bias base layers interposed between the sides of the lamination and the hard bias layers was 2 nm (20 Å). The head bias layers were magnetized in the X1 direction.

Figure 23:
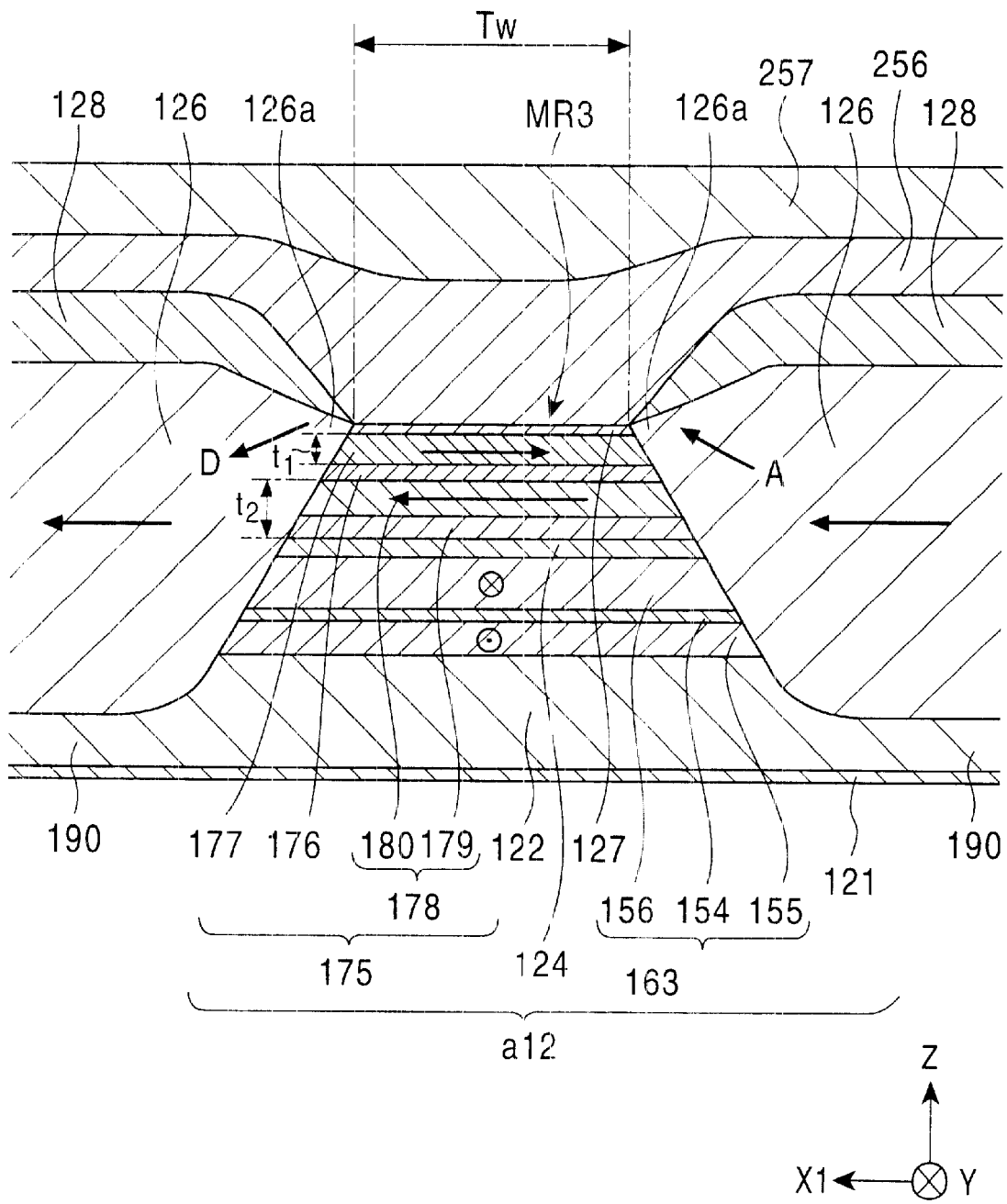
FIG. 23 is a sectional view showing the structure of a principal portion of a thin film magnetic head comprising still another conventional spin-valve thin film element as viewed from the side opposing a recording medium.
Figure 24:
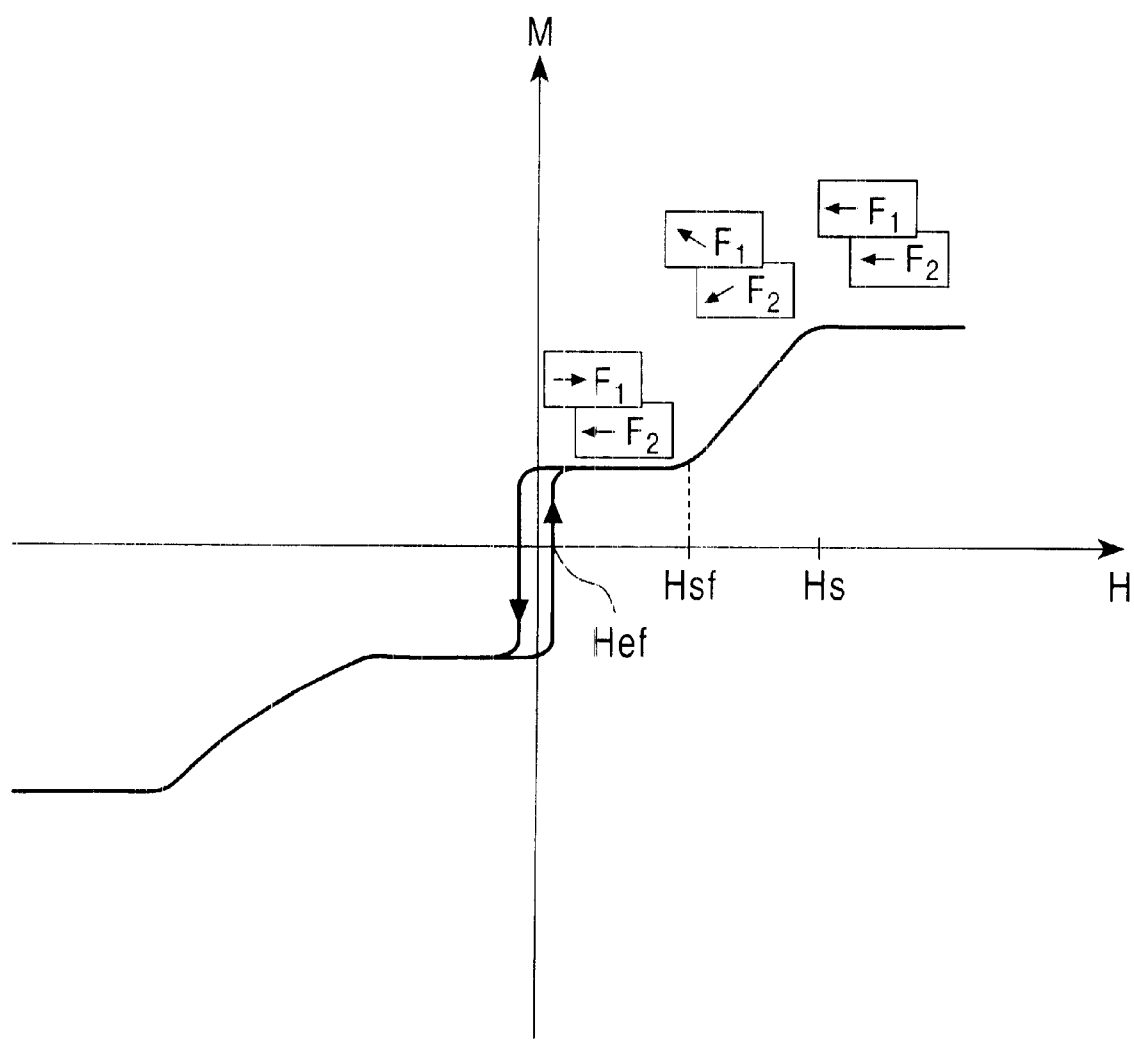
FIG. 24 is a diagram showing a M-H curve of a free magnetic layer of the spin-valve thin film element shown in FIG. 23.
Figure 47A:
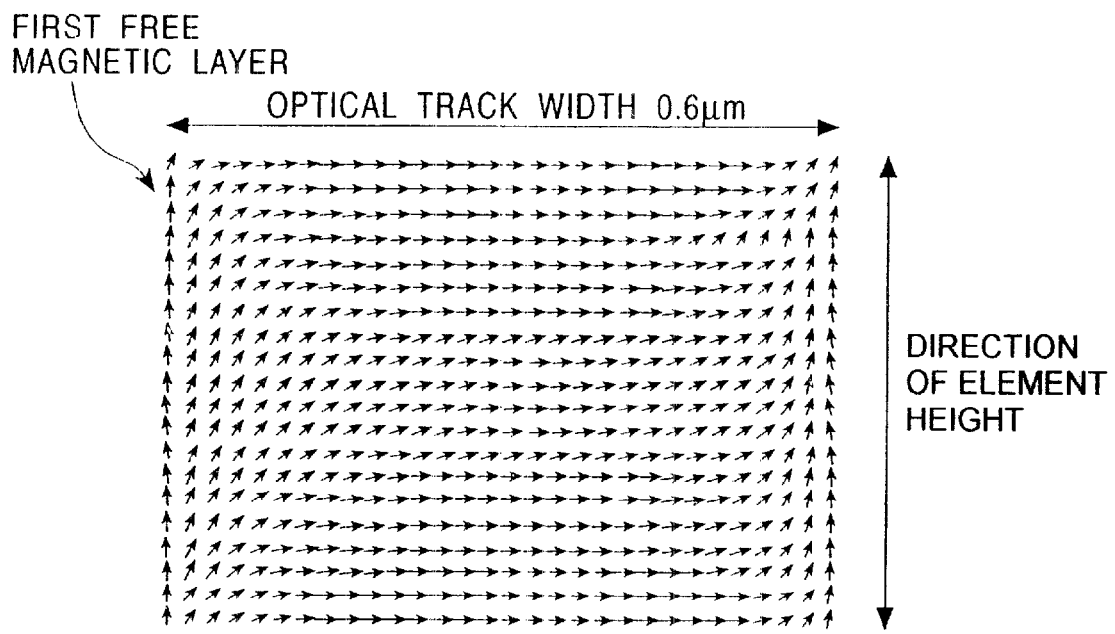
FIGS. 47A and 47B are a diagrams showing the magnetization distributions of first and second free magnetic layers of a spin-valve thin film element in a conventional example.
Figure 47B:
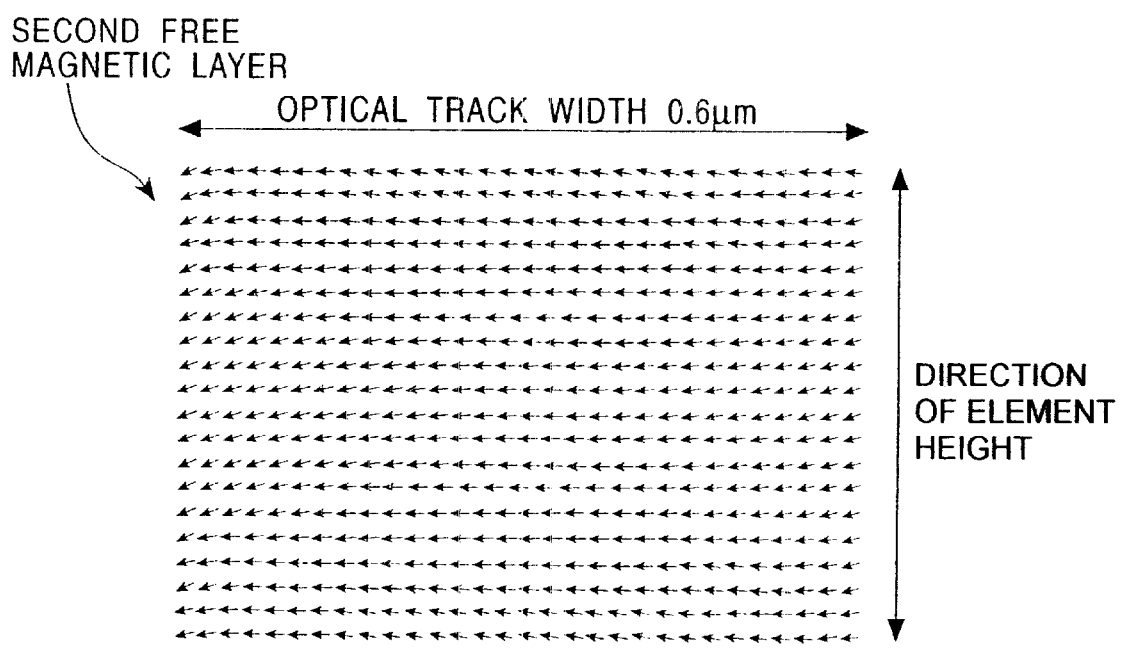

On the other hand, in a spin-valve thin film magnetic element of a comparative example in which the upper surfaces of the hard bias layers were projected from the upper surface of the lamination (the upper surfaces of the hard bias layers were joined to the sides at positions above the upper surface of the second free magnetic layer), as shown in FIG. 23, disturbance of the magnetization directions at both ends of the first and second free magnetic layers were examined by micromagnetic simulation. The results are shown in FIG. 47. FIG. 47A is a diagram showing the magnetization distribution of the first free magnetic layer of the element of the comparative example, and FIG. 47B is a diagram showing the magnetization distribution of the second free magnetic layer of the element of the comparative example.

In the spin-valve thin film element of the comparative example, the optical track width dimension, the constituent material and thickness of each of the layers of the 1lamination, the constituent materials of the hard bias layers and the conductive layers, the magnetic thicknesses of the first and second free magnetic layers, the magnetic thickness of the hard bias layers, and the bias base layers interposed between the lamination and the hard bias layers were the example. However, the upper surfaces of the joints between the hard bias layers and the lamination were about 5.3 nm (53 Å) projected from the upper surface of the second free magnetic layer.

The results shown in FIG. 47A indicate that in the spin-valve thin film element of the comparative example in which the upper surfaces of the hard bias layers were extended from the upper surface of the lamination, a backward strong magnetic field is applied to both ends of the first free magnetic layer from the hard bias layers to cause frustration with the coupling magnetic field with the second free magnetic layer, thereby disturbing the magnetization directions at both ends and failing to orient the magnetization in the direction opposite to the X1 direction. Also, the magnetization directions at both ends of the second free magnetic layer are disturbed, thereby failing to orient the magnetization thereof in the X1 direction. It can thus be thought that in the spin valve thin film element of the comparative example, the reproduced waveforms become unstable due to Barkhausen noise.

The results shown in FIG. 46 reveal that in the spin-valve thin film element of the example in which the joints between the upper surfaces of the hard bias layers and the sides of the lamination are lowered so as not to be joined to the first free magnetic layer, disturbance of the magnetization directions at both ends of the first free magnetic layer is decreased, and disturbance of the magnetization directions at both ends of the second free magnetic layer is improved, as compared with the comparative example. It is thus found that in the spin-valve thin film element of the example, the stability of the reproduced output can be improved.

As described above, in the spin-valve thin film element of the present invention, the upper surfaces of the hard bias layers are joined to the sides of the lamination at positions lower than the upper edges of the sides of the lamination. Unlike in conventional hard bias layers, the hard bias layers do not have ends having a pointed sectional shape and joined to the upper edges of the sides of the lamination. Therefore, a leakage magnetic field from the hard bias layers is less absorbed by the upper shielding layer to suppress a decrease in the effective magnetic field applied to the free magnetic layer. As a result, the free magnetic layer is easily put into a single magnetic domain state, and thus the spin-valve thin film element permits sufficient control of the magnetic domain of the free magnetic layer and has excellent stability.

In the spin-valve thin film element of the present invention, since the hard bias layers are arranged in the same layer level as the free magnetic layer, a strong bias magnetic field can easily be applied to the free magnetic layer, and the free magnetic layer can easily be put into a single magnetic domain state, decreasing the occurrence of Barkhausen noise.

In addition, the upper surfaces of the hard bias layers are joined to the sides of the lamination at positions lower than the uppermost positions of the hard bias layers. Unlike in conventional hard bias layers, the hard bias layers do not have ends having a pointed sectional shape and joined to the upper edges of the sides of the lamination. Therefore, a magnetic field less occurs near the upper edges of the sides of the lamination, which exerts a magnetic field in the direction opposite to the magnetization direction of the free magnetic layer. As a result, the free magnetic layer is easily put into a single magnetic domain state, and thus the spin-valve thin film element permits further sufficient control of the magnetic domain of the free magnetic layer and has excellent properties.

Furthermore, the hard bias layers have a larger thickness than the thickness of the free magnetic layer in the thickness direction of the free magnetic layer, and the upper surfaces of the hard bias layer are arranged at positions higher than the upper surface of the free magnetic layer. Therefore, a strong bias magnetic field can easily be applied to the free magnetic layer, and the free magnetic layer can easily be put into a single magnetic domain state, further decreasing the occurrence of Barkhausen noise.

Furthermore, since the lower surfaces of the hard bias layers are arranged at positions lower than the lower surface of the free magnetic layer above the substrate, a stronger bias magnetic field can easily be applied to the free magnetic layer, and the free magnetic layer can easily be put into a single magnetic domain state, further decreasing the occurrence of Barkhausen noise.

In the spin-valve thin film element, the antiferromagnetic layer is made of an alloy represented by the formula X—Mn (wherein X is one element of Pd, Ru, Ir, Rh, and Os), or the formula Pt—Mn—X' (wherein X' is at least one element of Pd, Ru, Ir, Rh, Os, Au, Ag, Ne, Ar, Xe, and Kr), and the amount of X or the total amount of X' and Pt is in the range of 37 to 63 atomic %. Therefore, the spin-valve thin film element has excellent properties such as a high exchange coupling field, a high blocking temperature, and excellent corrosion resistance, as compared with use of a NiO alloy, a FeMn alloy, a NiMn alloy, or the like, which is conventionally used for the antiferromagnetic layer.

A dual type structure spin valve thin film element, in which a nonmagnetic conductive layer, a pinned magnetic layer and an antiferromagnetic layer are form on either side of the free magnetic layer in the thickness direction, comprises two combinations of the three layers including the nonmagnetic conductive layer, the pinned magnetic layer and the antiferromagnetic layer. Therefore, the dual spin-valve thin film element exhibits high ΔMR (rate of change in resistance), and can comply with the demand for high-density recording, as compared with a single spin-valve thin film element.

In addition, in the spin-valve thin film element, at least the pinned magnetic layer is divided into two layers with a nonmagnetic intermediate layer provided therebetween so that the divided layers have the magnetization directions in the ferrimagnetic state in which they are 180° different from each other. Therefore, one of the two pinned magnetic layer has the function to fix magnetization of the other pinned magnetic layer in an appropriate direction, thereby maintaining the pinned magnetic layers in a stable state and exhibiting excellent properties.

In addition, in the spin-valve thin film element, at least the free magnetic layer is divided into two layers with a nonmagnetic intermediate layer provided therebetween so that the divided layers have the magnetization directions in the ferrimagnetic state in which they are 180° different from each other. Therefore, an exchange coupling magnetic field occurs between the two free magnetic layers to cause the ferrimagnetic state, thereby permitting reversal with high sensitivity to an external magnetic field and exhibiting excellent properties.

In use of Cr for the conductive layers, each of the intermediate layers of Ta respectively provided between the hard bias layers and the conductive layers functions as a diffusion barrier in a thermal process such as resist curing in the subsequent step to prevent deterioration in magnetic properties of the hard bias layers.

In use of Ta for the conductive layers, each of the intermediate layers of Cr respective provided between the hard bias layers and the conductive layers has the effect of readily depositing Ta crystals having a low-resistance body centered cubic structure on Cr.

In addition, in the spin-valve thin film element, bias base layers made of Cr having a body centered cubic crystal structure (bcc structure) may be provided between the hard bias layers and the lamination, and between the hard bias layers and the substrate. The bias base layers increase the coercive force and remanence ratio of the hard bias layers, and thus increase a bias magnetic field necessary for putting the free magnetic layer into a single magnetic domain state.

What is claimed is:

1. A spin-valve thin film element comprising an antiferromagnetic layer, a pinned magnetic layer formed in contact with the antiferromagnetic layer so that the magnetization direction is fixed by an exchange coupling magnetic field with the antiferromagnetic layer, and a nonmagnetic conductive layer formed between the pinned magnetic layer and a free magnetic layer, which are laminated in turn on a substrate to form a lamination comprising at least the antiferromagnetic layer, the pinned magnetic layer, the nonmagnetic conductive layer, and the free magnetic layer; hard bias layers formed on both sides of the lamination, for orienting magnetization of the free magnetic layer in the direction crossing the magnetization direction of the pinned magnetic layer; and conductive layers respectively formed on the hard bias layers, for supplying a sensing current to the lamination;

wherein the upper surfaces of the hard bias layers are joined to the sides of the lamination at positions lower than the upper edges of the sides of the lamination, and wherein the free magnetic layer is divided into two layers with a nonmagnetic intermediate layer provided therebetween so that the magnetization directions are in a ferrimagnetic state in which they are antiparallel to each other, and wherein the free magnetic layer of the two free magnetic layers which contacts the nonmagnetic conductive layer is a second free magnetic layer, the other is a first free magnetic layer, the upper surfaces of the hard bias layers are joined to the sides of the lamination in the same layer level as the second free magnetic layer between the upper and lower surfaces thereof.

2. A spin-valve thin film element according to claim 1, wherein the upper surfaces of the hard bias layers are joined to the sides of the lamination at the same position as or positions lower than the uppermost position of the hard bias layers.

3. A spin-valve thin film element according to claim 2, wherein the thickness of the hard bias layers is larger than the thickness of the free magnetic layer in the thickness direction thereof, and the upper surfaces of the hard bias layers are arranged at a larger distance from the substrate than the upper side of the free magnetic layer.

4. A spin-valve thin film element according to claim 1, wherein the lower sides of the hard bias layers are arranged at positions lower than the lower side of the free magnetic layer.

5. A spin-valve thin film element according to claim 1, wherein the antiferromagnetic layer comprises an alloy represented by the formula X—Mn (wherein X represents one element selected from Pt, Pd, Ru, Ir, Rh, and Os), wherein X is in the range of 37 to 63 atomic %.

6. (Amended) A spin-valve thin film element according to claim 1, wherein the antiferromagnetic layer comprises an alloy represented by the formula X'—Pt—Mn (wherein X' represents at least one element selected from Pd, Cr, Ru, Ni, Ir, Rh, Os, Au, Ag, Ne, Ar, Xe, and Kr), wherein the total of X' and Pt is in the range of 37 to 63 atomic %.

7. A spin-valve thin film element according to claim 1, wherein intermediate layers of Ta or Cr are respectively provided between the hard bias layers and the conductive layers.

8. A spin-valve thin film element according to claim 1, wherein bias base layers made of Cr are provided between the hard bias layers and the lamination, and between the hard bias layers and the substrate.

9. A spin-valve thin film element according to claim 1, wherein a nonmagnetic conductive layer, a pinned magnetic layer and an antiferromagnetic layer are formed on either side of the free magnetic layer in the thickness direction to form a dual structure.

10. A spin-valve thin film element according to claim 1, wherein at least one of the pinned magnetic layer and the free magnetic layer is divided into two layers with a nonmagnetic intermediate layer therebetween so that the two divided layers are brought into an artificial ferrimagnetic state in which the magnetization directions are antiparallel to each other.

11. A spin-valve thin film element according to claim 1, wherein the lamination comprises a backed layer comprising a nonmagnetic conductive material in contact with the side of the free magnetic layer opposite to the nonmagnetic conductive layer side.

12. A spin-valve thin film element according to claim 1, wherein the conductive layers are coated to extend toward the central portion of the surface of the lamination from both sides thereof.

13. A spin-valve thin film element according to claim 1, wherein when the saturation magnetization and thickness of the second free magnetic layer are $M_2$ and $t_2$, respectively, and saturation magnetization and thickness of the first free magnetic layer are $M_1$ and $t_1$, respectively, the relation $M_2 \cdot t_2 > M_1 \cdot t_1$ is satisfied.

14. A spin-valve thin film element according to claim 1, wherein the upper surfaces of the hard bias layers are joined to the sides of the lamination in the same layer level as the second free magnetic layer between the upper and the half-thickness position thereof.

15. A spin-valve thin film element according to claim 1, wherein the antiferromagnetic layer, the pinned magnetic layer, the nonmagnetic conductive layer, and the free magnetic layer are deposited in this order from the substrate side.

* * * * *

UNITED STATES PATENT AND TRADEMARK OFFICE
CERTIFICATE OF CORRECTION

PATENT NO.    : 6,538,858 B1
DATED         : March 25, 2003
INVENTOR(S)   : Naoya Hasegawa et al.

It is certified that error appears in the above-identified patent and that said Letters Patent is hereby corrected as shown below:

<u>Column 68,</u>
Line 14, delete "wherein" and substitute -- when -- in its place.
Line 42, delete "(Amended)".

Signed and Sealed this

Ninth Day of September, 2003

JAMES E. ROGAN
*Director of the United States Patent and Trademark Office*